United States Patent
Zhao et al.

(10) Patent No.: US 10,790,879 B2
(45) Date of Patent: Sep. 29, 2020

(54) METHOD FOR ROUTING DATA FRAME, NEAR FIELD COMMUNICATION CONTROLLER, AND TERMINAL

(71) Applicant: Huawei Technologies Co., Ltd., Shenzhen (CN)

(72) Inventors: Xiaona Zhao, Beijing (CN); Jingqing Mei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/089,116

(22) PCT Filed: Mar. 28, 2016

(86) PCT No.: PCT/CN2016/077568
§ 371 (c)(1),
(2) Date: Sep. 27, 2018

(87) PCT Pub. No.: WO2017/166033
PCT Pub. Date: Oct. 5, 2017

(65) Prior Publication Data
US 2019/0068246 A1 Feb. 28, 2019

(51) Int. Cl.
*H04B 5/00* (2006.01)
*H04L 29/06* (2006.01)
*H04L 29/08* (2006.01)

(52) U.S. Cl.
CPC ............ *H04B 5/0031* (2013.01); *H04B 5/00* (2013.01); *H04L 69/18* (2013.01); *H04L 69/324* (2013.01)

(58) Field of Classification Search
CPC .......... H04B 5/0031; H04B 5/00; H04L 69/18
(Continued)

(56) References Cited

U.S. PATENT DOCUMENTS

| 2009/0247078 A1 | 10/2009 | Sklovsky et al. |
| 2012/0135693 A1 | 5/2012 | Teruyama |

(Continued)

FOREIGN PATENT DOCUMENTS

| CN | 102047748 A | 5/2011 |
| CN | 103222291 A | 7/2013 |

(Continued)

OTHER PUBLICATIONS

GlobalPlatform Card, "Multiple Contactless Card Emulation Environments—Managing Entity," Version 0.0.0.4, Member Review, Dec. 2015, 115 pages.
GlobalPlatform Card, "Multiple Contactless Card Emulation Environments—Managing Entity," Version 0.0.0.5, Post Member Review, Mar. 2016, 118 pages.

(Continued)

*Primary Examiner* — Ayodeji O Ayotunde
(74) *Attorney, Agent, or Firm* — Conley Rose, P.C.

(57) ABSTRACT

A method for routing a data frame, applied to a first terminal, where the first terminal includes a device host (DH) and a near field communication controller (NFCC). A first routing mechanism in the first terminal is in an enabled state. The method includes receiving, by the NFCC, a data frame from a second terminal, processing, by the NFCC, the data frame according to a first preset rule when a currently activated radio frequency (RF) protocol is a first RF protocol, and routing, by the NFCC, the data frame according to the first routing mechanism when the currently activated RF protocol is a second RF protocol, where the first RF protocol includes a Near Field Communication Data Exchange Protocol (NFC-DEP), and the second RF protocol includes a non NFC-DEP.

18 Claims, 8 Drawing Sheets

(58) Field of Classification Search
USPC .......................................................... 455/41.1
See application file for complete search history.

(56) References Cited

U.S. PATENT DOCUMENTS

| | | | |
|---|---|---|---|
| 2012/0329393 A1 | 12/2012 | Hillan et al. | |
| 2013/0078920 A1* | 3/2013 | Hillan | H04W 48/16 |
| | | | 455/41.1 |
| 2014/0256252 A1 | 9/2014 | Geslin et al. | |
| 2015/0142589 A1 | 5/2015 | Jin et al. | |
| 2015/0215435 A1* | 7/2015 | Hillan | H04L 69/08 |
| | | | 455/41.1 |
| 2015/0271677 A1 | 9/2015 | Van Nieuwenhuyze et al. | |
| 2016/0309287 A1 | 10/2016 | Nguyen | |
| 2016/0360352 A1* | 12/2016 | Khan | H04W 4/80 |
| 2017/0104510 A1 | 4/2017 | Teruyama | |
| 2017/0222927 A1 | 8/2017 | Chang et al. | |

FOREIGN PATENT DOCUMENTS

| | | | |
|---|---|---|---|
| CN | 103942898 A | 7/2014 | |
| CN | 104936129 A | 9/2015 | |
| EP | 2802179 A1 | 11/2014 | |
| JP | 2012118569 A | 6/2012 | |
| JP | 2014527323 A | 10/2014 | |
| JP | 2014531074 A | 11/2014 | |
| WO | 2016049885 A1 | 4/2016 | |

OTHER PUBLICATIONS

"NFC Controller Interface (NCI)," Technical Specification, Version 2.0, Draft 18, Feb. 15, 2016, 211 pages.

Foreign Communication From a Counterpart Application, PCT Application No. PCT/CN2016/077568, English Translation of International Search Report dated Jan. 3, 2017, 2 pages.

Foreign Communication From a Counterpart Application, PCT Application No. PCT/CN2016/077568, English Translation of Written Opinion dated Jan. 3, 2017, 6 pages.

Foreign Communication From a Counterpart Application, European Application No. 16895814.8, Extended European Search Report dated Feb. 5, 2019, 7 pages.

Foreign Communication From a Counterpart Application, Korean Application No. 10-2018-7030298, Korean Office Action dated Jul. 23, 2019, 4 pages.

Foreign Communication From a Counterpart Application, Korean Application No. 10-2018-7030298, English Translation of Korean Office Action dated Jul. 23, 2019, 3 pages.

Foreign Communication From a Counterpart Application, Japanese Application No. 2018-550721, Japanese Office Action dated Jan. 6, 2020, 7 pages.

Foreign Communication From a Counterpart Application, Japanese Application No. 2018-550721, English Translation of Japanese Office Action dated Jan. 6, 2020, 8 pages.

"NFC Controller Interface (NCI)," XP055388030, Technical Specification, NFC Forum, NCI 1.0, Nov. 6, 2012, 146 pages.

* cited by examiner

METHOD FOR ROUTING DATA FRAME, NEAR FIELD COMMUNICATION CONTROLLER, AND TERMINAL

CROSS-REFERENCE TO RELATED APPLICATIONS

This application is a U.S. National Stage of International Patent Application No. PCT/CN2016/077568 filed on Mar. 28, 2016, which is hereby incorporated by reference in its entirety.

TECHNICAL FIELD

Embodiments of the present invention relate to the field of wireless communications, and more specifically, to a method for routing a data frame in near field communication, a near field communication controller, and a terminal.

BACKGROUND

Near field communication (near field communication, NFC for short) is a short-range wireless connection technology. Based on a radio frequency identification (radio frequency identification, RFID for short) technology, NFC uses magnetic field induction to implement short-range communication between electronic devices.

A terminal having an NFC function (NFC terminal for short hereinafter) mainly includes the following three functional entities: a device host (device host, DH for short), an NFC controller (NFC controller, NFCC for short), and an NFC execution environment (NFC Execution Environment, NFCEE for short). The DH is responsible for management of the whole device, including management of the NFC controller, such as initialization, configuration, or power management. For example, the NFC terminal may be a smartphone, and the device host DH may correspond to a CPU of the smartphone. The NFCC is an entity responsible for data transmission, of an NFC chip. The NFCC is generally directly used to represent the NFC chip. The NFCEE is a specific entity providing a secure execution environment for an NFC application, and may be in multiple physical forms such as a UICC or an SD card, or may be a software environment such as host card emulation (HCE, Host Card Emulation). An NFC control interface (NFC control interface, NCI for short) defines a logical interface for communication between the DH and the NFCC. The DH may communicate with the NFCC by using the NCI protocol. In addition, other communications protocols such as the host controller interface (host controller interface, HCI for short) or single wire protocol (single wire protocol, SWP for short) may be used for communication between the NFCC and the NFCEE.

Currently, the NCI defines a routing mechanism (referred to as a first routing mechanism hereinafter). When the DH configures a routing mechanism for the NFCC, the DH may set a routing entry pointing to a specific NFCEE (or referred to as a route target). In addition, the DH may specify, by using a power state field, in which power states the routing mechanism is available, or in which power states the routing mechanism is unavailable (for example, one bit in the power state field corresponds to one power state, and correspondingly, a bit value may be set to specify whether the routing mechanism is available in a corresponding power state). In this case, after receiving a data frame sent by a peer device, the NFCC may determine, according to the power state field corresponding to the routing mechanism, whether the routing mechanism is available in the current power state, and therefore determine whether to route the data frame to the specific NFCEE in the current power state; or after receiving an RF protocol activation command sent by a peer device, the NFCC determines, according to the power state field corresponding to the routing mechanism, whether the routing mechanism is available in the current power state, and therefore determines whether to respond to the peer device in the current power state, so as to activate an RF protocol subsequently used in near field communication.

Currently, some NFCEEs support only a card emulation (CE, Card Emulation) mode, and cannot support a peer-to-peer mode (P2P, Peer to Peer) mode, and only the DH supports the P2P mode. When an NFCEE supporting only the CE mode is enabled, if the DH configures, for the NFCC, the first routing mechanism for routing to the NFCEE, after the NFCC receives a data frame sent by the peer device, the NFCC may determine, according to the first routing mechanism, that the NFCEE is a route target, and route the data frame to the route target. However, when data sent by the peer device is P2P data, after the NFCC directly forwards the data to the NFCEE, because the NFCEE cannot process the P2P data, P2P communication fails. In addition, when the NFCC receives the RF protocol activation command sent by the peer device, if the first routing mechanism is unavailable in the current power state, the NFCC does not respond. In this case, a protocol of a P2P application is not activated, that is, P2P communication is not performed subsequently.

Therefore, when some NFCEEs use the first routing mechanism, although the card emulation application is available in the NFCEE, a P2P application in another entity (such as the DH) cannot be used normally.

SUMMARY

Embodiments of the present invention provide a method for routing a data frame, an NFCC, and an NFC terminal. According to the routing method, both card emulation and P2P applications can be used normally.

According to a first aspect, an embodiment of the present invention provides a method for routing a data frame, where the method is applied to a first terminal, the first terminal includes a device host DH and a near field communication controller NFCC, a first routing mechanism in the first terminal is in an enabled state, and the method includes:

receiving, by the NFCC, a data frame sent by a second terminal;

if a currently activated radio frequency RF protocol is a first RF protocol, processing, by the NFCC, the data frame according to a first preset rule; and if the currently activated RF protocol is a second RF protocol, routing, by the NFCC, the data frame according to the first routing mechanism; where the first RF protocol includes the Near Field Communication Data Exchange Protocol NFC-DEP, and the second RF protocol includes a non NFC-DEP protocol.

Specifically, when the first terminal performs near field communication with the second terminal, the NFCC of the first terminal may receive, by using an antenna, the data frame sent by the second terminal. After obtaining the data frame, the NFCC may process the data frame according to a type of the currently activated RF protocol, and use different processing modes for different RF protocol types. For example, if the currently activated radio frequency RF protocol is the first RF protocol, that is, the data frame is data of a peer-to-peer P2P application, the NFCC processes the data frame according to the first preset rule; if the currently activated RF protocol is the second RF protocol, that is, the data frame is data of a non P2P application, for example, data of a card emulation application, the NFCC routes the data frame according to the first routing mechanism.

Therefore, in this embodiment of the present invention, by using different data frame processing modes for different RF protocol types corresponding to received data frames, a P2P application on another entity (such as the DH) can be normally used when a specific NFCEE (also referred to as a first NFCEE, for example, a standalone SE) is enabled.

It should be noted that, the specific NFCEE may be an NFCEE that is directly connected to the NFCC or is located in the NFCC. For example, the specific NFCEE may be a standalone SE, and this embodiment of the present invention is not limited thereto.

In this embodiment of the present invention, the first RF protocol may further include other protocols, as long as a data type corresponding to the first RF protocol is P2P application data, that is, as long as the first RF protocol is a radio frequency protocol used when two NFC terminals perform P2P communication. This embodiment of the present invention is not limited to the NFC-DEP protocol. The second RF protocol may include the ISO Data Exchange Protocol (ISO-DEP, ISO Data Exchange Protocol), the Type 1 Tag (T1T, Type 1 Tag) protocol, the Type 2 Tag (T2T, Type 2 Tag) protocol, the Type 3 Tag (T3T, Type 3 Tag) protocol, or the Type 5 Tag (T5T, Type 5 Tag) protocol.

With reference to the first aspect, in a first implementation of the first aspect, the processing, by the NFCC, the data frame according to a first preset rule includes:

routing, by the NFCC, the data frame according to a second routing mechanism; or forwarding, by the NFCC, the data frame to the DH.

That is, when the currently activated radio frequency RF protocol is the NFC-DEP protocol, the NFCC may determine that the data frame is P2P application data. Because only the DH may support the P2P mode, the NFCC may directly forward the data frame to the DH.

In this way, P2P data can be routed to a correct entity, and further forwarded to a correct application for processing, that is, the P2P application can be used normally. Therefore, a problem that a P2P application on another entity (such as a DH) cannot be used normally when a specific NFCEE (such as a standalone SE) is enabled in the prior art is resolved, and both the card emulation application and the P2P application can be used normally in this case.

With reference to the first aspect and the foregoing implementation of the first aspect, in another implementation of the first aspect, the processing, by the NFCC, the data frame according to a first preset rule includes:

if a currently activated RF interface is a Near Field Communication Data Exchange Protocol radio frequency NFC-DEP RF interface, routing, by the NFCC, the data frame according to the second routing mechanism; or if a currently activated RF interface is a frame radio frequency frame RF interface, forwarding, by the NFCC, the data frame to the DH.

That is, when the currently activated radio frequency RF protocol is the NFC-DEP protocol, different routing may be performed according to currently activated different RF interfaces.

With reference to the first aspect and the foregoing implementation of the first aspect, in another implementation of the first aspect, the second routing mechanism includes a protocol-based route selection mechanism or a listen mode routing listen mode routing mechanism.

It should be understood that, in this embodiment of the present invention, the second routing mechanism may include the listen mode routing listen mode routing mechanism and a protocol-based routing entry mode, where the protocol-based routing entry mode includes the protocol-based route selection mechanism. However, this embodiment of the present invention is not limited to the listen mode routing mechanism, as long as the second routing mechanism can implement similar functions and route P2P data to a correct entity.

For example, the second routing mechanism may include a listen mode routing mechanism (listen mode routing) defined in the NCI specification, that is, the first terminal searches for a route target according to a listen mode routing table (listen mode routing table), where the listen mode routing table may include at least one of an AID-based routing entry (AID-based routing entry), an APDU pattern-based routing entry (APDU Pattern-based routing entry), an SC-based routing entry (System Code-based routing entry), a protocol-based routing entry (Protocol-based routing entry), or a technology-based routing entry (Technology-based routing entry).

With reference to the first aspect and the foregoing implementation of the first aspect, in another implementation of the first aspect, the first RF protocol is activated by the NFCC by sending, to the second terminal after the NFCC determines that a received RF protocol activation command is a first activation command, a response for responding to the first activation command.

Specifically, in a listen mode, the NFCC receives an RF protocol activation command sent by the second terminal, where the RF protocol activation command may be the first activation command or a second activation command, the first activation command is used to activate the first RF protocol, and the second activation command is used to activate the second RF protocol.

In this embodiment, the NFCC may determine a type of the RF protocol activation command, and in a specific implementation, may determine whether the RF protocol activation command is the first activation command (such as ATR_REQ defined in the Digital protocol), or may determine whether the RF protocol activation command is the second activation command (such as an RATS command or an ATTRIB command defined in the Digital protocol).

If the RF protocol activation command is the first activation command, the NFCC sends, to the second terminal, the response (such as ATR_RES defined in the Digital protocol) for responding to the first activation command, so as to activate the first RF protocol (such as the NFC-DEP protocol). Specifically, the NFCC may send, to the second terminal according to a type of a mapped RF interface configured by the DH for the first RF protocol, the response for responding to the first activation command, so as to activate the first RF protocol.

It should be noted that, when the RF protocol activation command is the second activation command, the NFCC may send, to the second terminal, a response for responding to the second activation command, so as to activate the second RF protocol. Afterward, the NFCC receives the data frame sent by the second terminal. Specifically, when the NFCC receives the RF protocol activation command, if it is determined that the first routing mechanism (such as forced NFCEE routing) is enabled (namely, enabled), and a bit value corresponding to a current power state (current power state) in a power state (such as a forced power state) field configured by the DH for the routing mechanism is a preset value (such as 1), the NFCC may directly send a response (such as RATS Response or ATTRIB Response defined in the Digital protocol) to the second terminal.

When the RF protocol activation command is the second activation command, the NFCC may also not respond or may send an error response to the peer. In this case, the NFC communication is terminated, and the second terminal does not send the data frame to the NFCC. Specifically, when the NFCC receives the RF protocol activation command, if it is determined that the first routing mechanism (such as forced NFCEE routing) is enabled (namely, enabled), and the bit value corresponding to the current power state (current power state) in a power state (such as the forced power state) octet configured by the DH for the routing mechanism is a preset value (such as 0), the NFCC may not respond or may directly send an error response to the second terminal.

With reference to the first aspect and the foregoing implementation of the first aspect, in another implementation of the first aspect, a mapped RF interface configured by the DH for the first RF protocol includes the NFC-DEP RF interface or the frame RF interface, and the sending, by the NFCC, to the second terminal, a response for responding to the first activation command includes:

if the mapped RF interface is the NFC-DEP RF interface, directly sending, by the NFCC, to the second terminal, the response for responding to the first activation command; or if the mapped RF interface is the frame RF interface, forwarding, by the NFCC, the first activation command to the DH, and sending, to the second terminal, a response that is sent by the DH and used for responding to the first activation command.

It should be noted that, a radio frequency interface (RF Interface) is a logical entity including some protocol logic, such as an ISO-DEP RF interface or an NFC-DEP RF interface defined in the NCI specification, or a logical entity having a transparent transmission capability, such as a frame RF interface.

The DH may perform RF communication with a peer NFC device by using the RF interface. In an architecture of the RF interface defined in the NCI specification, functions below the RF interface are executed by the NFCC, and functions above the RF interface are executed by the DH. Therefore, if the RF interface is lower, less function logic is executed by the NFCC, and fewer RF parameters need to be configured for the NFCC. The RF parameters may include parameters configured for different RF technologies and parameters configured for different RF protocols, or may include route related data configured for data frame processing, or the like. For details, refer to the NCI specification. Details are not described herein.

With reference to the first aspect and the foregoing implementation of the first aspect, in another implementation of the first aspect, the method further includes:

determining, by the NFCC, that a bit value corresponding to a current power state in a power state field configured by the DH for the first routing mechanism is a first preset value, where the first preset value is used to indicate that the first routing mechanism is available in the current power state, and the bit value of the current power state is preconfigured by the DH for the NFCC.

Specifically, the NFCC determines that the bit value corresponding to the current power state (current power state) in the power state (forced power state) field configured by the DH for the first routing mechanism (such as forced NFCEE routing) is the first preset value.

For example, the first preset value is 0 b, that is, after the NFCC determines that the bit corresponding to the current power state is 0 b, the NFCC performs different processing according to the type of the RF protocol activation command. For example, when the RF protocol activation command is the first activation command, the NFCC sends, to the second terminal according to a type of the mapped RF interface configured by the DH for the first RF protocol, the response for responding to the first activation command, so as to activate the first RF protocol. When the RF protocol activation command is the second activation command, the NFCC may not respond or may send an error response to the peer. In this case, the NFC communication is terminated, and the second terminal does not send data to the NFCC.

With reference to the first aspect and the foregoing implementation of the first aspect, in another implementation of the first aspect, when an activated RF interface is an NFC-DEP RF interface, the currently activated RF protocol is the first RF protocol; or when a format of the data frame is a Near Field Communication Data Exchange Protocol frame format NFC-DEP frame format, the currently activated RF protocol is the first RF protocol; or when an RF protocol activation command received in an RF protocol activation phase is an attribute request ATR_REQ command, the currently activated RF protocol is the first RF protocol.

With reference to the first aspect and the foregoing implementation of the first aspect, in another implementation of the first aspect, the NFCC determines that a bit value corresponding to a current power state in a power state field configured by the DH for the first routing mechanism is a second preset value. The second preset value is used to indicate that the first routing mechanism is unavailable in the current power state. The bit value of the current power state is preconfigured by the DH for the NFCC.

For example, the second preset value may be 1 b, that is, after the NFCC determines that the bit of the current power state is 1 b, the NFCC performs different processing according to the type of the RF protocol activation command. For example, when the RF protocol activation command is the first activation command, the NFCC sends, to the second terminal, the response for responding to the first activation command, so as to activate the first RF protocol; when the RF protocol activation command is the second activation command, the NFCC sends, to the second terminal, the response for responding to the second activation command, so as to activate the second RF protocol. Certainly, how to respond to the second terminal may also be determined according to the RF interface mapped to the RF protocol corresponding to the RF protocol activation command. Details are described above, and are not described again herein.

With reference to the first aspect and the foregoing implementation of the first aspect, in another implementation of the first aspect, the method further includes:

receiving, by the NFCC, the first routing mechanism that is configured by the DH for the NFCC after the DH learns information about a first NFCEE from the NFCC, where the information about the first NFCEE is reported to the DH when the NFCC performs NFCEE discovery, or is fed back to the DH after the NFCC receives a request of the DH, and the information about the first NFCEE includes at least information indicating that the first NFCEE is a standalone secure element standalone SE.

With reference to the first aspect and the foregoing implementation of the first aspect, in another implementation of the first aspect, the first routing mechanism is a forced near field communication execution environment routing forced NFCEE routing mechanism, and the first NFCEE is a forced near field communication execution environment forced NFCEE.

With reference to the first aspect and the foregoing implementation of the first aspect, in another implementation of the first aspect, the method further includes:

receiving, by the NFCC, RF parameters configured by the DH for an application that complies with the NFC-DEP protocol on the DH, and receiving RF parameters configured by the first NFCEE for an application that complies with the non NFC-DEP protocol in the first NFCEE.

In other words, before radio frequency discovery, that is, before the NFCC obtains the RF protocol activation command, specifically, in an NFCC initialization phase, the NFCC receives the RF parameters configured by the DH.

With reference to the first aspect and the foregoing implementation of the first aspect, in another implementation of the first aspect, the non NFC-DEP protocol includes the ISO-DEP protocol, the Type 1 Tag T1T protocol, the Type 2 Tag T2T protocol, the Type 3 Tag T3T protocol, or the Type 5 Tag T5T protocol.

According to a second aspect, a method for routing a data frame is provided, where the method is applied to a first terminal, the first terminal includes a device host DH and a near field communication controller NFCC, and the method includes:

determining, by the NFCC, whether first information configured by the DH for the NFCC is preset information, where the preset information is used to indicate that a first routing mechanism is unavailable, and radio frequency RF parameters configured by a specific NFCEE (referred to as a first NFCEE herein) and RF parameters configured by the DH are available;

if the first information is the preset information, using, by the NFCC, the radio frequency RF parameters configured by the first NFCEE and the RF parameters configured by the DH to perform an RF discovery process; and after receiving a data frame sent by a second terminal, processing, by the NFCC, the data frame according to a preset routing mechanism.

Therefore, in this embodiment of the present invention, when the current first information is the preset information, the NFCC uses both the RF parameters configured by the first NFCEE and the RF parameters configured by the DH to perform the RF discovery process. In this way, it is ensured that when a P2P application exists on the DH of the first terminal and a non P2P application exists in the first NFCEE, the RF discovery process may allow the peer second terminal to discover the local P2P application and the non P2P application (that is, discover a first RF protocol corresponding to the local P2P application and a second RF protocol corresponding to the non P2P application), so that the second terminal activates a corresponding RF protocol (such as the NFC-DEP protocol or a non NFC-DEP protocol) according to a service requirement; in a data exchange phase after the RF protocol activation, that is, after the data frame sent by the second terminal is received, the data frame is processed according to a preset routing rule. This resolves a problem that a P2P service on a DH is unavailable because an RF protocol (such as the NFC-DEP protocol) corresponding to a P2P application on the DH cannot be detected by a peer by performing an RF discovery process when some specific NFCEEs (such as a standalone SE) are enabled in the prior art.

The preset information is used to indicate that the first routing mechanism is unavailable, and the radio frequency RF parameters configured by the specific NFCEE (referred to as the first NFCEE herein) and the RF parameters configured by the DH are available.

For example, the first information may be a forced NFCEE routing state, the first routing mechanism may be a forced NFCEE routing mechanism, and the first NFCEE may be a forced NFCEE in the forced NFCEE routing mechanism.

It should be noted that, the first information is not limited to the forced NFCEE routing state, and may also be other information configured by the DH. For example, the DH configures the first information for the NFCC by using another command, where the first information is used to instruct the NFCC to use, in the RF discovery process, the RF parameters configured by the specific NFCEE and the DH, and instruct the NFCC not to use the first routing mechanism in the data exchange phase to search for a route target for the data frame, but to use the foregoing second routing mechanism (such as a listen mode routing mechanism, or a protocol-based routing entry mode or a technology-based routing entry mode) or another mechanism to search for the route target. The another mechanism directly forwards the data frame to the DH if it is found that the received data frame is NFC-DEP protocol data, or directly forwards the data frame to the first NFCEE if it is found that the received data frame is non NFC-DEP protocol (such as the ISO-DEP protocol, or the T1T/T2T/T3T/T5T protocol) data. In summary, a manner of configuring the first information is not limited in the present invention.

It should be understood that, the RF discovery process is a process in which the NFCC notifies the second terminal of all RF protocols supported on the first terminal, so that the second terminal sends a corresponding data frame to the first terminal according to one of all the RF protocols. The one of all the RF protocols includes the NFC-DEP protocol or the non NFC-DEP protocol.

Alternatively, the RF protocol corresponding to the data frame sent by the second terminal and received by the NFCC is one of all the RF protocols supported by the first terminal and detected by the second terminal by performing an RF sending process. The RF protocol corresponding to the data frame includes the NFC-DEP protocol or the non NFC-DEP protocol.

In this embodiment of the present invention, the P2P application on the DH in the first terminal may support the NFC-DEP protocol, and the non P2P application (such as a card emulation application or an NFC tag) in the first NFCEE may support the non NFC-DEP protocol.

With reference to the second aspect and the foregoing implementation of the second aspect, in another implementation of the second aspect, the processing the data frame according to a preset routing mechanism includes:

when an activated RF protocol is the Near Field Communication Data Exchange Protocol NFC-DEP, routing, by the NFCC, the data frame according to a protocol-based route selection mechanism, or forwarding, by the NFCC, the data frame to the DH; or when an activated RF protocol is a non NFC-DEP protocol, routing, by the NFCC, the data frame according to a protocol-based route selection mechanism or a technology-based route selection mechanism, or forwarding, by the NFCC, the data frame to the first NFCEE.

In this embodiment of the present invention, when the currently activated RF protocol is a non NFC-NEP protocol, the NFCC searches for the route target by using the second routing mechanism, and forwards the data frame to the route target, where the route target is the DH or the forced NFCEE. When the currently activated RF protocol is the NFC-DEP protocol, the NFCC forwards the data frame to the DH. This resolves a problem that a P2P service on a DH is unavailable because the NFC-DEP protocol supported by the DH cannot be detected by a peer by performing an RF discovery process when some specific NFCEEs are (such as a standalone SE) enabled in the prior art.

With reference to the second aspect and the foregoing implementation of the second aspect, in another implementation of the second aspect, a protocol-based routing entry corresponding to the protocol-based route selection mechanism includes at least an NFC-DEP protocol-based routing entry pointing to the DH, and a non NFC-DEP protocol-based routing entry pointing to the first NFCEE; or a protocol-based routing entry corresponding to the protocol-based route selection mechanism includes at least an NFC-DEP protocol-based routing entry pointing to the DH, and a technology-based routing entry corresponding to the technology-based route selection mechanism includes at least a routing entry based on a first RF technology and pointing to the first NFCEE, where the first RF technology includes at least one of an NFC-A technology, an NFC-B technology, an NFC-F technology, or an NFC-V technology.

With reference to the second aspect and the foregoing implementation of the second aspect, in another implementation of the second aspect, the processing the data frame according to a preset routing mechanism includes:

routing, by the NFCC, the data frame according to a second routing mechanism, where the second routing mechanism includes a listen mode routing listen mode routing mechanism.

With reference to the second aspect and the foregoing implementation of the second aspect, in another implementation of the second aspect, a routing table configured by the DH for the second routing mechanism includes at least an NFC-DEP protocol-based routing entry pointing to the DH, or a routing entry based on a first RF technology and pointing to the DH, where the first RF technology includes at least one of an NFC-A technology or an NFC-F technology.

With reference to the second aspect and the foregoing implementation of the second aspect, in another implementation of the second aspect, when the routing table includes the NFC-DEP protocol-based routing entry pointing to the DH, the routing table further includes a non NFC-DEP protocol-based routing entry pointing to the first NFCEE, and/or a routing entry based on a second RF technology and pointing to the first NFCEE, where the second RF technology includes at least one of the NFC-A technology, an NFC-B technology, the NFC-F technology, or an NFC-V technology; or when the routing table includes the routing entry based on the first RF technology and pointing to the DH, the routing table further includes a non NFC-DEP protocol-based routing entry pointing to the first NFCEE, and/or a routing entry based on a third RF technology and pointing to the first NFCEE, where the third RF technology includes at least one of the NFC-A technology, an NFC-B technology, the NFC-F technology, or an NFC-V technology except the first RF technology.

Specifically, with respect to a configuration of the listen mode routing table, if the DH configures the NFC-DEP protocol-based routing entry pointing to the DH, the DH may configure, according to an RF protocol type (such as the ISO-DEP protocol, or the T1T/T2T/T3T/T5T protocol) or an RF technology type (such as NFC-A/NFC-B/NFC-F/NFC-V) supported by a contactless application in the first NFCEE (such as a standalone SE), a corresponding protocol-based routing entry or technology-based routing entry pointing to the standalone SE. Alternatively, if the DH configures, according to an RF technology type (such as NFC-A/NFC-F) supported by the P2P service, a corresponding technology-based routing entry pointing to the DH, the DH may configure, according to an RF protocol type or an RF technology type supported by a contactless application in the first NFCEE, a corresponding protocol-based routing entry or technology-based routing entry pointing to a standalone SE. In this case, the configured technology-based routing entry pointing to the NFCEE and the technology-based routing entry pointing to the DH cannot be based on a same RF technology. For example, if the P2P service on the DH supports NFC-A and NFC-F technologies, and the contactless application in the NFCEE supports the NFC-A technology, the DH may set a routing entry based on the NFC-A technology (namely, an NFC-A technology-based routing entry) pointing to the NFCEE, and set a routing entry based on the NFC-F technology (namely, an NFC-F technology-based routing entry) pointing to the DH. Other setting modes are not enumerated exhaustively herein.

With respect to configurations of RF parameters, if a P2P application exists on the DH, the DH configures parameters (including a poll side and a listen side) related to the NFC-A technology and/or the NFC-F technology and parameters (including a poll side and a listen side) related to the NFC-DEP protocol for the NFCC; if a contactless application exists on a standalone SE, the standalone SE configures parameters (listen side) of a corresponding RF technology and parameters (listen side) related to a corresponding RF protocol for the NFCC. When the RF technology supported by the application on the standalone SE includes NFC-A and/or NFC-F, the NFCC may replace, by using RF technology parameters corresponding to a card application on the standalone SE, RF technology parameters corresponding to the P2P application on the DH, or may combine RF technology parameters instead of replacement. For RF parameter management, refer to corresponding descriptions in specific implementations in this document. Details are not described herein.

With reference to the second aspect and the foregoing implementation of the second aspect, in another implementation of the second aspect, the method further includes:

sending, by the NFCC, information about the first NFCEE to the DH, where the information about the first NFCEE is reported to the DH when the NFCC performs NFCEE discovery, or is fed back to the DH when the NFCC receives a request of the DH; and the information about the first NFCEE includes that the first NFCEE is a standalone secure element standalone SE, and/or an RF protocol type or an RF technology type supported by an application in the first NFCEE.

The preset information and/or routing table described above may be configured by the DH for the NFCC according to the information about the first NFCEE.

For example, when a standalone SE exists on the first terminal and the SE is enabled, the NFCC may obtain information about the SE by performing an NFCEE discovery process, and then report the information about the SE to the DH by using NFCEE_DISCOVER_NTF.

With reference to the second aspect and the foregoing implementation of the second aspect, in another implementation of the second aspect, the method further includes:

receiving, by the NFCC, RF parameters configured by the DH for an application that complies with the NFC-DEP protocol on the DH, and receiving RF parameters configured by the first NFCEE for an application that complies with the non NFC-DEP protocol in the first NFCEE.

With reference to the second aspect and the foregoing implementation of the second aspect, in another implementation of the second aspect, if the first information is not the preset information, the method further includes:

when the first information is used to indicate that the first routing mechanism is unavailable, and the NFCC uses only the RF parameters configured by the DH, using, by the NFCC, the RF parameters configured by the DH to perform the RF discovery process; and after the NFCC receives the data frame sent by the second terminal, routing, by the NFCC, the data frame according to the second routing mechanism, where the second routing mechanism includes the listen mode routing listen mode routing mechanism.

That is, if the first information is a non preset value, for example, 0, and the non preset value indicates that the NFCC is allowed to use only the RF parameters configured by the DH, the NFCC completes the RF discovery process by using the RF parameters configured by the DH, and then searches for the route target according to the listen mode routing table after receiving the data frame, so as to route the data frame.

With reference to the second aspect and the foregoing implementation of the second aspect, in another implementation of the second aspect, if the first information is not the preset information, the method further includes:

when the first information is used to indicate that the first routing mechanism is available, and the NFCC uses only the RF parameters configured by the first NFCEE, using, by the NFCC, the RF parameters configured by the first NFCEE to perform the RF discovery process; and after the NFCC receives the data frame sent by the second terminal, routing, by the NFCC, the data frame according to the first routing mechanism.

With reference to the second aspect and the foregoing implementation of the second aspect, in another implementation of the second aspect, the first routing mechanism is a forced near field communication execution environment routing forced NFCEE routing mechanism.

That is, if the first information is a non preset value, for example, 1, and the non preset value indicates that the NFCC is allowed to use only the RF parameters configured by the first NFCEE, the NFCC completes the RF discovery process by using the RF parameters configured by the first NFCEE, and then determines the first NFCEE as the route target according to the forced NFCEE routing mechanism after receiving the data frame, so as to route the data frame.

According to a third aspect, an embodiment of the present invention provides a method for routing a data frame, where the method is applied to a first terminal, the first terminal includes a device host DH and a near field communication controller NFCC, a first routing mechanism in the first terminal is in an enabled state, and the method includes:

receiving, by the NFCC, an RF protocol activation command sent by a second terminal;

if the RF protocol activation command is a first activation command, sending, by the NFCC, to the second terminal, a response for responding to the first activation command, where the first activation command is used to activate a first RF protocol, and the first RF protocol includes the Near Field Communication Data Exchange Protocol NFC-DEP; and after the NFCC receives a data frame sent by the second terminal, processing, by the NFCC, the data frame according to a first preset rule.

Specifically, in a listen mode, the NFCC receives the RF protocol activation command sent by the second terminal, where the RF protocol activation command may be the first activation command or a second activation command. The first activation command is used to activate the first RF protocol. For example, the first activation command may be ATR_REQ. The second activation command may be an RATS or ATTRIB command (Command) used to activate the ISO-DEP protocol. In this embodiment, the NFCC may determine a type of the RF protocol activation command, and in a specific implementation, may determine whether the RF protocol activation command is the first activation command, or may determine whether the RF protocol activation command is the second activation command. If the RF protocol activation command is the first activation command, the NFCC sends, to the second terminal, the response (such as ATR_RES defined in the Digital protocol) for responding to the first activation command, so as to activate the first RF protocol. After the NFCC receives the data frame (for example, a data frame of a P2P application) sent by the second terminal, the NFCC processes the data frame according to the first preset rule.

Specifically, in this embodiment of the present invention, when the NFCC determines that the first routing mechanism is enabled but is unavailable in a current power state, if the received RF protocol activation command is the first activation command, the NFCC sends, to the second terminal, the response for responding to the first activation command, so as to activate the first RF protocol; if the received RF protocol activation command is not the first activation command, that is, it is the second activation command, the NFCC does not respond or sends an error response to the second terminal. In this embodiment of the present invention, the first RF protocol may further include other protocols, as long as a data type corresponding to the first RF protocol is P2P application data. This embodiment of the present invention is not limited to the NFC-DEP protocol. A second RF protocol may include the ISO Data Exchange Protocol (ISO-DEP, ISO Data Exchange Protocol), the Type 1 Tag (T1T, Type 1 Tag) protocol, the Type 2 Tag (T2T, Type 2 Tag) protocol, the Type 3 Tag (T3T, Type 3 Tag) protocol, or the Type 5 Tag (T5T, Type 5 Tag) protocol.

With reference to the third aspect, in an implementation of the third aspect, the method further includes: determining, by the NFCC, that a bit value corresponding to a current power state in a power state field configured by the DH for the first routing mechanism is a first preset value. The first preset value is used to indicate that the first routing mechanism is unavailable in the corresponding current power state in the configured power state field.

Specifically, in the listen mode, for example, the first preset value is 0, that is, after the NFCC determines that the bit corresponding to the current power state is 0, the NFCC performs different processing according to the type of the RF protocol activation command.

Therefore, in this embodiment of the present invention, when the first routing mechanism is in the enabled state but is unavailable in the current power state, after the received RF protocol activation command is determined as the first activation command, the response for responding to the first activation command may be sent to the second terminal, so as to activate the first protocol (for example, the NFC-DEP protocol). In addition, after receiving the data frame sent by the second terminal, the NFCC processes the data frame according to the first preset rule. Therefore, when the first routing mechanism is enabled, the P2P application is normally used, and a problem that P2P communication cannot be performed because an RF protocol required for P2P communication cannot be activated when the first routing mechanism is in an enabled state but is unavailable in a current power state in the prior art is resolved.

With reference to the third aspect and the foregoing implementation of the third aspect, in another implementation of the third aspect, a mapped RF interface configured by the DH for the first RF protocol includes an NFC-DEP RF interface or a frame RF interface, and the sending, by the NFCC, to the second terminal, a response for responding to the first activation command includes:

if the mapped RF interface is the NFC-DEP RF interface, directly sending, by the NFCC, to the second terminal, the response for responding to the first activation command; or if the mapped RF interface is the frame RF interface, forwarding, by the NFCC, the first activation command to the DH, and sending, to the second terminal, a response that is sent by the DH and used for responding to the first activation command.

That is, the NFCC may send, to the second terminal according to a type of the mapped RF interface configured by the DH for the first RF protocol, the response for responding to the first activation command, so as to activate the first RF protocol. Specifically, in the listen mode, the NFCC receives the RF protocol activation command sent by the second terminal, where the RF protocol activation command may be the first activation command or the second activation command, and the first activation command is used to activate the first RF protocol. If the RF protocol activation command is the first activation command, the NFCC sends, to the second terminal, the response (such as ATR_RES defined in the Digital protocol) for responding to the first activation command, so as to activate the first RF protocol. Specifically, the NFCC may send, to the second terminal, according to the type of the mapped RF interface configured by the DH for the first RF protocol, the response for responding to the first activation command, so as to activate the first RF protocol.

It should be noted that, the NFCC may also send, to the second terminal according to a type of a default RF interface mapped to the first RF protocol, the response for responding to the first activation command. Specifically, because the default RF interface of the NFCC, mapped to the first RF protocol (such as the NFC-DEP protocol), is a first RF interface (such as the NFC-DEP RF interface), the NFCC may directly send, to the second terminal, the response (namely, ATR_RES) for responding to the first activation command.

With reference to the third aspect and the foregoing implementation of the third aspect, in another implementation of the third aspect, the method further includes:

when the RF protocol activation command is a second activation command, sending, by the NFCC, no response, or sending an error response to the second terminal.

Specifically, when the RF protocol activation command is the second activation command, the NFCC may also not respond or may send an error response to the peer. In this case, the NFC communication is terminated, and the second terminal does not send the data frame to the NFCC. Specifically, when the NFCC receives the RF protocol activation command, if it is determined that the first routing mechanism (such as forced NFCEE routing) is enabled (namely, enabled), but the first routing mechanism is unavailable in the current power state (for example, the bit value corresponding to the current power state (current power state) in a power state (such as a forced power state) octet configured by the DH for the routing mechanism is 0 b), the NFCC may not respond or may directly send an error response to the second terminal.

With reference to the third aspect and the foregoing implementation of the third aspect, in another implementation of the third aspect, the processing, by the NFCC, the data frame according to a first preset rule includes:

routing, by the NFCC, the data frame according to a second routing mechanism; or forwarding, by the NFCC, the data frame to the DH.

With reference to the third aspect and the foregoing implementation of the third aspect, in another implementation of the third aspect, the processing, by the NFCC, the data frame according to a first preset rule includes:

if a currently activated RF interface is a Near Field Communication Data Exchange Protocol radio frequency NFC-DEP RF interface, routing, by the NFCC, the data frame according to the second routing mechanism; or if a currently activated RF interface is a frame radio frequency frame RF interface, forwarding, by the NFCC, the data frame to the DH.

In this embodiment of the present invention, for the process of processing the data frame according to the first preset rule, refer to corresponding descriptions about the first aspect. To avoid repetition, details are not described again herein.

With reference to the third aspect and the foregoing implementation of the third aspect, in another implementation of the third aspect, the second routing mechanism includes a protocol-based route selection mechanism or a listen mode routing listen mode routing mechanism.

In this embodiment of the present invention, for descriptions about the second routing mechanism, refer to descriptions about the first aspect. To avoid repetition, details are not described again herein.

With reference to the third aspect and the foregoing implementation of the third aspect, in another implementation of the third aspect, the method further includes:

receiving, by the NFCC, the first routing mechanism that is configured by the DH for the NFCC after the DH learns information about a first NFCEE from the NFCC, where the information about the first NFCEE is reported to the DH when the NFCC performs NFCEE discovery, or is fed back to the DH after the NFCC receives a request of the DH, and the information about the first NFCEE includes at least information indicating that the first NFCEE is a standalone secure element standalone SE.

With reference to the third aspect and the foregoing implementation of the third aspect, in another implementation of the third aspect, the first routing mechanism is a forced near field communication execution environment routing forced NFCEE routing mechanism.

With reference to the third aspect and the foregoing implementation of the third aspect, in another implementation of the third aspect, the method further includes:

receiving, by the NFCC, RF parameters configured by the DH for an application that complies with the NFC-DEP protocol on the DH, and receiving RF parameters configured by the first NFCEE for an application that complies with a non NFC-DEP protocol in the first NFCEE.

In this embodiment of the present invention, for the definition of the first route, the configuration of the first routing mechanism, and descriptions about the manners in which the NFCC obtains the RF parameters configured for the application that complies with the NFC-DEP protocol and the RF parameters configured for the application that complies with the non NFC-DEP protocol in the first NFCEE, refer to corresponding descriptions about the first aspect. To avoid repetition, details are not described again herein.

According to a fourth aspect, a near field communication controller NFCC is provided, where the NFCC can implement any one of the first aspect, the second aspect, or the third aspect, and the implementations thereof, and an operation and/or a function of each module in the NFCC are/is used to implement a corresponding method feature in the first aspect, the second aspect, or the third aspect, and the implementations thereof. For brevity, details are not described again herein.

According to a fifth aspect, a device for routing a data frame is provided, where the device includes a processor and a memory storing an instruction. The processor executes the instruction to perform the method for routing a data frame according to any one of the first aspect, the second aspect, or the third aspect, and the implementations thereof.

According to a sixth aspect, a processing apparatus is provided, where the processing apparatus is applied to a communications system. The processing apparatus may be one or more processors or chips. In other possible cases, the processing apparatus may also be a physical apparatus or a virtual apparatus in the communications system. The processing apparatus is configured to perform the method for routing a data frame according to any one of the first aspect, the second aspect, or the third aspect, and the implementations thereof.

According to a seventh aspect, a computer program product is provided. The computer program product includes computer program code. When a computing unit, a processing unit, or a processor of a communications device runs the computer program code, the communications device performs the method for routing a data frame according to any one of the first aspect, the second aspect, or the third aspect, and the implementations thereof.

According to an eighth aspect, a computer-readable storage medium is provided. The computer-readable storage medium stores a program. The program enables a communications device to perform the method for routing a data frame according to any one of the first aspect, the second aspect, or the third aspect, and the implementations thereof.

According to a ninth aspect, a near field communication NFC terminal is provided. The terminal includes the NFCC and the DH according to the first aspect, the second aspect, or the third aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
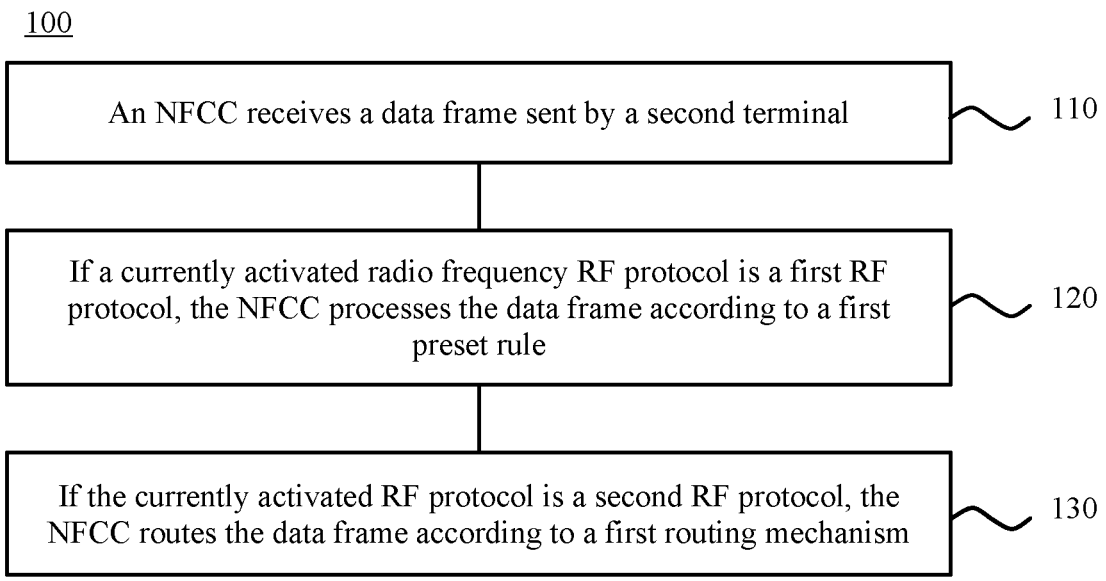
FIG. 1 is a schematic flowchart of a method for routing a data frame according to an embodiment of the present invention.

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, terminals in the embodiments of the present invention can support an NFC function (collectively referred to as NFC terminals hereinafter). For example, a terminal may include user equipment (UE, User Equipment), and specifically, may include but is not limited to a mobile station (MS, Mobile Station), a mobile terminal (Mobile Terminal), a mobile phone (Mobile Telephone), a mobile phone (handset), portable equipment (portable equipment), or the like. The user equipment may communicate with one or more core networks by using a radio access network (RAN, Radio Access Network). For example, the user equipment may be a mobile phone (or referred to as a "cellular" phone), or a computer having a wireless communication function. The terminal in the embodiments of the present invention may also be a portable, pocket-sized, handheld, computer built-in or vehicle-mounted mobile apparatus. The embodiments of the present invention are not limited thereto, as long as the terminal in the embodiments of the present invention supports the NFC function.

To help understand the embodiments of the present invention, first, some related technologies in descriptions of the embodiments of the present invention are described.

By performing NFC communication, a user can implement operations such as visual, secure, and contactless information exchange, content exchange, and transactions only by touching or moving a device close to another device.

NFC works at a 13.56 MHz frequency, and supports rates such as 106 kbit/s, 212 kbit/s, 424 kbit/s, and 848 kbit/s. A valid range of communication is 0 to 20 cm. NFC adds a peer-to-peer (P2P, Peer-to-Peer) communication function on a basis of an RFID technology. Devices of two parties in P2P communication are equivalent, but devices of two parties in RFID communication have a primary-secondary relationship.

An NFC terminal works in three modes (from a perspective of a role of the NFC terminal in an NFC communication process): a card emulation (CE, Card Emulation) mode, a reader/writer (R/W, Reader/Writer) mode, and a peer-to-peer (P2P, Peer-to-Peer) mode.

CE mode: A device having the NFC function is emulated as a contactless card or an NFC tag (Tag). The CE mode is used in a scenario of identity authentication or mobile payment such as a bank card, a traffic card, a membership card, a coupon, or an identity card. In this mode, even if a mobile device has no power or is switched off, use of the mobile device as a card is not affected.

R/W mode: A mobile phone having the NFC function plays a role of a reader/writer, and can read data from an NFC tag or a card. The R/W mode is used in a scenario of identity authentication or mobile payment such as a bank card POS or a traffic POS, and a scenario of a tag reader/writer.

P2P mode: Two terminals having the NFC function may establish a peer-to-peer communications link with each other, and then perform data exchange. The P2P mode is used in a scenario of contact card sharing, web page sharing, Bluetooth pairing through NFC, or wifi.

When communicating with another NFC terminal, an NFC terminal may work in two modes according to whether a command or a response is sent.

Poll mode (Poll Mode): This mode is used when an NFC terminal sends a command to another NFC terminal at a peer end, and receives a response returned by the another NFC terminal.

Listen mode (Listen Mode): This mode is used when an NFC terminal receives a command sent by another NFC terminal at a peer end, and returns a response to the another NFC terminal.

Currently, when an NFC terminal works in the CE mode and acts as a contactless card (namely, a card emulation application) or an NFC tag, only the listen mode can be used, and the NFC terminal is used as a listen-side (listen side) terminal; when the NFC terminal works in the R/W mode and acts as a reader/writer, only the poll mode can be used, and the NFC terminal is used as a poll-side (Poll side) terminal; when the NFC terminal works in the P2P mode, the poll mode or the listen mode may be used. Specifically, when the NFC terminal acts as an initiator (initiator), the poll mode is used; when the NFC terminal acts as a target (target), the listen mode is used.

NFC communication includes four phases: technology detection, conflict detection, device activation (namely, protocol activation), data exchange, and device release (namely, protocol deactivation). Correspondingly, in the NCI specification, after NFCC resetting, NFCC initialization, and NFCC configuration, mainly the following phases exist: radio frequency discovery (RF discovery, including technology detection and conflict detection), radio frequency interface activation (RF interface activation, which may include protocol activation), data exchange, and radio frequency interface deactivation (RF interface deactivation).

NFC related specifications are mainly defined by the NFC Forum (NFC Forum), ensuring interoperability between NFC devices. As the NFC technology is popularized gradually, the NFC function is integrated with many electronic products, such as a printer, a television, a sound box, a mobile phone, and a camera. The NFC Forum also launches an N-MARK flag used to identify whether a device supports the NFC function.

Currently, the NFC communications standard specifies multiple types of radio frequency RF technologies, such as NFC-A, NFC-B, NFC-F, or NFC-V.

Each RF technology corresponds to a group of standard-defined transmission parameters used for completing communication, for example, an RF carrier, a communication mode, a bit rate, a modulation mode, bit coding, a frame format, a protocol, and a command set. Currently, the four RF technologies covered by NFC all use 13.56 MHz RF carriers, and may correspond to a same RF protocol and a same command set, but use their own modulation modes, bit coding, and frame formats.

Currently, the NFC communications standard defines multiple types of RF protocols, namely, protocols used when communication is performed between two NFC terminals, such as the NFC Data Exchange Protocol (NFC-DEP, NFC Data Exchange Protocol), the ISO Data Exchange Protocol (ISO-DEP, ISO Data Exchange Protocol) (namely, the Type 4 Tag T4T protocol), the Type 1 Tag (T1T, Type 1 Tag) protocol, the Type 2 Tag (T2T, Type 2 Tag) protocol, the Type 3 Tag (T3T, Type 3 Tag) protocol, or the Type 5 Tag (T5T, Type 5 Tag) protocol. The NFC-DEP protocol is a half-duplex transmission protocol (Half-duplex transmission protocol) defined by the NFC Forum based on ISO/IEC 18092; the ISO-DEP protocol is a half-duplex transmission protocol defined by the NFC Forum based on ISO/IEC 14443 and EMV Cless, and the protocol is based on the NFC-A or NFC-B technology; the T1T protocol is the Type 1 Tag Platform specification defined by the NFC Forum based on the type 1 tag of the NFC-A technology; the T2T protocol is the Type 2 Tag Platform specification defined by the NFC Forum based on the type 2 tag of the NFC-A technology; the T3T protocol is the Type 3 Tag Platform specification defined by the NFC Forum based on the type 3 tag of the NFC-F technology; the T5T protocol is the Type 5 Tag Platform specification defined by the NFC Forum based on the type 5 tag of the NFC-V technology; the T4T protocol is the Type 4 Tag Platform specification defined by the NFC Forum based on the type 4 tag of the NFC-A or NFC-B technology. An upper-layer transmission protocol of the protocol may be the ISO-DEP protocol.

Currently, an RF technology may correspond to multiple RF protocols, and one RF protocol may also correspond to multiple RF technologies. Correspondences between RF technologies and RF protocols are shown in the following Table 1.

TABLE 1

Correspondences between RF technologies and RF protocols

| RF technology | RF protocol | | | | | |
|---|---|---|---|---|---|---|
| | T1T | T2T | T3T | ISO-DEP (T4AT/T4BT) | T5T | NFC-DEP |
| NFC-A | ✓ | ✓ | | ✓ | | ✓ |
| NFC-B | | | | ✓ | | |
| NFC-F | | | ✓ | | | ✓ |
| NFC-V | | | | | ✓ | |

Considering problems such as development costs, development cycles, and compatibility between terminal vendors and chip vendors, the NFC Fourm defines the NFC controller interface (NCI, NFC Controller Interface) specification, and defines a set of logical interfaces between a DH and an NFCC, and therefore classifies all logical functions executed by the DH and the NFCC. Currently, the NCI specification defines multiple radio frequency interfaces (RF Interface), namely, logical entities including some protocol logic, such as an ISO-DEP RF interface or an NFC-DEP RF interface defined in the NCI specification, or a logical entity capable of transparent transmission, such as a frame radio frequency interface frame RF interface.

The DH may perform RF communication with another NFC terminal by using an RF interface. In an architecture of the RF interface defined in the NCI specification, functions below the RF interface are executed by the NFCC, and functions above the RF interface are executed by the DH. Therefore, if the RF interface is lower, less function logic is executed by the NFCC, and fewer RF parameters need to be configured for the NFCC. The RF parameters may include parameters configured for different RF technologies, and parameters configured for different RF protocols. For details, refer to the NCI specification. Details are not described herein. In addition, configurations related to RF discovery (such as an RF technology and mode, and a discovery frequency required for the RF discovery), configurations related to routing in a data exchange phase, and the like may be understood as configuration parameters different from the RF parameters, or may be understood as other content covered by the RF parameters. This is not limited in the embodiments of the present invention.

In addition, it should be noted that, the RF interfaces do not necessarily correspond to the RF protocols on a one-to-one basis (referring to the following Table 2). However, the DH can configure a maximum of only one RF interface for each RF protocol when performing an RF interface mapping configuration for the NFCC.

defined by the ETSI. In this case, a host controller (Host Controller) in the HCI may be implemented on the NFCC. The embodiments of the present invention are not limited thereto.

An NFCEE in the embodiments of the present invention is a term used in the NCI specification defined by the NFC Forum. The NFCEE may correspond to a host (Host) such as a universal integrated circuit card (UICC, Universal Integrated Circuit Card), an embedded secure element (eSE, Embedded Secure Element), or a secure digital memory card (SD card, Secure Digital Memory Card) in the HCI specification defined by the ETSI. The NFCEE may also correspond to a secure element (SE, Secure Element) in the specification defined by the GP, or a card emulation environment (CEE, Card Emulation Environment). The embodiments of the present invention are not limited thereto.

A first routing mechanism in the embodiments of the present invention, for example, may be a forced near field communication execution environment routing (forced NFCEE routing) mechanism defined in the NCI protocol. The DH may configure, by using a forced NFCEE routing configuration command (such as RF_SET_FORCED_NF-CEE_ROUTING_CMD), a routing entry pointing to a first NFCEE (for example, one of multiple NFCEEs connected to the NFCC or located in the NFCC) for the NFCC. In this case, the first NFCEE may be referred to as a forced NFCEE. Therefore, the NFCC determines in which power states (power state) a received data frame can be routed to the forced NFCEE. For example, a power state field may be used to specify in which power states the routing mechanism is available, or in which power states the routing mechanism is unavailable. Assuming that one bit in the power state field corresponds to one power state, correspondingly, a bit value

TABLE 2

Correspondences between RF interfaces and RF protocols

| | | RF protocol | | | | | |
|---|---|---|---|---|---|---|---|
| | RF interface | T1T | T2T | T3T | ISO-DEP (T4T) | T5T | NFC-DEP |
| For the poll mode or listen mode | Frame RF interface | ✓ | ✓ | ✓ | ✓ | ✓ | ✓ |
| | ISO-DEP RF interface | | | | ✓ | | |
| | NFC-DEP RF interface | | | | | | ✓ |
| Only for the poll mode | NDEF RF interface | ✓ | ✓ | ✓ | ✓ | ✓ | |

For the NDEF RF interface, the NFCC considers all of the T1T protocol, the T2T protocol, the T3T protocol, the T4T protocol, and the T5T protocol as NDEF RF protocols.

The DH in the embodiments of the present invention is a term used in the NC specification defined by the NFC Forum (NFC Forum). The DH may correspond to a terminal host (Terminal Host) in the HCI specification defined by the European Telecommunications Standards Institute (ETSI, European Telecommunication Standards Institute). In addition, if a managing entity (ME, Managing Entity) in the specification defined by the Global Platform international standards organization (GP, Global Platform) is implemented on the terminal host, the DH may also be referred to as a managing host (MH, Managing Host). The embodiments of the present invention are not limited thereto.

The NFCC in the embodiments of the present invention is a term used in the NCI specification defined by the NFC Forum. The NFCC may correspond to a contactless front-end (CLF, Contactless Front-end) in the HCI specification may be set to specify whether the routing mechanism is available in a corresponding power state. For example, when the bit value is set to 1 b, it indicates that the routing mechanism is available in the corresponding power state, or else, is unavailable. Certainly, one octet in the power field may correspond to one power state. This is not limited in the present invention.

In the embodiments of the present invention, the foregoing power states are states that are related to a power supply status (such as battery on or battery off), a screen status (such as screen-on or screen-off), an unlocking status (such as unlocked or locked), and the like of a first terminal and described with respect to the first terminal, including but not limited to: battery off (battery off), switched off (switched off), and switched on (switched on), where the switched on state may include a state such as screen-on and unlocked, screen-off and unlocked, screen-on and locked, or screen-off and locked. The present invention is not limited thereto.

A standalone secure element (standalone SE) defined by the GP is a card emulation environment (CEE, Card Emulation Environment) that cannot communicate with a managing entity (Managing Entity) and can only work in a non-aggregated mode (non-aggregated mode). In the non-aggregated mode, an NFC terminal having multiple CEEs can enable only one CEE. Therefore, only a contactless application on the enabled CEE is available, but all contactless applications on other CEEs on the NFC terminal are unavailable. In other words, when a standalone SE on the NFC terminal is enabled, all the other CEEs on the NFC terminal are disabled, that is, all the contactless applications on the other CEEs are unavailable.

Some existing NFCEEs support only the CE mode but cannot support the P2P mode. When one of the NFCEEs uses the first routing mechanism, although a card emulation application in the NFCEE is available, P2P applications in other entities (such as the DH) cannot be used normally. For example, the NFCEE supporting only the CE mode, for example, may be a standalone SE. The following uses the standalone SE as an example. When the standalone SE is enabled, the standalone SE may be set as a forced NFCEE by using a forced NFCEE routing mechanism. In this case, after receiving, in the data exchange phase, a data frame sent by a peer NFC device, the NFCC may directly route the data frame to the forced NFCEE. Because currently the standalone SE supports only the CE mode and cannot support the P2P mode, and only the DH supports the P2P mode, when data sent by the peer is NFC-DEP protocol data (namely, P2P data, where the NFC-DEP protocol is an RF protocol required for P2P communication), the NFCC directly forwards the data to the standalone SE. Because the standalone SE cannot process the NFC-DEP protocol data, P2P communication fails. In addition, when the forced NFCEE routing mechanism is unavailable (as described in the foregoing example, a bit value corresponding to a current power state is 0 b) in the current power state (current power state), if an RF protocol activation command received by the NFCC is a command (for example, ATR_REQ) used for activating the NFC-DEP protocol, the NFCC does not respond to the command according to the forced NFCEE routing mechanism. In this case, the NFC-DEP protocol is not activated, that is, P2P communication is also not performed subsequently. Therefore, when some NFCEEs (such as a standalone SE) use the first routing mechanism, although a card emulation application is available in the NFCEEs, a P2P application in another entity (such as the DH) cannot be used normally.

In view of the foregoing problem, an embodiment of the present invention provides a method for routing a data frame. With reference to FIG. 1 to FIG. 4, the following describes in detail a method for routing a data frame according to an embodiment of the present invention.

It should be noted that, in the following embodiments shown in FIG. 1 to FIG. 5, a first NFC terminal uses a listen mode and works as a listen-side terminal.

FIG. 1 is a schematic flowchart of a method for routing a data frame according to an embodiment of the present invention. The method shown in FIG. 1 is applied to a first terminal, the first terminal includes a device host DH and a near field communication controller NFCC, and a first routing mechanism in the first terminal is in an enabled state. It should be understood that, a specific form of the first routing mechanism is not limited in this embodiment of the present invention, as long as the following functions can be implemented, that is, the DH can configure, by using a routing configuration command, at least one routing entry pointing to a specific NFCEE (referred to as a first NFCEE) for the NFCC, and indicate, by using a power state field, in which power states the routing mechanism is available (for example, one bit in the power state field may correspond to one power state; and when a bit value corresponding to a power state is set to 1, it indicates that the first routing mechanism is available in the power state), so that the NFCC determines in which power states a received data frame can be routed to a route target, namely, the first NFCEE. In this embodiment of the present invention, the first routing mechanism, for example, may be a forced near field communication execution environment routing forced NFCEE routing mechanism defined in the NCI specification. In this case, the set corresponding power state field may be a forced power state, and the corresponding route target may be a forced NFCEE, for example, a standalone SE. However, this embodiment of the present invention is not limited thereto. Specifically, the method 100 shown in FIG. 1 may be performed by the NFCC. The method 100 includes the followings steps.

110. The NFCC receives a data frame sent by a second terminal.

It should be understood that, the second terminal may also be referred to as another NFC terminal at a peer end of the first terminal, and is referred to as a peer device hereinafter.

For example, when the first terminal performs near field communication with the second terminal, the NFCC of the first terminal may receive, by using an antenna, the data frame sent by the second terminal.

120. If a currently activated radio frequency RF protocol is a first RF protocol, the NFCC processes the data frame according to a first preset rule.

130. If the currently activated RF protocol is a second RF protocol, the NFCC routes the data frame according to the first routing mechanism. The first RF protocol includes the NFC-DEP protocol, and the second RF protocol includes a non NFC-DEP protocol.

In other words, the NFCC determines a route target according to the first routing mechanism, and routes the data frame to the route target. Determining the route target in this manner may also be referred to as processing the data frame by the NFCC according to a second preset rule.

In this embodiment of the present invention, the first RF protocol may further include other protocols, as long as a data type corresponding to the first RF protocol is peer-to-peer P2P application data. This embodiment of the present invention is not limited to the NFC-DEP protocol. The second RF protocol may include the ISO-DEP protocol, the T1T protocol, the T2T protocol, the T3T protocol, or the T5T protocol. The second RF protocol in this embodiment of the present invention may further include other protocols, as long as a data type corresponding to the second RF protocol is data of a non P2P application (for example, a card emulation application or an NFC tag). This embodiment of the present invention is not limited thereto.

Specifically, when the first terminal performs near field communication with the second terminal, the NFCC of the first terminal may receive, by using the antenna, the data frame sent by the second terminal. After obtaining the data frame, the NFCC may process the data frame according to a type of the currently activated RF protocol, and use different processing modes for different RF protocol types. For example, if the currently activated radio frequency RF protocol is the first RF protocol, that is, the data frame is data of a P2P application, the NFCC processes the data frame according to the first preset rule; if the currently activated RF protocol is the second RF protocol, that is, the data frame is data of a non P2P application, for example, data of a card emulation application, the NFCC routes the data frame according to the first routing mechanism.

Therefore, in this embodiment of the present invention, by using different data frame processing modes for different RF protocol types corresponding to received data frames, a P2P application on another entity (such as the DH) can be normally used when a specific NFCEE (also referred to as a first NFCEE, for example, a standalone SE) is enabled.

It should be noted that, the first NFCEE may be an NFCEE that is directly connected to the NFCC or is located in the NFCC.

In this embodiment of the present invention, when the currently activated RF protocol is the second RF protocol, and the second RF protocol is a non NFC-DEP protocol, namely, the ISO-DEP protocol, the Type 1 Tag T1T protocol, the Type 2 Tag T2T protocol, the Type 3 Tag T3T protocol, or the Type 5 Tag T5T protocol, the NFCC may use the first routing mechanism, for example, a forced NFCEE routing mechanism defined in the NCI specification, to determine the route target, and route the data frame to the route target. The route target may be a forced NFCEE (such as a standalone SE), and the forced NFCEE may be an NFCEE to which forced NFCEE routing is set when the DH configures the forced NFCEE routing mechanism for the NFCC.

In this embodiment, the NFCC determines the route target according to the first routing mechanism, and specifically, if the forced NFCEE routing mechanism is available in a current power state (current power state) (that is, a bit value corresponding to the current power state in a field indicating the forced power state is a preset value, such as 1 b), determines the forced NFCEE (namely, an NFCEE corresponding to an NFCEE ID in a field indicating the forced NFCEE) as the route target. Before determining that the forced NFCEE routing mechanism is available in the current power state, the NFCC may further check the value of the power state field (namely, the value of the forced power state) corresponding to the routing mechanism.

Because the power state of the first terminal may change, after receiving the data frame, the NFCC may check whether the bit value corresponding to the current power state in the forced power state field is a preset value, for example, the preset value 1 b, and when the bit value of the current power state is the preset value, route the data frame to the NFCEE, or else, terminate routing of the data frame.

It should be noted that, a prerequisite for using the first routing mechanism is that when the NFCC receives the data frame, the NFCC determines that the first routing mechanism is enabled (for example, if a value corresponding to a field indicating a forced NFCEE routing state is, for example, 1, the NFCC considers that the forced NFCEE routing mechanism is enabled enabled). For details, refer to the NCI specification. Details are not described in the present invention.

It should be noted that, in this embodiment of the present invention, in a specific implementation, after receiving the data frame sent by the second terminal, the NFCC may determine whether the currently activated RF protocol is the first RF protocol, or may determine whether the currently activated RF protocol is the second RF protocol. A manner of determining whether the currently activated RF protocol is the first RF protocol or the second RF protocol may be one of the following manners:

(1) determining according to a format of the received data frame, for example, if the format of the data frame complies with an NFC-DEP frame format (NFC-DEP frame format), considering that the NFC-DEP protocol is currently activated, or if the format of the data frame complies with an ISO-DEP information block format (ISO-DEP I-Block format), considering that the ISO-DEP protocol is currently activated; or (2) determining according to an activated RF interface, for example, if the currently activated RF interface is an NFC-DEP RF interface, considering that the NFC-DEP protocol is activated, or if the currently activated RF interface is an ISO-DEP RF interface, considering that the ISO-DEP protocol is activated; or (3) determining according to an RF protocol activation command previously received by the NFCC in an RF protocol activation phase, for example, if the previously received RF protocol activation command is ATR_REQ defined in the Digital protocol defined by the NFC Forum, considering that the NFC-DEP protocol is currently activated, or if the previously received RF protocol activation command is an RATS command or an ATTRIB command defined in the Digital protocol, considering that the ISO-DEP protocol is currently activated; or (4) determining according to the foregoing (1) and (3), or (2) and (3), for example, if a format of the data frame complies with a radio frequency frame format (RF Frame) of an RF technology (such as NFC-A or NFC-B or NFC-F or NFC-V), and a previously activated RF protocol activation command is ATR_REQ, considering that the NFC-DEP protocol is currently activated, or if a currently activated RF interface is a frame RF interface, and a previously activated RF protocol activation command is an RATS command or an ATTRIB command, considering that the ISO-DEP protocol is currently activated.

In this embodiment of the present invention, that the currently activated RF protocol may be considered as the NFC-DEP protocol means that the currently activated RF interface is an NFC-DEP RF interface, or means that the format of the received data frame complies with the NFC-DEP frame format; similarly, that the currently activated RF protocol may be considered as the ISO-DEP protocol means that the currently activated RF interface is an ISO-DEP RF interface, or means that the format of the received data frame complies with the ISO-DEP information block format.

Optionally, in another embodiment, in step 120, the NFCC routes the data frame according to a second routing mechanism.

In other words, the NFCC searches for a first route target according to the second routing mechanism, and routes the data frame to the first route target. Herein the first route target, for example, may be the DH, or may be a device host near field communication execution environment DH-NFCEE (namely, an NFCEE directly connected to the DH or located in the device host DH).

Alternatively, in step 120, the NFCC forwards the data frame to the DH.

That is, when the currently activated radio frequency RF protocol is the NFC-DEP protocol, the NFCC may determine that the data is P2P application data. Because only the DH may support the P2P mode, the NFCC may directly forward the data frame to the DH.

In this way, the P2P data can be routed to a correct entity, and further forwarded to a correct application for processing, that is, the P2P application can be used normally. Therefore, a problem that a P2P application on another entity (such as a DH) cannot be used normally when a specific NFCEE (such as a standalone SE) is enabled in the prior art is resolved, and both the card emulation application and the P2P application can be used normally in this case.

Alternatively, in another embodiment, in step 120, the NFCC processes the data frame according to the currently activated RF interface.

That is, when the currently activated radio frequency RF protocol is the NFC-DEP protocol, different routing may be performed according to currently activated different RF interfaces.

It should be noted that, according to the NCI specification, in a listen mode, correspondences between RF protocols and RF interfaces may be shown in Table 3.

TABLE 3

Mapping relationship between RF protocols and RF interfaces in the listen mode

| RF interface | RF protocol | | |
|---|---|---|---|
| | NFC-DEP protocol | ISO-DEP protocol (T4T) | TxT protocol (x = 1, 2, 3, 5) |
| NFC-DEP RF interface | May be mapped | | |
| ISO-DEP RF interface | | May be mapped | |
| Frame RF interface | May be mapped | May be mapped | May be mapped |

As can be seen from the foregoing table, when the DH performs an RF interface mapping configuration (RF Interface Mapping Configuration), a mapped interface configured for the NFC-DEP protocol may be an NFC-DEP RF interface, or may be a frame radio frequency frame RF interface. Certainly, for the listen mode, when the DH does not perform the RF interface mapping configuration by using a specific command (such as RF_DISCOVER_MAP_CMD) defined in the NCI, if the NFCC supports the NFC-DEP RF interface, the NFCC maps the NFC-DEP protocol (NFC-DEP RF Protocol) to the NFC-DEP RF interface by default; if the NFCC supports the ISO-DEP RF interface, the NFCC maps the ISO-DEP protocol (SIO-DEP RF Protocol) to the ISO-DEP RF interface by default; otherwise, the NFCC maps the NFC-DEP protocol or the ISO-DEP protocol to the frame RF interface. In addition, for the listen mode, the NFCC also maps another protocol such as the TxT (x=1, 2, 3, 5) protocol to the frame RF interface.

Correspondingly, in another embodiment, in step 120, if the currently activated RF interface is an NFC-DEP RF interface, the NFCC routes the data frame according to a second routing mechanism or a protocol-based route selection mechanism.

In other words, the NFCC searches for a first route target according to the second routing mechanism, and routes the data frame to the first route target. Herein the first route target may be the device host DH, or may be understood as a device host near field communication execution environment DH-NFCEE (namely, an NFCEE directly connected to the DH or located in the device host DH).

In this embodiment of the present invention, the second routing mechanism may include a listen mode routing listen mode routing mechanism and a protocol-based routing entry mode, where the protocol-based routing entry mode includes the protocol-based route selection mechanism. However, this embodiment of the present invention is not limited to the listen mode routing mechanism, as long as the second routing mechanism can implement similar functions and route P2P data to a correct entity.

For example, the second routing mechanism may include a listen mode routing mechanism (listen mode routing) defined in the NCI specification, that is, the first terminal searches for a route target according to a listen mode routing table (listen mode routing table), where the listen mode routing table may include at least one of an AID-based routing entry (AID-based routing entry), an APDU pattern-based routing entry (APDU Pattern-based routing entry), an SC-based routing entry (System Code-based routing entry), a protocol-based routing entry (Protocol-based routing entry), or a technology-based routing entry (Technology-based routing entry).

Specifically, the NFCC may search for the route target according to the listen mode routing mechanism, that is, 1. if the ISO-DEP RF interface is activated, search for the route target according to an AID-based route selection process or an APDU pattern-based route selection process; or 2. if the ISO-DEP RF interface is not activated, (1) when the NFC-F technology is used currently, search for the route target according to an SC-based route selection process; or (2) when another RF technology is used currently, search for the route target according to a protocol-based route selection process and a technology-based route selection process in sequence.

The searching for the route target according to a technology-based route selection process is matching an RF protocol corresponding to the data frame with each protocol-based routing entry until a matched RF protocol is found, and in this case, the route target may be determined.

For the process of searching for the route target according to the listen mode routing mechanism, refer to the NCI specification. Details are not described herein.

Specifically, the NFCC may further search for the route target based on a protocol-based routing entry, where the protocol-based routing entry mode may include but is not limited to the following two modes:

Mode 1: The NFCC determines the route target based on the corresponding protocol-based routing entry mode, that is, directly according to an NFC-DEP protocol-based routing entry in the foregoing routing table, where the NFC-DEP protocol-based routing entry may point to the DH or the DH-NFCEE, and is set when the DH configures the listen mode routing table for the NFCC.

Mode 2: The NFCC determines the route target directly according to the protocol-based route selection process, that is, based on the protocol-based route selection mechanism (for details, refer to the protocol-based route selection process in the NCI specification), that is, the NFCC finds protocol-based routing entries in the foregoing listen mode routing table, and starts matching from a first protocol-based routing entry until a matched protocol-based routing entry is found. For example, if the bit value corresponding to the current power state in the protocol-based routing entry is 1 b, and protocols match (that is, the RF protocol corresponding to the data frame matches the RF protocol corresponding to the protocol-based routing entry), an NFCEE corresponding to the protocol-based routing entry is determined as the route target; if the bit value corresponding to the current power state in the protocol-based routing entry is 0 b, and a route blocked bit (route blocked bit) corresponding to the protocol-based routing entry is 1 b, and protocols match, it is considered that no route target is found, and the whole route selection process is terminated. If the matching is not successful after a last protocol-based routing entry is matched, the protocol-based route selection process is terminated, and subsequently the whole route selection process may be terminated, or another route selection process (such as a technology-based route search process defined in the NCI specification; details are not described herein) may be used to continue to search for the route target.

Specifically, the NFCC may further search for the route target based on a technology-based routing entry, where the technology-based routing entry mode may include but is not limited to the following two modes:

Mode 1: The NFCC determines the route target based on the corresponding technology-based routing entry mode, that is, directly according to an NFC-A or NFC-F technology-based routing entry in the foregoing routing table, where the NFC-A or NFC-F technology-based routing entry may point to the DH or the DH-NFCEE, and is set when the DH configures the listen mode routing table for the NFCC.

Mode 2: The NFCC determines the route target directly according to the technology-based route selection process, that is, based on the technology-based route selection mechanism (for details, refer to the technology-based route selection process in the NCI specification), that is, the NFCC finds technology-based routing entries in the foregoing listen mode routing table, and starts matching from a first technology-based routing entry until a matched technology-based routing entry is found. A specific implementation is similar to the foregoing protocol-based route selection process. Details are not described again herein.

If the currently activated RF interface is a frame radio frequency frame RF interface, the NFCC forwards the data frame to the DH.

In this embodiment, how the DH processes the data frame after receiving the data frame, for example, forwards the data frame to an application or another entity (such as the NFCEE), is determined by the DH according to a specific situation. This is not limited in the present invention.

Optionally, in another embodiment, the first RF protocol is activated by the NFCC by sending, to the second terminal after the NFCC determines that a received RF protocol activation command is a first activation command, a response for responding to the first activation command.

Specifically, in the listen mode, the NFCC receives an RF protocol activation command sent by the second terminal, where the RF protocol activation command may be the first activation command or a second activation command, the first activation command is used to activate the first RF protocol, and the second activation command is used to activate the second RF protocol.

In this embodiment, the NFCC may determine a type of the RF protocol activation command, and in a specific implementation, may determine whether the RF protocol activation command is the first activation command (such as ATR_REQ defined in the Digital protocol), or may determine whether the RF protocol activation command is the second activation command (such as the RATS command or ATTRIB command defined in the Digital protocol).

If the RF protocol activation command is the first activation command, the NFCC sends, to the second terminal, the response (such as ATR_RES defined in the Digital protocol) for responding to the first activation command, so as to activate the first RF protocol (such as the NFC-DEP protocol). Specifically, the NFCC may send, to the second terminal according to a type of a mapped RF interface configured by the DH for the first RF protocol, the response for responding to the first activation command, so as to activate the first RF protocol.

If the RF protocol activation command is the second activation command, the NFCC determines, according to a specific situation, whether to send, to the second terminal, a response (such as RATS Response or ATTRIB Response defined in the Digital protocol) for responding to the second activation command, so as to activate the second RF protocol (such as the ISO-DEP protocol). Specifically, the NFCC determines, according to whether the first routing mechanism is available in the current power state, whether to respond. For example, when the NFCC receives the second RF protocol activation command, if it is determined that the first routing mechanism (such as forced NFCEE routing) is enabled (namely, enabled), and the bit value corresponding to the current power state (current power state) in a power state (such as the forced power state) octet configured by the DH for the routing mechanism is a first preset value (such as 0 b), the NFCC may not respond or may directly send an error response to the second terminal; or if it is determined that the first routing mechanism (such as forced NFCEE routing) is enabled (namely, enabled), and the bit value corresponding to the current power state (current power state) in the power state (such as the forced power state) field configured by the DH for the routing mechanism is a second preset value (such as 1 b), the NFCC may directly send a response to the second terminal, so as to activate the second RF protocol. In this embodiment, after the NFCC responds to the first activation command or the second activation command, and activates the corresponding first RF protocol or the second RF protocol, if the data frame sent by the second terminal is received, the data frame is routed according to steps 110 to 130 as described above. Details are not described again herein. Certainly, when no response is made to the second activation command or an error response is sent, the second RF protocol is not activated, and a subsequent data exchange phase also cannot be performed, that is, the NFC communication is terminated.

In this embodiment of the present invention, as long as the second RF protocol activated by using the first activation command can be used in P2P communication, and the second RF protocol activated by using the second activation command can be used in a card emulation application or an NFC tag can be read or written, the first activation command, the second activation command, and specific names or content of the corresponding first RF protocol and second RF protocol are not limited.

In addition, when the second RF protocol is the T1T protocol, the T2T protocol, the T3T protocol, or the T5T protocol, because the RF protocols have no corresponding RF protocol activation command, but are activated when being detected during device detection, the determining the RF protocol activation command may be inapplicable to the RF protocols. However, when the data frame is received in the foregoing data exchange phase, coverage of the second RF protocol is not affected.

Further, in another embodiment, a mapped RF interface configured by the DH for the first RF protocol includes the NFC-DEP RF interface or the frame RF interface, and the sending, by the NFCC, to the second terminal, a response for responding to the first activation command may include:

if the mapped RF interface is the NFC-DEP RF interface (this means that the NFCC may parse or process the RF activation command or may generate the corresponding response), directly sending, by the NFCC, to the second terminal, the response (such as ATR_RES) for responding to the first activation command; or if the mapped RF interface is the frame RF interface (this means that the NFCC may not generate the corresponding response for the RF protocol activation command, but may identify the RF protocol activation command), forwarding, by the NFCC, the first activation command to the DH, and sending, to the second terminal, a response (such as ATR_REQ) that is sent by the DH and used for responding to the first activation command.

Because when the mapped RF interface is the NFC-DEP RF interface, function logic executed by the NFCC is more than that for the frame RF interface, the NFCC may directly respond to the first activation command, and therefore may directly send, to the second terminal, the response for responding to the first activation command.

When the mapped RF interface is the frame RF interface, function logic executed by the NFCC is less, and the NFCC basically performs only transparent transmission and cannot directly respond to the first activation command. Therefore, the NFCC forwards the first activation command to the DH, and sends, to the second terminal, the response that is sent by the DH and used for responding to the first activation command. It should be noted that, in this case, the NFCC may be capable of identifying which activation command the received RF protocol activation command is.

Optionally, in another embodiment, the method may further include:

the NFCC determines that a bit value corresponding to a current power state in a power state field configured by the DH for the first routing mechanism is a first preset value.

Specifically, it may be understood that the NFCC determines that the first routing mechanism is unavailable in the current power state. The current power state is a power state of the first terminal in an RF discovery process, and more specifically, at a time of receiving the RF protocol activation command or in a preset time range before or after the time.

Specifically, the NFCC determines that the bit value corresponding to the current power state (current power state) in the power state (forced power state) field configured by the DH for the first routing mechanism (such as forced NFCEE routing) is the first preset value.

For example, the first preset value is 0 b, that is, after the NFCC determines that the bit corresponding to the current power state is 0 b, the NFCC performs different processing according to the type of the RF protocol activation command. For example, when the RF protocol activation command is the first activation command, the NFCC sends, to the second terminal according to a type of the mapped RF interface configured by the DH for the first RF protocol, the response for responding to the first activation command, so as to activate the first RF protocol. When the RF protocol activation command is the second activation command, the NFCC may not respond or may send an error response to the peer. In this case, the NFC communication is terminated, and the second terminal does not send data to the NFCC.

Optionally, in another embodiment, in step 120, if the activated RF interface is an NFC-DEP RF interface, the currently activated RF protocol is the first RF protocol, that is, the NFCC determines that the currently activated RF protocol is the first RF protocol; or if a format of the data frame is an NFC-DEP frame format, the currently activated RF protocol is the first RF protocol, that is, the NFCC determines that the currently activated RF protocol is the first RF protocol; or if the RF protocol activation command received in the RF protocol activation phase is ATR_REQ, the currently activated RF protocol is the first RF protocol, that is, the NFCC determines that the currently activated RF protocol is the first RF protocol.

In this embodiment, the determining whether the currently activated RF protocol is the first RF protocol may be performed according to any one of the foregoing manners (1) to (4). Details are not described again herein.

Optionally, in another embodiment, the method may further include:

the NFCC determines that a bit value corresponding to a current power state in a power state bit configured by the DH for the first routing mechanism is a second preset value.

Specifically, it may be understood that the NFCC determines that the first routing mechanism is available in the current power state. The current power state is a power state of the first terminal in an RF discovery process or a data exchange phase, and more specifically, at a time of receiving the RF protocol activation command or the data frame or in a preset time range before or after the time.

Specifically, the NFCC determines that the bit value corresponding to the current power state (current power state) in the power state (forced power state) field configured by the DH for the first routing mechanism (such as forced NFCEE routing) is the second preset value.

For example, the second preset value may be 1 b, that is, after the NFCC determines that the bit of the current power state is 1 b, the NFCC performs different processing according to the type of the RF protocol activation command. For example, when the RF protocol activation command is the first activation command, the NFCC sends, to the second terminal, the response for responding to the first activation command, so as to activate the first RF protocol; when the RF protocol activation command is the second activation command, the NFCC sends, to the second terminal, the response for responding to the second activation command, so as to activate the second RF protocol. Certainly, how to respond to the second terminal may also be determined according to the RF interface mapped to the RF protocol corresponding to the RF protocol activation command. Details are described above, and are not described again herein.

Optionally, in another embodiment, the method may further include:

the NFCC receives the first routing mechanism that is configured by the DH for the NFCC after the DH learns information about a first NFCEE from the NFCC, where the information about the first NFCEE is reported to the DH when the NFCC performs NFCEE discovery, or is fed back to the DH after the NFCC receives a request of the DH, and the information about the first NFCEE includes at least information indicating that the first NFCEE is a standalone secure element standalone SE.

In other words, before radio frequency discovery, that is, before the NFCC obtains the RF protocol activation command, for example, in an NFCC initialization phase, the NFCC receives the first routing mechanism configured by the DH, such as the forced NFCEE routing mechanism. Specifically, after the information about the first NFCEE is reported to the DH when the NFCC performs NFCEE discovery, the DH configures the first routing mechanism for the NFCC according to the information about the first NFCEE. For example, if the NFCC discovers, in the NFCEE discovery process, that the first NFCEE is a standalone SE, the NFCC reports the information to the DH, and even information about an application stored in the first NFCEE (such as the supported RF technology or the supported RF protocol), and in this case, the DH may configure the first routing mechanism for the NFCC, that is, set forced NFCEE routing to the first NFCEE (the state of the first NFCEE is certainly enabled), that is, set the route target as the first NFCEE, where the first NFCEE is referred to as a forced NFCEE corresponding to the forced NFCEE routing mechanism. Alternatively, the NFCC reports the information about the first NFCEE to the DH after receiving the request of the DH, and then the DH configures the first routing mechanism for the NFCC. For example, if the DH sends a request for obtaining NFCEE information to the NFCC, the NFCC feeds back the information about the first NFCEE to the DH after obtaining the information (a specific obtaining manner is not limited). If the DH learns that the first NFCEE is the standalone SE, the DH may configure the first routing mechanism for the NFCC, that is, set forced NFCEE routing to the first NFCEE (the state of the first NFCEE is certainly enabled), that is, set the route target as the first NFCEE, where the first NFCEE is referred to as a forced NFCEE corresponding to the forced NFCEE routing mechanism.

It should be noted that, in this embodiment of the present invention, the first NFCEE may also not be the standalone SE but is another ordinary NFCEE, as long as the DH configures the first routing mechanism for the first NFCEE due to reasons such as a service requirement (for example, the first NFCEE is a unique NFCEE on the NFC terminal, or a party that controls the first NFCEE (for example, an operator that controls a SIM card) requires, for a business policy reason, that other NFCEEs cannot be enabled when the first NFCEE is enabled on the NFC terminal, and the like). This is not limited in this embodiment of the present invention.

In the foregoing descriptions, the forced NFCEE routing mechanism is an example of the first routing mechanism. According to the current NCI specification, the DH may configure the forced NFCEE routing mechanism for the NFCC by using a dedicated configuration command (such as RF_SET_FORCED_NFCEE_ROUTING_CMD shown in the following Table 4), that is, configure, for the NFCC, at least one routing entry pointing to a specific NFCEE (the first NFCEE), and specify, by using a power state (such as the forced power state) octet or field, in which power states the routing mechanism is available (for example, one bit in the power state octet may correspond to one power state, and when a bit value corresponding to a power state is set to 1 b, it indicates that the routing mechanism is available in the power state). In this case, the first NFCEE may be referred to as a forced NFCEE. Therefore, the NFCC determines in which power states the received data frame can be routed to the forced NFCEE.

TABLE 4

Control message used for configuring the forced NFCEE routing mechanism
RF_SET_FORCED_NFCEE_ROUTING_CMD

| Payload field | Length | Value or definition |
|---|---|---|
| Forced NFCEE routing state | 1 octet | 0 - Forced NFCEE routing is disabled.<br>1 - Forced NFCEE routing is enabled. |
| Forced NFCEE value field | 0 or 2 octets | For a value of this field, refer to the following Table 5.<br>If a value of the forced NFCEE routing state is set to 0, this field does not exist. |

TABLE 5

Value of the forced NFCEE value field

| Payload field | Length | Value or definition |
|---|---|---|
| Forced NFCEE | 1 octet | NFCEE ID, namely, an identifier of the NFCEE. For details, refer to the NCI specification. Details are not described herein. |

TABLE 5-continued

Value of the forced NFCEE value field

| Payload field | Length | Value or definition |
|---|---|---|
| Forced power state | 1 octet | Power state octet, where one bit corresponds to one power state. |

Optionally, in another embodiment, the method may further include:

the NFCC receives RF parameters configured by the DH for an application (namely, a P2P application, such as an application or a service that may share content such as a contact card or a web page by using NFC) that complies with the NFC-DEP protocol on the DH, and receives RF parameters configured by the first NFCEE for an application (namely, a card emulation application and/or a type 1/2/3/4/5 tag application) that complies with the non NFC-DEP protocol (such as the ISO-DEP protocol, the T1T protocol, the T2T protocol, the T3T protocol, or the T5T protocol) in the first NFCEE.

In other words, before radio frequency discovery, that is, before the NFCC obtains the RF protocol activation command, specifically, in an NFCC initialization phase, the NFCC receives the RF parameters configured by the DH.

It should be noted that, in this embodiment of the present invention, the DH and the NFCEE respectively configure RF parameters (for example, RF technology related parameters, RF protocol related parameters, RF discovery configuration related parameters, and even routing configuration related parameters) related to applications thereof for the NFCC, and then the NFCC manages or combines the RF parameters for use in the RF discovery. For a specific process in which the NFCC manages or combines RF parameters from different entities, refer to corresponding descriptions in FIG. 3 and FIG. 4. To avoid repetition, details are not described again herein.

With reference to FIG. 1, the foregoing describes in detail the method for routing a data frame according to this embodiment of the present invention. In summary, when the first routing mechanism is enabled (for example, the value of the forced NFCEE routing state defined in the NCI specification indicates the state of the forced NFCEE routing enabled), the processing includes the following phases:

I. RF discovery phase (namely, an RFST_DISCOVERY state defined in an NFCC state machine, where the phase may include technology detection, device detection, and device activation (which may be understood as RF protocol activation), and when the device is activated successfully, it means that the phase ends, and the data exchange phase begins)

1. If the RF protocol activation command received in this phase is the first activation command (that is, a command used for activating the first RF protocol, such as ATR_REQ), regardless of whether the first routing mechanism is available in the current power state (for example, when the bit value corresponding to the current power state in the forced power state of the forced NFCEE routing mechanism is 1 b, it indicates that the routing mechanism is available, or else, is unavailable), the NFCC needs to send, to the peer, the response (such as ATR_RES) for responding to the first activation command, so as to activate the first RF protocol.

2. If the RF protocol activation command received in this phase is the second activation command (that is, a command used for activating the second RF protocol, such as the RATS command or the ATTRIB command), and when a condition that the first routing mechanism is available in the current power state is satisfied, the NFCC returns, to the peer, the response (such as the RATS response or the ATTRIB response) for responding to the second activation command, so as to activate the second RF protocol; otherwise, that is, when the condition that the first routing mechanism is available in the current power state is not satisfied, or it may be understood that a condition that the first routing mechanism is unavailable in the current power state is satisfied, the NFCC does not respond or sends an error respond to the peer.

The foregoing two processing branches 1 and 2 after the RF protocol activation command is received in the RF discovery phase include but are not limited to the following implementations:

(1) The NFCC determines whether the received RF protocol activation command is the first activation command or the second activation command, and if the received RF protocol activation command is the first activation command, returns, to the peer, the response for responding to the first activation command, or if the received RF protocol activation command is the second activation command, determines whether the first routing mechanism is available in the current power state; and if the first routing mechanism is available, the NFCC returns, to the peer, the response for responding to the second activation command, or if the first routing mechanism is unavailable, the NFCC does not respond or directly sends an error response to the peer.

(2) The NFCC determines whether the first routing mechanism is available in the current power state, and if the first routing mechanism is available, returns, to the peer, the response for responding to the received RF protocol activation command, or if the first routing mechanism is unavailable, determines whether the received RF protocol activation command is the first activation command or the second activation command; and if the received RF protocol activation command is the first activation command, the NFCC returns, to the peer, the response for responding to the first activation command, or if the received RF protocol activation command is the second activation command, the NFCC does not respond or sends an error respond to the peer.

II. Data Exchange Phase (Namely, an RFST_LISTEN_ACTIVE State Defined in the NFCC State Machine)

1. If the data frame received in this phase is P2P application data, that is, the currently activated RF protocol is the first RF protocol (such as the NFC-DEP protocol), regardless of whether the first routing mechanism is available in the current power state (for example, when the bit value corresponding to the current power state in the forced power state of the forced NFCEE routing mechanism is 1 b, it indicates that the routing mechanism is available, or else, is unavailable), the NFCC processes the received data frame by using the first preset rule (that is, directly using the second routing mechanism, or using the second routing mechanism in a specific RF interface, or directly forwarding the data frame to the DH), so as to route the data frame to the DH.

2. If the received data frame is non P2P application data (that is, the data frame is not P2P data, for example, is card emulation application data or NFC tag data, and more specifically, is data used for reading content in a card emulation application or an NFC tag), that is, the currently activated RF protocol is the second RF protocol (such as a non NFC-DEP protocol, that is, the activated RF protocol is not the NFC-DEP protocol, but may be any one of the foregoing ISO-DEP protocol, the T1T, the T2T, the T3T, or the T5T), and when the condition that the first routing mechanism is available in the current power state is satisfied, the NFCC processes the received data frame by using the first routing mechanism, so as to route the data frame to the first NFCEE (such as the forced NFCEE); otherwise, that is, when the condition that the first routing mechanism is available in the current power state is not satisfied, or it may be understood that the condition that the first routing mechanism is unavailable in the current power state is satisfied, the NFCC does not process the data frame, that is, the data frame is ignored.

Specific implementations of the foregoing two processing branches 1 and 2 after the data frame is received in the data exchange phase are similar to the two implementations (1) and (2) in the descriptions about the RF discovery phase. Details are not described again herein. However, this is not limited in this embodiment of the present invention.

It should be noted that, the foregoing "current" indicates a time at which the NFCC performs different operations, for example, a time at which the RF protocol activation command is received in the RF discovery phase, or a time at which the data frame is received in the data exchange phase. Therefore, for the power state, when the NFCC performs different operations, the power state may change. That is, when the NFCC performs different operations, a specific state that the current power state refers to may be also different. For example, when the RF protocol activation command is received in the RF discovery phase, the current power state is a first power state, but when the data frame is received in the later data exchange phase, the current power state becomes a second power state different from the first power state.

Figure 2A:
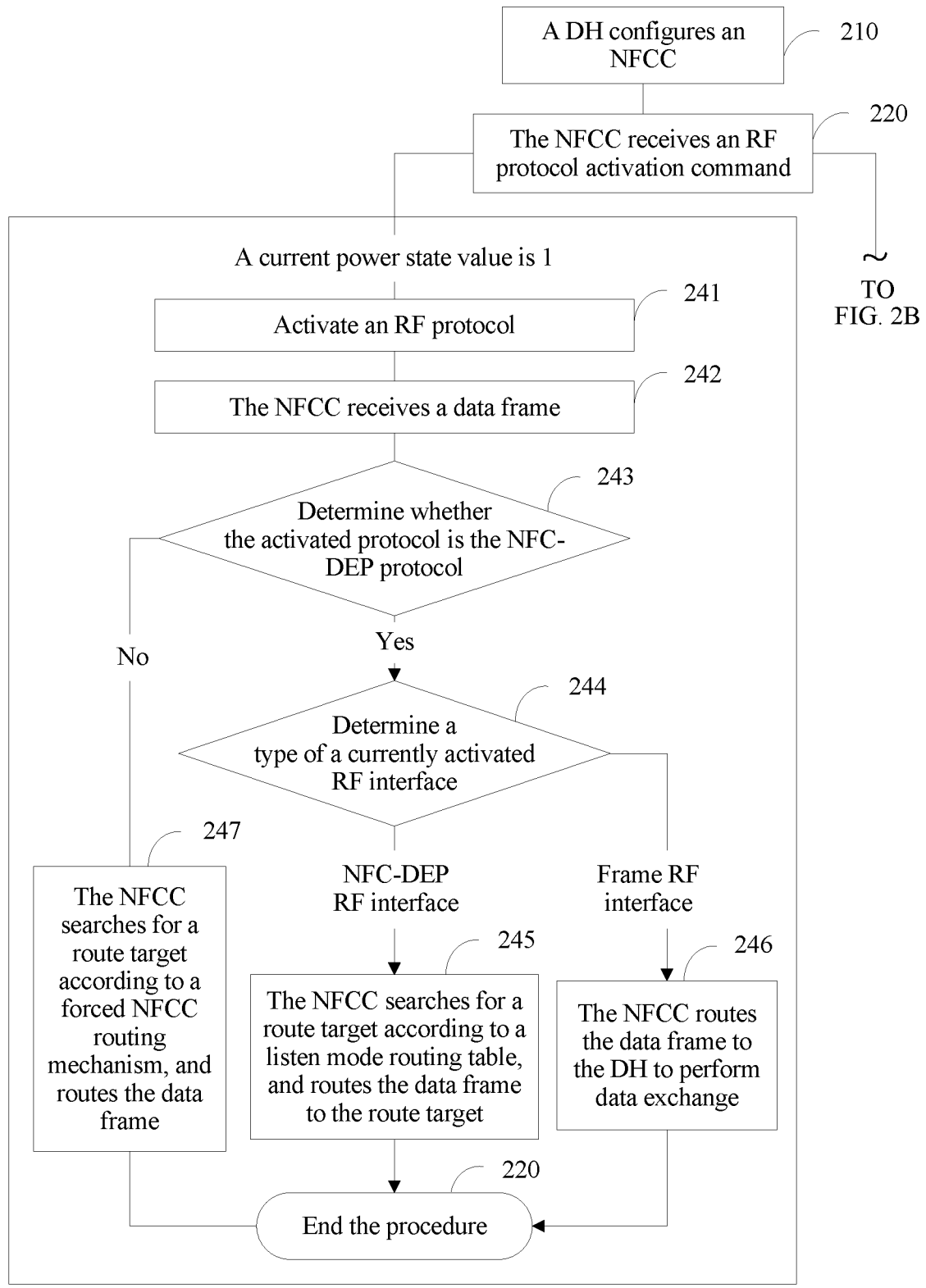
FIG. 2A and FIG. 2B are a schematic flowchart of a method for routing a data frame according to another embodiment of the present invention.
Figure 2B:
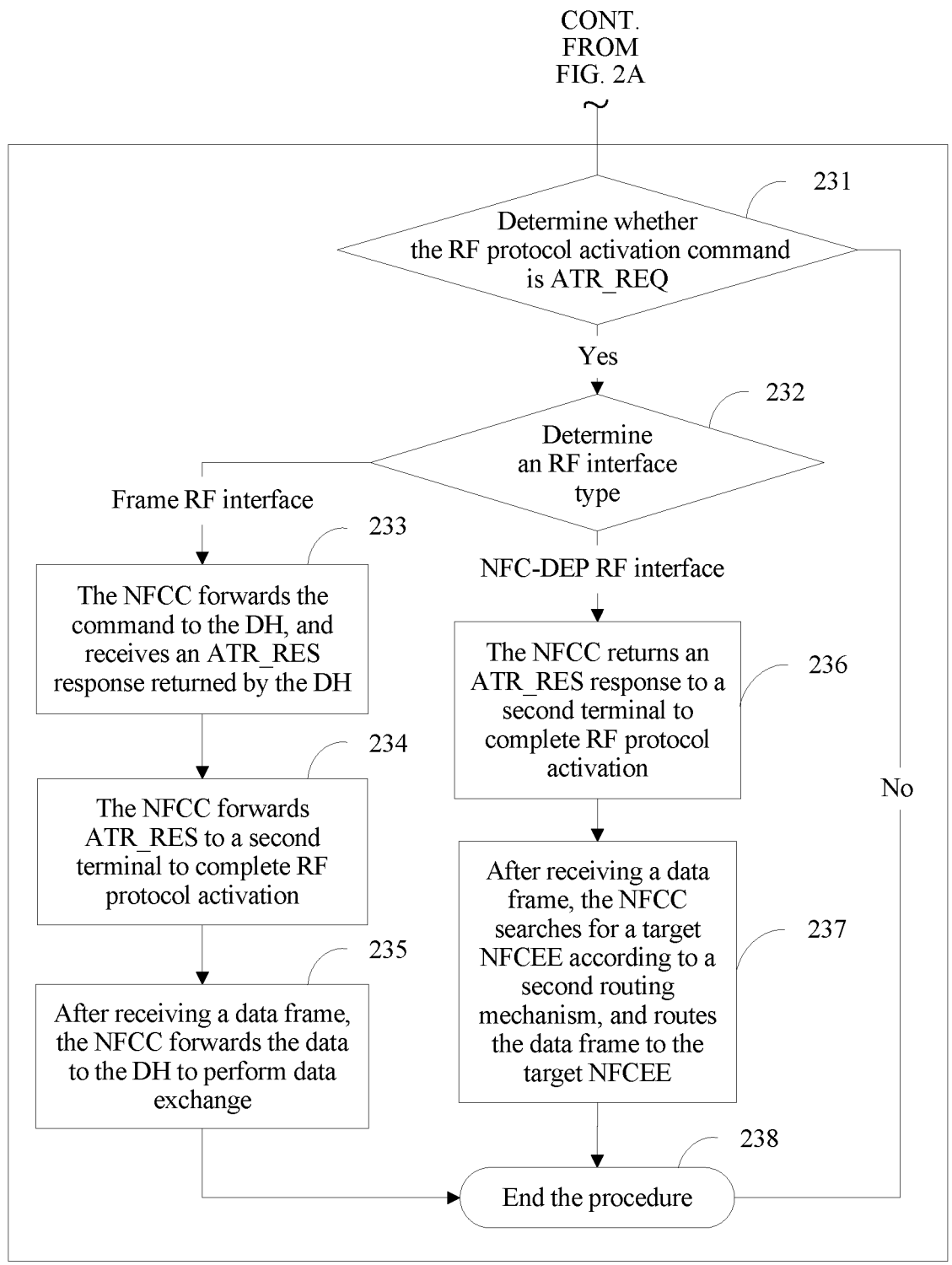

With reference to FIG. 2A and FIG. 2B, the following describes in detail a method for routing a data frame according to an embodiment of the present invention, by using an example in which the first routing mechanism is forced NFCEE routing and the second routing mechanism is a listen mode routing listen mode routing mechanism or a protocol-based route selection mechanism, and according to the implementation (2) used after the data frame is received in the data exchange phase after the RF protocol activation command is received in the RF discovery phase. Certainly, this is only an example.

Specifically, a routing method for performing near field communication between a first terminal and a second terminal in FIG. 2A and FIG. 2B is described from a perspective of the first terminal. The first terminal includes a DH and an NFCC. As shown in FIG. 2A and FIG. 2B, the method 200 includes the following steps.

210. The DH configures the NFCC.

Specifically, in an NFCC initialization phase, the DH configures the NFCC by using a dedicated command (such as CORE_SET_CONFIG_CMD defined in the NCI specification). The NFCC configuration includes at least an RF interface mapping configuration (RF Interface Mapping Configuration, that is, the DH configures a corresponding RF interface for each RF protocol by using RF_DISCOVER_MAP_CMD) and a first routing mechanism configuration (that is, the DH configures a forced NFCEE routing mechanism by using RF_SET_FORCED_NFCEE_ROUTING_CMD). The RF interface mapping configuration may also be a default configuration. That is, the DH does not need to use the foregoing corresponding command to perform the configuration, and the NFCC may directly use a default mapping relationship. For details, refer to the corresponding descriptions in the foregoing embodiment. Details are not described again herein.

It should be noted that, the NFCC configuration may further include configurations of RF parameters, for example, parameters related to an NFC-A, NFC-B, NFC-F, and/or NFC-V technology, parameters related to RF protocols such as ISO-DEP and NFC-DEP, and parameters related to RF discovery such as an RF technology and a mode and a discovery frequency; and may further include a configuration of a second routing mechanism, such as a configuration of a listen mode routing table, which may include any one or more of an AID-based routing entry, an APDU pattern-based routing entry, an SC-based routing entry, a protocol-based routing entry, or a technology-based routing entry. For details, refer to corresponding descriptions in the foregoing embodiment. Details are not described again herein.

220. The NFCC receives an RF protocol activation command.

Specifically, in an RF discovery process, the NFCC receives, in a listen mode (listen mode), the RF protocol activation command sent by a second terminal.

After receiving the RF protocol activation command, the NFCC performs corresponding processing according to a bit value corresponding to a current power state (current power state bit) in a power state field (as shown in the following Table 6) configured by the DH for forced NFCEE routing.

TABLE 6

| \multicolumn{8}{c}{Power state field} |
|---|---|---|---|---|---|---|---|
| b1 | b2 | b3 | b4 | b5 | b6 | b7 | b8 |
| First power state | Second power state | Third power state | Fourth power state | Fifth power state | . . . | . . . | . . . |

In the foregoing table, a bit bn corresponds to an $n^{th}$ power state, where n=1, 2, 3 . . . , and the $n^{th}$ power state is one of the power states listed in the foregoing embodiment, and is not described again herein.

Assume that when a value of bn is 1 b, it indicates that the forced NFCEE routing is available in the $n^{th}$ power state; and when a value of bn is 0 b, it indicates that the forced NFCEE routing is unavailable in the $n^{th}$ power state.

This embodiment is described by using a one-octet power state field as an example. However, the power field in this embodiment of the present invention is not limited thereto, for example, may be 1.5 octets, 2 octets, or 3 octets. This embodiment of the present invention is not limited thereto.

When the bit value corresponding to the current power state is 0, the following process is performed.

231. Determine whether the RF protocol activation command is ATR_REQ.

Specifically, when the RF protocol activation command is ATR_REQ, it indicates that the application is a P2P application, and afterward, step 232 is performed. When the RF protocol activation command is not ATR_REQ, it indicates that the application is not a P2P application, and step 238 is performed to end the procedure, that is, RF protocol activation is not performed.

232. The NFCC determines a type of a mapped RF interface configured by the DH for the NFC-DEP protocol.

Specifically, the NFCC determines whether the mapped RF interface configured by the DH for the NFC-DEP protocol is an NFC-DEP RF interface or a frame RF interface. For details about the RF interface mapping configuration, refer to the corresponding descriptions in the embodiment in FIG. 1. To avoid repetition, details are not described again herein.

When the RF interface is the frame radio frequency frame RF interface, steps 233 to 235 are performed. When the RF interface is the NFC-DEP interface, steps 236 and 237 are performed.

233. The NFCC forwards the command to the DH, and receives an ATR_RES response returned by the DH.

234. The NFCC forwards ATR_RES to a second terminal to complete RF protocol activation (it may be considered that the frame RF interface is activated previously, or activated at this time).

235. After receiving a data frame, the NFCC forwards the data to the DH to perform data exchange.

236. The NFCC returns an ATR_RES response to a second terminal to complete RF protocol activation (it may be considered that the NFC-DEP RF interface is activated at this time).

237. After receiving a data frame, the NFCC searches for a target NFCEE according to a second routing mechanism (for example, according to a listen mode routing table listen mode routing table or according to a protocol-based routing entry), and routes the data frame to the target NFCEE.

It should be understood that, the target NFCEE may be the DH, or may be understood as a DH-NFCEE.

In this step, a specific implementation of searching for the target NFCEE according to the second routing mechanism is similar to the corresponding descriptions in the foregoing embodiment. Details are not described again herein.

238. End the procedure.

In this embodiment, after step 231 of determining the RF protocol activation command as ATR_REQ, the NFCC may directly return the ATR_RES response to the second terminal to replace the foregoing steps 232 to 234 or steps 232 and 236.

It should be noted that, the foregoing step 235 and step 237 may be combined: After receiving the data frame, the NFCC directly forwards the received data frame to the DH for processing, or after receiving the data frame, the NFCC performs processing according to subsequent steps 243 to 248.

In this embodiment of the present invention, step 231 may be replaced with the following step, that is, in step 231, whether the RF protocol activation command is another command may also be determined. For example, the another command may include an RATS or ATTRIB command (Command) used for activating the ISO-DEP protocol. When the RF protocol activation command is the another command, it indicates that a subsequently to-be-activated RF protocol may be used in a non P2P application (such as a card emulation application or an NFC tag), and step 238 is performed to end the procedure, that is, RF protocol activation is not performed. When the RF protocol activation command is not the another command, it indicates that a subsequently to-be-activated RF protocol may be used in a P2P application, and afterward, step 232 is performed.

Step 220 is continued, and when the bit value corresponding to the current power state is 1, the following process is performed.

241. Activate an RF protocol.

Specifically, after receiving the RF protocol activation command, the NFCC activates the corresponding RF protocol according to a type of the RF protocol activation command, and may activate an RF interface in the listen mode listen mode synchronously. For example, when the RF protocol activation command is ATR_REQ, the NFC-DEP protocol is activated, and the NFC-DEP RF interface is activated synchronously; when the RF protocol activation command is the RATS command or the ATTRIB command, the ISO-DEP protocol is activated, and an ISO-DEP RF interface is activated synchronously, and so on.

242. The NFCC receives a data frame.

Specifically, the NFCC receives the data frame sent by the second terminal.

243. Determine whether the activated protocol is the NFC-DEP protocol.

Specifically, when determining that the activated protocol is the NFC-DEP protocol, the NFCC performs step 244 or 245 or 246, or else, performs step 247.

For example, the NFCC may determine: when the activated RF interface is the NFC-DEP RF interface, the currently activated RF protocol is the NFC-DEP protocol; or when a format of the data frame is a Near Field Communication Data Exchange Protocol frame format NFC-DEP frame format, the currently activated RF protocol is the NFC-DEP protocol; or when the RF protocol activation command received in the RF protocol activation phase is an attribute request ATR_REQ command, the currently activated RF protocol is a first RF protocol.

It should be noted that, when the NFCC has determined that the currently activated RF interface is the NFC-DEP RF interface or the frame RF interface, step 244 may be omitted.

Herein the determining whether the activated protocol is the NFC-DEP protocol may correspond to the corresponding determining method in the embodiment in FIG. 1. To avoid repetition, details are not described again herein.

244. Determine a type of a currently activated RF interface.

Specifically, the NFCC determines the type of the currently activated RF interface by determining whether the mapped RF interface configured by the DH for the NFC-DEP protocol is the NFC-DEP RF interface or the frame RF interface, or directly determining which RF interface the currently activated RF interface is.

When the RF interface is the frame radio frequency frame RF interface, step 246 is performed. When the RF interface is the NFC-DEP interface, step 245 is performed.

It should be noted that, step 244 is optional.

245. The NFCC searches for a route target according to a listen mode routing table, and routes the data frame to the route target.

The route target may be the DH, or may be understood as a DH-NFCEE.

It should be noted that, step 245 is optional.

246. The NFCC routes the data frame to the DH to perform data exchange.

247. The NFCC searches for a route target according to a forced NFCC routing mechanism, and routes the data frame.

The route target may be a forced NFCEE.

In this step, in the search for the route target based on the forced NFCEE routing mechanism, corresponding processing may be performed according to whether the routing mechanism is available in the current power state (because the power state may change from the RF discovery phase to the current data exchange phase), for example, whether the bit value of the current power state corresponding to the routing mechanism is 1b; and if the routing mechanism is available, the route target is determines as the forced NFCEE; or if the routing mechanism is unavailable, the data frame is ignored.

248. End the procedure.

It should be noted that, step 244 in this embodiment of the present invention may be omitted. That is, when the NFCC determines that the activated protocol is the NFC-DEP protocol, the NFCC may directly forward the data frame to the DH; or directly search for the route target by using the second routing mechanism (namely, the listen mode routing mechanism or the protocol-based routing entry), and route the data frame to the route target.

In addition, for steps 243 to 247, after the foregoing step 242, whether the first routing mechanism is available in the current power state may be further determined first; and if the first routing mechanism is available, processing is performed according to the type of the currently activated RF protocol, that is, the route target is searched for in manners of step 244 and step 247 respectively; or if the first routing mechanism is unavailable, processing is also performed according to the type of the currently activated RF protocol, but in this case, a processing result of step 247 is different. In this case, the result of step 247 is determining to ignore the data frame, but when the first routing mechanism is available in the current power state, the result of step 247 is determining that the forced NFCEE is the route target.

Therefore, in this embodiment of the present invention, when the first routing mechanism (such as forced NFCEE routing) is enabled, when the bit (current power state bit) of the current power state is set to 1, the routing mechanism to be used is determined according to the RF protocol corresponding to the received data frame or even the currently activated RF interface, that is, determining whether to route the data frame by using the second routing mechanism (such as the listen mode routing mechanism) or route the data frame by using the first routing mechanism, or directly forwarding the data frame to the DH or the DH-NFCEE. When the current power state bit is set to 0, a routing process about whether to respond and how to respond is determined according to the received RF protocol activation command or even the RF interface mapped by the DH to the to-be-activated RF protocol. Therefore, in this embodiment of the present invention, for different protocol types, different processing modes are used for data frames. Therefore, a problem that when a specific NFCEE (also referred to as the first NFCEE, for example, a standalone SE) is enabled, a P2P application on another entity (such as a DH) cannot be used normally is resolved, and both the card emulation application and the P2P application can be used normally in this case.

Figure 3:
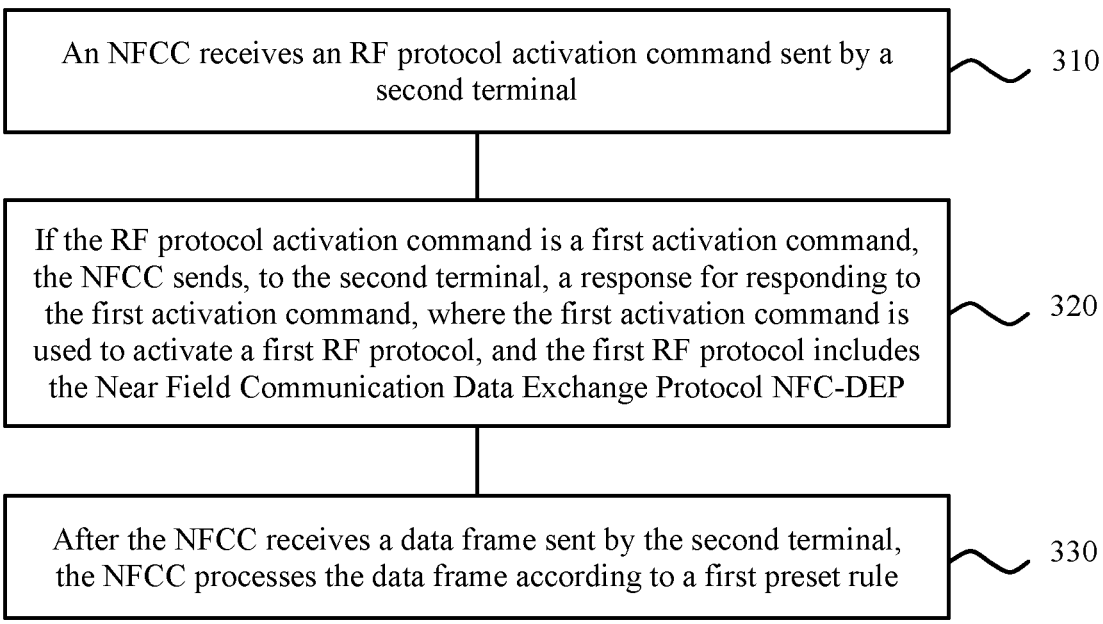
FIG. 3 is a schematic flowchart of a method for routing a data frame according to another embodiment of the present invention.

FIG. 3 is a schematic flowchart of a method for routing a data frame according to an embodiment of the present invention. The method shown in FIG. 3 is applied to a first terminal. The first terminal includes a device host DH and a near field communication controller NFCC. The method shown in FIG. 3 may be considered as an example when a first routing mechanism in FIG. 1 is enabled and the first routing mechanism is unavailable in a current power state (for example, a bit value corresponding to a current power state (current power state) in a power state (forced power state) field configured by the DH for the first routing mechanism is a first preset value (such as 0 b)). For corresponding content in FIG. 3 and FIG. 1, refer to corresponding descriptions in FIG. 1. To avoid repetition, detailed descriptions are appropriately omitted herein.

Specifically, the method 300 shown in FIG. 3 includes the following steps.

310. The NFCC receives an RF protocol activation command sent by a second terminal.

320. If the RF protocol activation command is a first activation command, the NFCC sends, to the second terminal, a response for responding to the first activation command, where the first activation command is used to activate a first RF protocol, and the first RF protocol includes the Near Field Communication Data Exchange Protocol NFC-DEP.

330. After the NFCC receives a data frame sent by the second terminal, the NFCC processes the data frame according to a first preset rule.

Specifically, in a listen mode, the NFCC receives the RF protocol activation command sent by the second terminal, where the RF protocol activation command may be the first activation command or a second activation command. The first activation command is used to activate the first RF protocol. For example, the first activation command may be ATR_REQ. The second activation command may be an RATS or ATTRIB command (Command) used to activate the ISO-DEP protocol. In this embodiment, the NFCC may determine a type of the RF protocol activation command, and in a specific implementation, may determine whether the RF protocol activation command is the first activation command, or may determine whether the RF protocol activation command is the second activation command. If the RF protocol activation command is the first activation command, the NFCC sends, to the second terminal, the response (such as ATR_RES defined in the Digital protocol) for responding to the first activation command, so as to activate the first RF protocol. After the NFCC receives the data frame (for example, a data frame of a P2P application) sent by the second terminal, the NFCC processes the data frame according to the first preset rule.

Specifically, in this embodiment of the present invention, when the NFCC determines that the first routing mechanism is enabled but is unavailable in a current power state, if the received RF protocol activation command is the first activation command, the NFCC sends, to the second terminal, the response for responding to the first activation command, so as to activate the first RF protocol; if the received RF protocol activation command is not the first activation command, that is, it is the second activation command, the NFCC does not respond or sends an error response to the second terminal. In this embodiment of the present invention, the first RF protocol may further include other protocols, as long as a data type corresponding to the first RF protocol is P2P application data. This embodiment of the present invention is not limited to the NFC-DEP protocol. A second RF protocol may include the ISO Data Exchange Protocol (ISO-DEP, ISO Data Exchange Protocol), the Type 1 Tag (T1T, Type 1 Tag) protocol, the Type 2 Tag (T2T, Type 2 Tag) protocol, the Type 3 Tag (T3T, Type 3 Tag) protocol, or the Type 5 Tag (T5T, Type 5 Tag) protocol.

Therefore, in this embodiment of the present invention, when the first routing mechanism is in an enabled state but is unavailable in the current power state, after the received RF protocol activation command is determined as the first activation command, the response for responding to the first activation command is sent to the second terminal, so as to activate the first protocol (for example, the NFC-DEP protocol). In addition, after receiving the data frame sent by the second terminal, the NFCC processes the data frame according to the first preset rule. Therefore, when the first routing mechanism is enabled, the P2P application is normally used, and a problem that P2P communication cannot be performed because an RF protocol required for P2P communication cannot be activated when the first routing mechanism is in an enabled state but is unavailable in a current power state in the prior art is resolved.

Optionally, in another embodiment, a mapped RF interface configured by the DH for the first RF protocol includes an NFC-DEP RF interface or a frame RF interface, and that the NFCC sends, to the second terminal, a response for responding to the first activation command includes:

if the mapped RF interface is the NFC-DEP RF interface, the NFCC directly sends, to the second terminal, the response for responding to the first activation command; or if the mapped RF interface is the frame RF interface, the NFCC forwards the first activation command to the DH, and sends, to the second terminal, a response that is sent by the DH and used for responding to the first activation command.

That is, the NFCC may send, to the second terminal according to a type of the mapped RF interface configured by the DH for the first RF protocol, the response for responding to the first activation command, so as to activate the first RF protocol. Specifically, in the listen mode, the NFCC receives the RF protocol activation command sent by the second terminal, where the RF protocol activation command may be the first activation command or the second activation command, and the first activation command is used to activate the first RF protocol. If the RF protocol activation command is the first activation command, the NFCC sends, to the second terminal, the response (such as ATR_RES defined in the Digital protocol) for responding to the first activation command, so as to activate the first RF protocol. Specifically, the NFCC may send, to the second terminal according to the type of the mapped RF interface configured by the DH for the first RF protocol, the response for responding to the first activation command, so as to activate the first RF protocol.

It should be noted that, the NFCC may also send, to the second terminal according to a type of a default RF interface mapped to the first RF protocol, the response for responding to the first activation command. Specifically, because the default RF interface of the NFCC, mapped to the first RF protocol (such as the NFC-DEP protocol), is a first RF interface (such as the NFC-DEP RF interface), the NFCC may directly send, to the second terminal, the response (namely, ATR_RES) for responding to the first activation command.

Optionally, in another embodiment, the method further includes:

when the RF protocol activation command is a second activation command, the NFCC sends no response or sends an error response to the second terminal.

Specifically, when the RF protocol activation command is the second activation command, the NFCC may also not respond or may send an error response to the peer. In this case, the NFC communication is terminated, and the second terminal does not send the data frame to the NFCC. Specifically, when the NFCC receives the RF protocol activation command, if it is determined that the first routing mechanism (such as forced NFCEE routing) is enabled (namely, enabled), but the first routing mechanism is unavailable in the current power state (for example, a bit value corresponding to the current power state (current power state) in a power state (such as a forced power state) octet configured by the DH for the routing mechanism is 0 b), the NFCC may not respond or may directly send an error response to the second terminal.

Optionally, in another embodiment, that the NFCC processes the data frame according to a first preset rule includes:

the NFCC routes the data frame according to a second routing mechanism; or the NFCC forwards the data frame to the DH.

Optionally, in another embodiment, that the NFCC processes the data frame according to a first preset rule includes:

if a currently activated RF interface is an NFC-DEP RF interface, the NFCC routes the data frame according to the second routing mechanism; or if a currently activated RF interface is a frame radio frequency frame RF interface, the NFCC forwards the data frame to the DH.

In this embodiment of the present invention, for the process of processing the data frame according to the first preset rule, refer to corresponding descriptions about processing the data frame according to the first preset rule in FIG. 1. To avoid repetition, details are not described again herein.

Optionally, in another embodiment, the second routing mechanism includes a protocol-based route selection mechanism or a listen mode routing listen mode routing mechanism.

In this embodiment of the present invention, for descriptions about the second routing mechanism and a manner of processing the data frame by the NFCC according to the second routing mechanism, refer to the corresponding descriptions in FIG. 1. To avoid repetition, details are not described again herein.

Optionally, in another embodiment, the method further includes:

the NFCC receives the first routing mechanism that is configured by the DH for the NFCC after the DH learns information about a first NFCEE from the NFCC, where the information about the first NFCEE is reported to the DH when the NFCC performs NFCEE discovery, or is fed back to the DH after the NFCC receives a request of the DH, and the information about the first NFCEE includes at least information indicating that the first NFCEE is a standalone secure element standalone SE.

In this embodiment of the present invention, the information about the first NFCEE may further include parameters related to RF technologies supported by an application in the first NFCEE (such as a card emulation application or an NFC tag), parameters related to supported RF protocols, and the like.

Correspondingly, after obtaining the information, the DH may further configure, for the NFCC, appropriate RF parameters for an application on the DH according to the information. For example, RF technology parameters for the application on the DH are configured for the NFCC. Specifically, if the RF technologies supported by the application in the first NFCEE include an NFC-A technology, the DH may configure, for the NFCC, parameters related to an NFC-F technology for a P2P application on the DH. In this way, the second terminal can detect, by performing an NFC-F technology detection process in an RF discovery process, an RF protocol corresponding to the P2P application on the DH. For another example, content about the second routing mechanism for the application on the DH, such as a protocol-based routing entry or a technology-based routing entry in a routing table corresponding to the listen mode routing mechanism, is configured for the NFCC. Specifically, if the RF technologies supported by the application in the first NFCEE include the NFC-F technology, the DH may set an NFC-A technology-based routing entry pointing to the DH and/or set an NFC-F technology-based routing entry pointing to the first NFCEE, and the like, in addition to setting an NFC-DEP protocol-based routing entry pointing to the DH. The settings are not enumerated exhaustively herein.

Optionally, in another embodiment, the first routing mechanism is a forced near field communication execution environment routing forced NFCEE routing mechanism.

Optionally, in another embodiment, the method further includes:

the NFCC receives RF parameters configured by the DH for an application that complies with the NFC-DEP protocol on the DH, and receives RF parameters configured by the first NFCEE for an application that complies with a non NFC-DEP protocol in the first NFCEE.

In this embodiment of the present invention, when configuring RF parameters related to the P2P application on the DH for the NFCC, the DH may consider the information about the first NFCEE as described above. Details are not described again herein.

Figure 4:
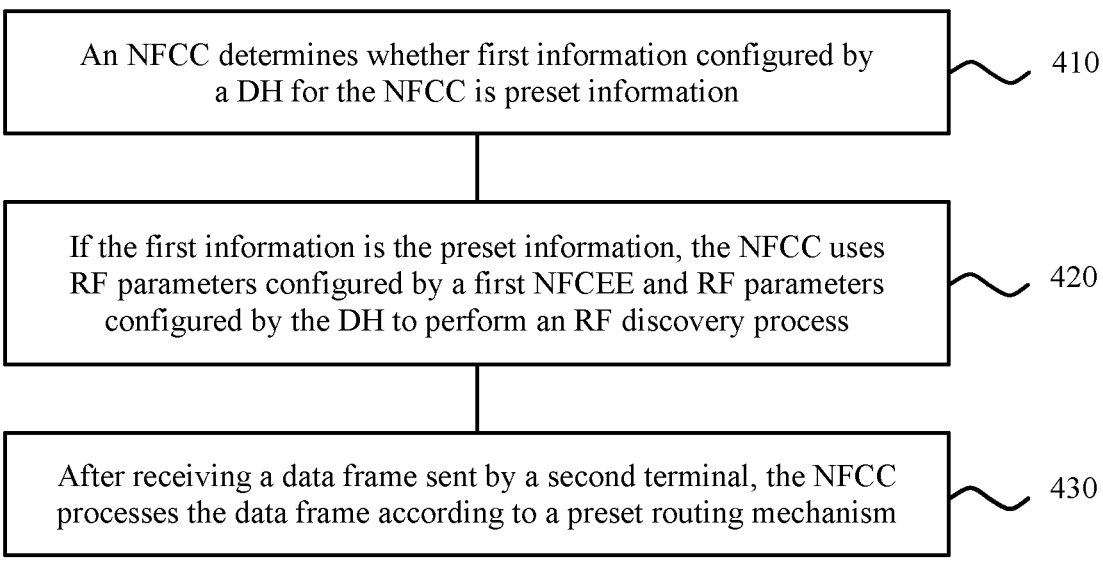
FIG. 4 is a schematic flowchart of a method for routing a data frame according to another embodiment of the present invention.

In this embodiment of the present invention, for the definition of the first routing mechanism, the configuration of the first routing mechanism, and specific manners in which the NFCC obtains the RF parameter related to the application that complies with the NFC-DEP protocol on the DH and the RF parameter related to the application that complies with the non NFC-DEP protocol in the first NFCEE, and the NFCC manages and combines the RF parameters from different entities, refer to the corresponding descriptions in FIG. 1 or FIG. 4. To avoid repetition, details are not described again herein.

In addition, in this embodiment of the present invention, when the NFCC determines that the first routing mechanism is enabled and is available in the current power state, if the received RF protocol activation command is the first activation command, the NFCC sends, to the second terminal, the response for responding to the first activation command, so as to activate the first RF protocol, and then, when receiving, in the data exchange phase, the data frame sent by the second terminal, the NFCC may also process the data frame by using the first preset rule; or if the received RF protocol activation command is the second activation command, the NFCC sends, to the second terminal, the response for responding to the second activation command, so as to activate the second RF protocol, and then, when receiving, in the data exchange phase, the data frame sent by the second terminal, the NFCC may process the data frame by using the first routing mechanism.

FIG. 4 is a schematic flowchart of a method for routing a data frame according to an embodiment of the present invention. The method shown in FIG. 4 is applied to a first terminal. The first terminal includes a device host DH and a near field communication controller NFCC. The method 400 shown in FIG. 4 includes the following steps.

410. The NFCC determines whether first information configured by the DH for the NFCC is preset information.

The preset information is used to indicate that a first routing mechanism is unavailable (it may be considered that the first routing mechanism is disabled, or it may be considered that the first routing mechanism is enabled but subsequently the mechanism is not used to route a data frame), and radio frequency RF parameters configured by a specific NFCEE (referred to as a first NFCEE herein) and RF parameters configured by the DH are available.

For example, the first information may be a forced NFCEE routing state, the first routing mechanism may be a forced NFCEE routing mechanism, and the first NFCEE may be a forced NFCEE in the forced NFCEE routing mechanism.

It should be noted that, the first information is not limited to the forced NFCEE routing state, and may also be other information configured by the DH. For example, the DH configures the first information for the NFCC by using another command, where the first information is used to instruct the NFCC to use, in an RF discovery process, the RF parameters configured by the specific NFCEE and the DH, and instruct the NFCC not to use the first routing mechanism in a data exchange phase to search for a route target for the data frame, but to use the foregoing second routing mechanism (such as a listen mode routing mechanism, or a protocol-based routing entry mode or a technology-based routing entry mode) or another mechanism to search for the route target. The another mechanism directly forwards the data frame to the DH if it is found that the received data frame is NFC-DEP protocol data, or directly forwards the data frame to the first NFCEE if it is found that the received data frame is non NFC-DEP protocol (such as the ISO-DEP protocol, or the T1T/T2T/T3T/T5T protocol) data. In summary, a manner of configuring the first information is not limited in the present invention.

Assuming that the first information is the forced NFCEE routing state, the following describes a specific example of configuring the first information by the DH. For example, when the DH configures the forced NFCEE routing mechanism for the NFCC, the DH sets the first NFCEE as the forced NFCEE, and sets the forced NFCEE routing state of the forced NFCEE routing mechanism to a preset value, where the preset value indicates that the NFCC accepts RF configurations of both the DH and the forced NFCEE, but the forced NFCEE routing mechanism is disabled (namely, unavailable); in addition, when the DH configures a listen mode routing table for the NFCC, the DH configures an NFC-DEP protocol-based routing entry and/or an NFC-A/NFC-F technology-based routing entry pointing to the DH, and an ISO-DEP protocol-based routing entry and/or an NFC-A/NFC-B/NFC-F/NFC-V technology-based routing entry pointing to the forced NFCEE.

In this embodiment of the present invention, the DH may configure the preset value by using a specific command (such as RF_SET_FORCED_NFCEE_ROUTING_CMD). For example, the preset value may be 2 in the following Table 7, or 2 in the following Table 8. This is not limited in this embodiment of the present invention.

TABLE 7

RF_SET_FORCED_NFCEE_ROUTING_CMD

| Payload field | Length | Value or definition |
|---|---|---|
| Forced NFCEE routing state | 1 octet | 0 - The forced NFCEE routing mechanism is disabled (namely, unavailable), and the NFCC accepts only the RF parameters configured by the DH.<br>1 - The forced NFCEE routing mechanism is enabled (namely, available), and the NFCC accepts only the RF parameters configured by the NFCEE.<br>2 - The forced NFCEE routing mechanism is disabled (namely, unavailable), and the NFCC accepts only the RF parameters configured by the DH and the RF parameters configured by the NFCEE. |
| Forced NFCEE value field | 0 or 2 octets | Used to set an identifier (NFCEE ID) of the first NFCEE and a value of a power state field in this field (forced power state, used to indicate a power state that the routing mechanism is applicable to).<br>If a value of the forced NFCEE routing state is set to 0 or 2, this field does not exist. |

TABLE 8

RF_SET_FORCED_NFCEE_ROUTING_CMD

| Payload field | Length | Value or definition |
|---|---|---|
| Forced NFCEE routing state | 1 octet | First state: 0 - The forced NFCEE routing mechanism is disabled (that is, unavailable, forced NFCEE routing disabled).<br>Second state: 1 - Available sub-state 1 of the forced NFCEE routing mechanism (forced NFCEE routing enabled sub-state 1).<br>Third state: 2 - Available sub-state 2 of the forced NFCEE routing mechanism (forced NFCEE routing enabled sub-state 2). |
| Forced NFCEE value field | 0 or 2 octets | Used to set the identifier (NFCEE ID) of the first NFCEE and the value of the power state field in this field (forced power state, used to indicate the power state that the routing mechanism is applicable to).<br>If the value of the forced NFCEE routing state is set to 0 or 2, this field does not exist. |

For Table 7, when the first information configured by the DH for the NFCC is the preset information, that is, a value corresponding to the first information is the preset value 2, the NFCC determines that the mechanism corresponding to the value 1 of the first information or a function equivalent to the mechanism is unavailable, that is, the NFCC determines that the forced NFCEE routing mechanism or a function equivalent to the mechanism is unavailable. In this case, for a subsequently received data frame, the NFCC cannot route the data frame according to the forced NFCEE routing mechanism as described in the foregoing embodiment, but uses the processing method in a subsequent step in this embodiment.

For Table 8, when the first information configured by the DH for the NFCC is the preset information, that is, the value corresponding to the first information is the preset value 2, the NFCC determines that the mechanism corresponding to the value 1 of the first information (the available sub-state 1 of the forced NFCEE routing in Table 8) or the function equivalent to the mechanism is unavailable, that is, the NFCC determines that the forced NFCEE routing mechanism or the function equivalent to the mechanism is unavailable. In this case, for a subsequently received data frame, the NFCC cannot route the data frame according to the forced NFCEE routing mechanism as described in the foregoing embodiment, but uses the processing method in a subsequent step in this embodiment.

Based on the foregoing example, in the RF discovery process, the NFCC determines whether the value of the forced NFCEE routing state is a preset value, that is, the NFCC determines whether the value of the forced NFCEE routing state is 2.

It should be noted that, before step 410, the NFCC may receive RF parameters configured by the DH for an application that complies with the NFC-DEP protocol on the DH, and receives RF parameters configured by the forced NFCEE for an application that complies with a non NFC-DEP protocol in the forced NFCEE.

420. If the first information is the preset information, the NFCC uses RF parameters configured by a first NFCEE and RF parameters configured by the DH to perform an RF discovery process.

Based on the example of step 410, when the value of the first information is 2, the NFCC uses the RF parameters configured by the first NFCEE and the RF parameters configured by the DH to perform the RF discovery process.

In this step, the NFCC needs to use the RF parameters configured by the first NFCEE and the RF parameters configured by the DH to perform the RF discovery process. Specifically, the NFCC manages, for example, combines or replaces, the RF parameters configured by the first NFCEE and the RF parameters configured by the DH. This is not limited in the present invention.

For RF parameter management, the following may use an example for description.

For example, when a P2P application on the DH supports NFC-A and NFC-F, RF parameters configured by the DH for the NFCC include NFC-A technology parameters (such as Listen A Parameters defined in the NCI specification), NFC-F technology parameters (such as Listen F Parameters defined in the NCI specification), and certainly, may also include NFC-DEP protocol parameters (such as Listen NFC-DEP Parameters defined in the NCI specification); when a card emulation application in the first NFCEE supports an NFC-B technology and supports the ISO-DEP protocol, RF parameters configured by the first NFCEE for the NFCC include NFC-B technology parameters (such as Listen B Parameters defined in the NCI specification), and certainly, may also include ISO-DEP protocol parameters (such as Listen ISO-DEP Parameters defined in the NCI specification); in this case, the NFCC may combine the RF parameters respectively configured by the DH and the first NFCEE. In this way, when the first terminal works in a listen mode, by performing an RF discovery process, the second terminal may detect all RF protocols supported on the first terminal, namely, the NFC-DEP protocol corresponding to the P2P application on the DH and the ISO-DEP protocol corresponding to the card emulation application in the first NFCEE.

For another example, when a P2P application on the DH supports NFC-A and NFC-F, RF parameters configured by the DH for the NFCC include NFC-A technology parameters and NFC-F technology parameters, and may also include NFC-DEP protocol parameters; when a card emulation application in the first NFCEE supports an NFC-A technology and supports the ISO-DEP protocol, RF parameters configured by the first NFCEE for the NFCC include NFC-A technology parameters, and may also include ISO-DEP protocol parameters; in this case, the NFCC may replace the NFC-A technology parameters configured by the DH with the NFC-A technology parameters configured by the first NFCEE. Therefore, in an RF discovery process, the second terminal can try best to detect all RF protocols supported on the first terminal.

In summary, when the RF technology supported by the application in the first NFCEE overlaps or conflicts with the RF technology supported by the application on the DH, the NFCC may correspondingly replace, in the foregoing manner, the RF parameters configured by the DH with the RF parameters configured by the first NFCEE. Certainly, other manners may be used, and a specific manner is determined by an implementer (for example, an NFC chip vendor). This is not limited in the present invention.

Certainly, a prerequisite for managing the RF parameters by the NFCC is that the NFCC has a capability of managing or combining RF parameters, and that the DH allows the NFCC to perform parameter management. For example, the DH may determine, by configuring a value of an NFCC_CONFIG_CONTROL parameter, whether to allow the NFCC to perform parameter management.

430. After receiving a data frame sent by a second terminal, the NFCC processes the data frame according to a preset routing mechanism.

Optionally, in step 430, when an activated RF interface is an NFC-DEP RF interface, or an activated RF interface is an ISO-DEP RF interface, or an activated RF interface is a frame RF interface, and an activated RF protocol is a non NFC-DEP protocol, the NFCC searches for the route target (1) according to the listen mode routing mechanism (that is, according to the listen mode routing table), or (2) according to a protocol-based route selection process or a technology-based route selection process, or (3) directly according to a corresponding protocol-based routing entry or a technology-based routing entry (for example, when the data frame corresponds to the NFC-DEP protocol, directly using the NFC-DEP protocol-based routing entry; if the data frame corresponds to the NFC-A technology, directly using the NFC-A technology-based routing entry, or the like), and forwards the data frame to the route target, where the route target is the DH or the specific NFCEE (the first NFCEE). The foregoing listen mode routing mechanism and the protocol-based route selection process are the same as those in the corresponding descriptions in the foregoing embodiment, and details are not described again herein. The technology-based route selection process is similar to the foregoing protocol-based route selection process, except that the protocol-based routing entry is replaced with the technology-based routing entry.

Optionally, in another embodiment, in step 420, the RF discovery process is a process in which the NFCC notifies the second terminal of all RF protocols supported on the first terminal, so that the second terminal sends a corresponding data frame to the first terminal according to one of all the RF protocols. The one of all the RF protocols includes the NFC-DEP protocol or the non NFC-DEP protocol.

Alternatively, in another embodiment, in step 430, the RF protocol corresponding to the data frame sent by the second terminal and received by the NFCC is one of all the RF protocols supported by the first terminal and detected by the second terminal by performing an RF sending process. The RF protocol corresponding to the data frame includes the NFC-DEP protocol or the non NFC-DEP protocol.

In this embodiment of the present invention, the P2P application on the DH in the first terminal may support the NFC-DEP protocol, and a non P2P application (such as a card emulation application or an NFC tag) in the first NFCEE may support the non NFC-DEP protocol. Specifically, in another embodiment, in step 430, when an activated RF protocol is the Near Field Communication Data Exchange Protocol NFC-DEP, the NFCC routes the data frame according to a protocol-based route selection mechanism, or the NFCC forwards the data frame to the DH; or when an activated RF protocol is a non NFC-DEP protocol, the NFCC routes the data frame according to a protocol-based route selection mechanism or a technology-based route selection mechanism, or the NFCC forwards the data frame to the first NFCEE.

In this embodiment of the present invention, the protocol/technology-based route selection mechanism, namely, the protocol/technology-based route selection process, is the same as that in the corresponding descriptions in the foregoing embodiment. Details are not described again herein. In addition, in this embodiment, if the activated RF protocol is the NFC-DEP protocol or the non NFC-DEP protocol, the NFCC may also route the received data frame directly based on a corresponding protocol-based routing entry or based on a corresponding technology-based routing entry, or according to the listen mode routing mechanism, as described in the foregoing Embodiment 1. Specific manners are not described again herein.

Further, a protocol-based routing entry corresponding to the protocol-based route selection mechanism includes at least an NFC-DEP protocol-based routing entry pointing to the DH, and a non NFC-DEP protocol-based routing entry pointing to the first NFCEE; or a protocol-based routing entry corresponding to the protocol-based route selection mechanism includes at least an NFC-DEP protocol-based routing entry pointing to the DH, and a technology-based routing entry corresponding to the technology-based route selection mechanism includes at least a routing entry based on a first RF technology and pointing to the first NFCEE, where the first RF technology includes at least one of the NFC-A technology, the NFC-B technology, an NFC-F technology, or an NFC-V technology.

Optionally, in another embodiment, in step 430, the NFCC routes the data frame according to the second routing mechanism, where the second routing mechanism includes the listen mode routing listen mode routing mechanism.

In this embodiment of the present invention, the NFCC uses both the RF parameters configured by the first NFCEE and the RF parameters configured by the DH to complete activation of the RF protocol and the RF interface; then after receiving the data frame sent by the peer NFC device, the NFCC searches for the route target according to the second routing mechanism (that is, according to the listen mode routing table), so as to forward the data frame to the route target. In the listen mode routing table, an NFC-DEP protocol-based routing entry needs to point to the DH, or an NFC-A or NFC-F technology-based routing entry needs to point to the DH. In this way, it may be ensured that received P2P application data can be routed to the DH.

Therefore, in this embodiment of the present invention, when the current first information is the preset information, the NFCC uses both the RF parameters configured by the first NFCEE and the RF parameters configured by the DH to perform the RF discovery process. In this way, it is ensured that when a P2P application exists on the DH of the first terminal and a non P2P application exists in the first NFCEE, the RF discovery process may allow the peer second terminal to discover the local P2P application and the non P2P application (that is, discover a first RF protocol corresponding to the local P2P application and a second RF protocol corresponding to the non P2P application), so that the second terminal activates a corresponding RF protocol (such as the NFC-DEP protocol or a non NFC-DEP protocol) according to a service requirement; in the data exchange phase after the RF protocol activation, that is, after the data frame sent by the second terminal is received, the data frame is processed according to a preset routing rule. This resolves a problem that a P2P service on a DH is unavailable because an RF protocol (such as the NFC-DEP protocol) corresponding to a P2P application on the DH cannot be detected by a peer by performing an RF discovery process when some specific NFCEEs (such as a standalone SE) are enabled in the prior art.

It should be understood that, the non NFC-DEP protocol in this embodiment of the present invention may include the ISO Data Exchange Protocol (ISO-DEP, ISO Data Exchange Protocol), the Type 1 Tag (T1T, Type 1 Tag) protocol, the Type 2 Tag (T2T, Type 2 Tag) protocol, the Type 3 Tag (T3T, Type 3 Tag) protocol, or the Type 5 Tag (T5T, Type 5 Tag) protocol.

Optionally, in another embodiment, a routing table configured by the DH for the second routing mechanism includes at least an NFC-DEP protocol-based routing entry pointing to the DH, or a routing entry based on a first RF technology and pointing to the DH, where the first RF technology includes at least one of the NFC-A technology or an NFC-F technology.

Further, in another embodiment, when the routing table includes the NFC-DEP protocol-based routing entry pointing to the DH, the routing table further includes a non NFC-DEP protocol-based routing entry pointing to the first NFCEE, and/or a routing entry based on a second RF technology and pointing to the first NFCEE, where the second RF technology includes at least one of the NFC-A technology, the NFC-B technology, the NFC-F technology, or an NFC-V technology; or when the routing table includes the routing entry based on the first RF technology and pointing to the DH, the routing table further includes a non NFC-DEP protocol-based routing entry pointing to the first NFCEE, and/or a routing entry based on a third RF technology and pointing to the first NFCEE, where the third RF technology includes at least one of the NFC-A technology, the NFC-B technology, the NFC-F technology, or an NFC-V technology except the first RF technology.

Specifically, with respect to a configuration of the listen mode routing table, if the DH configures the NFC-DEP protocol-based routing entry pointing to the DH, the DH may configure, according to an RF protocol type (such as the ISO-DEP protocol, or the T1T/T2T/T3T/T5T protocol) or an RF technology type (such as NFC-A/NFC-B/NFC-F/NFC-V) supported by a contactless application in the first NFCEE (such as a standalone SE), a corresponding protocol-based routing entry or technology-based routing entry pointing to the standalone SE. Alternatively, if the DH configures, according to an RF technology type (such as NFC-A/NFC-F) supported by the P2P service, a corresponding technology-based routing entry pointing to the DH, the DH may configure, according to an RF protocol type or an RF technology type supported by a contactless application in the first NFCEE, a corresponding protocol-based routing entry or technology-based routing entry pointing to a standalone SE. In this case, the configured technology-based routing entry pointing to the NFCEE and the technology-based routing entry pointing to the DH cannot be based on a same RF technology. For example, if the P2P service on the DH supports NFC-A and NFC-F technologies, and the contactless application in the NFCEE supports the NFC-A technology, the DH may set a routing entry based on the NFC-A technology (namely, an NFC-A technology-based routing entry) pointing to the NFCEE, and set a routing entry based on the NFC-F technology (namely, an NFC-F technology-based routing entry) pointing to the DH. Other setting modes are not enumerated exhaustively herein.

With respect to configurations of RF parameters, if a P2P application exists on the DH, the DH configures parameters (including a poll side and a listen side) related to the NFC-A technology and/or the NFC-F technology and parameters (including a poll side and a listen side) related to the NFC-DEP protocol for the NFCC; if a contactless application exists on a standalone SE, the standalone SE configures parameters (listen side) of a corresponding RF technology and parameters (listen side) related to a corresponding RF protocol for the NFCC. When the RF technology supported by the application on the standalone SE includes NFC-A and/or NFC-F, the NFCC may replace, by using RF technology parameters corresponding to a card application on the standalone SE, RF technology parameters corresponding to the P2P application on the DH, or may combine RF technology parameters instead of replacement. For RF parameter management, refer to the corresponding descriptions above. Details are not described again herein.

Optionally, in an embodiment, the method in this embodiment of the present invention may further include:

the NFCC sends information about the first NFCEE to the DH, where the information about the first NFCEE is reported to the DH when the NFCC performs NFCEE discovery, or is fed back to the DH when the NFCC receives a request of the DH; and the information about the first NFCEE includes that the first NFCEE is a standalone secure element standalone SE, and/or an RF protocol type or an RF technology type supported by an application in the first NFCEE.

The preset information and/or routing table described above may be configured by the DH for the NFCC according to the information about the first NFCEE.

For example, when a standalone SE exists on the first terminal and the SE is enabled, the NFCC may obtain information about the SE by performing an NFCEE discovery process, and then report the information about the SE to the DH by using NFCEE_DISCOVER_NTF. A reporting manner is extended by using the following table, for example:

adding a state to an NFCEE status (NFCEE Status): 0x03, indicating that the standalone SE is enabled; or making an extension in NFCEE information TLV (NFCEE Information TLV) [0 . . . m] shown in Table 8, and adding a type type: 0x05, indicating that the first NFCEE is a standalone SE.

The foregoing is only two examples. This is not limited in the solution of the present invention. In addition, in the solution of the present invention, the standalone SE and the information about the standalone SE may be obtained by other means. The information is the RF protocol type supported by the contactless application (such as the card emulation application or the NFC tag) or the RF technology, or the like.

TABLE 9

NFCEE_DISCOVER_NTF

| Payload field | Length | Value or definition | |
|---|---|---|---|
| . . . | | | |
| NFCEE status | 1 octet | . . . 0x03 0x04 0x03 to 0xFF | The standalone SE is enabled. The standalone SE is not enabled. RFU |
| . . . | | | |
| NFCEE information type-length-value TLV [0 . . . m] | x + 2 octets | Type Type Length Length Value Value | 1 octet 1 octet x octets | Indicates a type field in the NFCEE information TLV. Refer to Table 10. Indicates a length of a value field. Indicates the value field in the NFCEE information TLV. |
| . . . | | | |

TABLE 10

TLV coding

| Type | Length | | |
|---|---|---|---|
| Type | Length | Value | Value |
| . . . | | | |
| 0x05 | n | Information about the specific NFCEE, for example, information about the contactless application in the | |

TABLE 10-continued

TLV coding

| Type | Length | | |
|---|---|---|---|
| Type | Length | Value | Value |
| | | NFCEE, such as the supported RF technology or RF protocol. | |
| . . . | | | |

It should be understood that, in this embodiment of the present invention, the manner of configuring the RF parameters by the DH and the NFCEE for the NFCC is similar to the foregoing manner of configuring the RF parameters by the DH and the NFCEE for the NFCC. Details are not described again herein.

The foregoing describes the method for using RF parameters and routing a data frame by the NFCC when the first information is the preset information. The following describes a specific data routing method when the first information is not the preset information. Different routing methods are used for different preset information, and are described separately by using examples.

Alternatively, in another embodiment, if the first information is not the preset information, the method may further include:

when the first information is used to indicate that the first routing mechanism is unavailable, and the NFCC uses only the RF parameters configured by the DH, the NFCC uses the RF parameters configured by the DH to perform the RF discovery process; and after the NFCC receives the data frame sent by the second terminal, the NFCC routes the data frame according to the second routing mechanism.

Based on the example in step 410 in which the first information is the forced NFCEE routing state, when the value of the first information is the value 0 shown in Table 7 or the value 0 of the first state shown in Table 8, the NFCC uses only the RF parameters configured by the DH. In this case, the NFCC uses the RF parameters configured by the DH to perform the RF discovery process.

That is, if the first information is a non preset value, for example, 0, and the non preset value indicates that the NFCC is allowed to use only the RF parameters configured by the DH, the NFCC completes the RF discovery process by using the RF parameters configured by the DH, and then searches for the route target according to the listen mode routing table after receiving the data frame, so as to route the data frame.

In a specific implementation, when the first NFCEE (such as the standalone SE) is not enabled, for example, when at least one another NFCEE on the first terminal is in the enabled state, the DH may perform computation on the RF parameters related to the P2P application on the DH and RF parameters related to an application in the another NFCEE, and then configure the RF parameters for the NFCC (including the foregoing listen mode routing table). In this case, the NFCC may route the received data frame by using the listen mode routing table and based on the listen mode routing mechanism.

For details, refer to the specific process of searching for a route target according to the listen mode routing routing mechanism in FIG. 1. To avoid repetition, details are not described again herein.

Alternatively, in another embodiment, if the first information is not the preset information, the method may further include:

when the first information is used to indicate that the first routing mechanism is available, and the NFCC uses only the RF parameters configured by the first NFCEE, the NFCC uses the RF parameters configured by the first NFCEE to perform the RF discovery process; and after the NFCC receives the data frame sent by the second terminal, the NFCC routes the data frame according to the first routing mechanism.

For example, the first information is the forced NFCEE routing state. When the value of the first information is the value 1 shown in Table 7 or the value 1 of the second state shown in Table 8, the NFCC determines, according to the first routing mechanism, that the first NFCEE is the route target, and forwards the data frame to the first NFCEE.

That is, if the first information is a non preset value, for example, 1, and the non preset value indicates that the NFCC is allowed to use only the RF parameters configured by the first NFCEE, the NFCC completes the RF discovery process by using the RF parameters configured by the first NFCEE, and then determines the first NFCEE as the route target according to the forced NFCEE routing mechanism after receiving the data frame, so as to route the data frame.

In a specific implementation, when the first NFCEE (such as the standalone SE) is enabled, the first NFCEE performs computation according to the RF parameters related to the application, and then configures the RF parameters (including the foregoing listen mode routing table) for the NFCC; after the DH configures the first routing mechanism for the NFCC, the NFCC may route the received data frame by using the first routing mechanism.

Specifically, for a specific process of searching for the route target according to a forced NFCC routing mechanism, refer to the descriptions about searching for the route target according to the forced NFCC routing mechanism In FIG. 1. To avoid repetition, details are not described again herein.

It should be noted that, an example in which the preset information is 2 is used for description above. However, the preset information in this embodiment of the present invention is not limited thereto. The preset information may be any value, for example, may be 1 or 2.

In this embodiment of the present invention, if the DH does not obtain the information about the first NFCEE, the first NFCEE may configure all RF parameters for the NFCC, for example, parameters related to RF protocols supported by all applications, parameters related to supported RF technologies, and routing related parameters.

It should be noted that, in the foregoing embodiment shown in FIG. 4, RF parameter management may further include managing the routing related parameters. For example, when the P2P application on the DH supports the NFC-A technology, the DH configures, for the NFCC, an NFC-DEP protocol-based routing entry pointing to the DH and/or an NFC-A technology-based routing entry pointing to the DH; when the card emulation application (for example, corresponding to the ISO-DEP protocol) in the first NFCEE supports the NFC-B technology, the first NFCEE configures, for the NFCC, an ISO-DEP protocol-based routing entry pointing to the first NFCEE and/or an NFC-B technology-based routing entry pointing to the first NFCEE; in this case, the NFCC may combine the routing entries configured by the DH and the NFCEE respectively. In this way, when the second terminal uses any RF protocol supported by the first terminal to communicate with the first terminal, the NFCC in the first terminal can correctly route the data frame. For another example, when the P2P application on the DH supports the NFC-A technology, the DH configures, for the NFCC, an NFC-DEP protocol-based routing entry pointing to the DH and/or an NFC-A technology-based routing entry pointing to the DH; when the card emulation application (for example, corresponding to the ISO-DEP protocol) in the first NFCEE supports the NFC-A and NFC-B technologies, the first NFCEE configures, for the NFCC, an ISO-DEP protocol-based routing entry pointing to the first NFCEE and/or an NFC-A/NFC-B technology-based routing entry pointing to the first NFCEE; in this case, when managing the RF parameters, the NFCC may replace the NFC-A technology-based routing entry configured by the first NFCEE with the NFC-A technology-based routing entry configured by the DH, but reserve all other routing entries. In summary, when the RF technology supported by the application in the first NFCEE overlaps or conflicts with the RF technology supported by the application on the DH, the NFCC may correspondingly replace, in the foregoing manner, the RF parameters configured by the first NFCEE with the RF parameters configured by the DH. Certainly, other manners may be used, and a specific manner is determined by an implementer (for example, an NFC chip vendor). This is not limited in the present invention.

Figure 5:
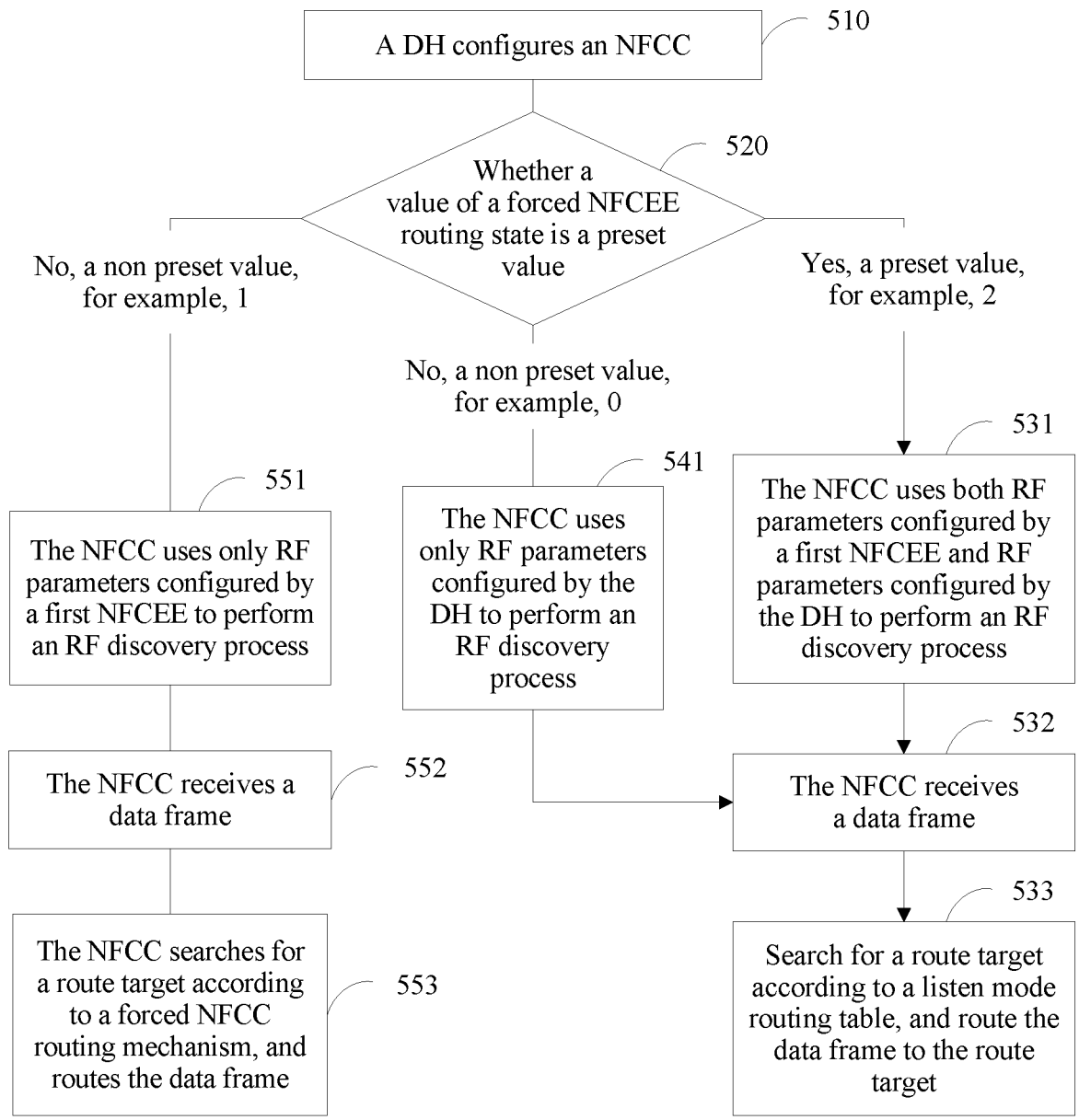
FIG. 5 is a schematic flowchart of a method for routing a data frame according to another embodiment of the present invention.

With reference to FIG. 5, the following describes in detail a method for routing a data frame according to an embodiment of the present invention, by using an example in which a first routing mechanism is forced NFCEE routing, and a second routing mechanism is a listen mode routing listen mode routing mechanism.

Specifically, a routing method for performing near field communication between a first terminal and a second terminal in FIG. 5 is described from a perspective of the first terminal. The first terminal includes a DH and an NFCC. Specifically, the method 500 shown in FIG. 5 includes the following steps.

510. The DH configures the NFCC.

Specifically, when configuring a forced NFCEE routing mechanism for the NFCC, the DH sets a forced NFCEE routing state of the forced NFCEE routing mechanism to a preset value. For example, the preset value is the value 2 in Table 7 or the value 2 of the third state in Table 8. The preset value indicates that the NFCC is allowed to accept RF configurations of both the DH and a forced NFCEE, but the forced NFCEE routing mechanism is disabled (Disabled). In addition, when configuring a listen mode routing table for the NFCC, the DH configures an NFC-DEP protocol-based routing or an NFC-A/F technology-based routing entry pointing to the DH, and configures an ISO-DEP protocol-based routing entry or an NFC-A/B/F/V technology-based routing entry pointing to a first NFCEE.

It should be noted that, the NFCC configuration may further include configurations of RF parameters, for example, parameters related to an NFC-A, NFC-B, NFC-F, and/or NFC-V technology, and parameters related to RF protocols such as ISO-DEP and NFC-DEP; and may further include a configuration of a second routing mechanism, such as the configuration of the listen mode routing table, which may include any one or more of an AID-based routing entry, an APDU pattern-based routing entry, an SC-based routing entry, a protocol-based routing entry, or a technology-based routing entry. For details, refer to corresponding descriptions in step 410 in the foregoing embodiment in FIG. 4. Details are not described again herein.

520. The NFCC determines whether a value of a forced NFCEE routing state is a preset value.

Specifically, if the value of the forced NFCEE routing state is a preset value, for example, the preset value is the value 2 in Table 7 or the value 2 of the third state in Table 8, steps 531 to 533 are performed; if the forced NFCEE routing state is not a preset value, different steps are performed according to different values. Specifically, when the value of the forced NFCEE routing state is the value 0 in Table 7 or the value 0 of the first state in Table 8, steps 541, 532, and 533 are performed; when the value of the forced NFCEE routing state is the value 1 in Table 7 or the value 1 of the second state in Table 8, steps 551 to 553 are performed.

Setting the first information in the subsequent step 531 may be applicable to a scenario in which both a P2P application on the DH and an application in the first NFCEE are available (namely, in an active state); setting the first information in the subsequent step 541 may be applicable to a scenario in which an application in the first NFCEE is unavailable, that is, an application on the DH (including a P2P application or a card emulation application, or the like) and/or an application in another NFCEE are/is available; setting the first information in the subsequent step 551 may be applicable to a scenario in which only an application in the first NFCEE is available. In a specific implementation, to which value (the value corresponding to step 531, 541, or 551) the first information is set may be determined by an implementer according to an actual situation (for example, the first terminal is a machine customized by an operator, and it is required that other NFCEEs should be unavailable when the first NFCEE (for example, a physical carrier is a SIM card) is available), or may be determined according to settings of a terminal user (for example, which NFCEEs set by the user are enabled and which NFCEEs are disabled, or applications in which NFCEEs are active and applications in which NFCEEs are inactive, or which application is selected by the user in current NFC communication).

531. The NFCC uses both RF parameters configured by a first NFCEE and RF parameters configured by the DH to perform an RF discovery process.

That is, the NFCC uses both the RF parameters configured by the forced NFCEE and the RF parameters configured by the DH to complete activation (RF protocol activation) of an RF interface in a listen mode.

In this step, the NFCC needs to use the RF parameters configured by the first NFCEE and the RF parameters configured by the DH to perform the RF discovery process. Specifically, the NFCC manages, for example, combines or replaces, the RF parameters configured by the first NFCEE and the RF parameters configured by the DH. This is not limited in the present invention.

For details, refer to corresponding descriptions of step 420 in the embodiment in FIG. 4. To avoid repetition, details are not described again herein.

532. The NFCC receives a data frame.

Specifically, the NFCC receives the data frame sent by the second terminal.

In this case, an RF protocol activated between the second terminal and the first terminal may be any one of all the RF protocols supported on the first terminal, for example, the NFC-DEP protocol supported by the P2P application on the DH, or any one or more of the ISO-DEP protocol, the T1T protocol, the T2T protocol, the T3T protocol, or the T5T protocol supported by a non P2P application in the first NFCEE.

533. Search for a route target according to a listen mode routing table, and route the data frame to the route target.

The route target may be the DH or the first NFCEE.

In this case, the P2P application on the DH is still available when the first NFCEE on the first terminal is enabled.

Specifically, searching for the target according to the listen mode routing table depends on a specific routing entry configured for the NFCC in step 510. For a used routing mode, refer to corresponding descriptions of step 430 in the embodiment in FIG. 4. To avoid repetition, details are not described again herein.

541. The NFCC uses only RF parameters configured by the DH to perform an RF discovery process.

That is, the NFCC uses only the RF parameters configured by the DH to perform the RF discovery process and complete RF interface activation (RF protocol activation) in the listen mode. Afterward, steps 532 and 533 are performed.

It should be noted that, in this case, only the DH configures the parameters for the NFCC. Because the first NFCEE is not enabled or the RF parameters related to the application in the first NFCEE are not configured for the NFCC due to other reasons, in the RF discovery process, the second terminal cannot detect the RF protocol supported by the first NFCEE, and cannot activate the RF protocol supported by the first NFCEE, and a subsequently received data frame is not routed to the first NFCEE; or even if an RF protocol supported by an application in another enabled NFCEE is the same as the RF protocol supported by the first NFCEE, and may be detected by the second terminal, because no routing entry pointing to the first NFCEE exists in the routing related configuration, a subsequently received data frame is not routed to the first NFCEE. This is a difference between step 541 and step 531. In the case of this step, applications of the DH and/or the another NFCEE are available. Specifically, whether to set the first information to a corresponding value in this step may be determined by the implementer, or may be determined according to the settings of the user.

551. The NFCC uses only RF parameters configured by a first NFCEE to perform an RF discovery process.

That is, the NFCC uses only the RF parameters configured by the first NFCEE to complete RF interface activation (RF protocol activation) in the listen mode.

It should be noted that, in this case, only the first NFCEE configures the parameters for the NFCC. If a P2P application exists on the DH, RF parameters related to the P2P application are not configured for the NFCC. Therefore, in the RF discovery process, the second terminal cannot detect the RF protocol (such as the NFC-DEP protocol) supported by the P2P application on the DH, an RF protocol corresponding to the P2P application is not activated between the first terminal and the second terminal, and subsequently P2P data is not received, that is, a received data frame is not routed to the DH; or because no routing entry pointing to the DH exists in the routing related configuration, a subsequently received data frame is not routed to the DH. In the case of this step, only the application of the first NFCEE is available. Specifically, whether to set the first information to a corresponding value in this step may be determined by the implementer, or may be determined according to the settings of the user.

552. The NFCC receives a data frame.

Specifically, the NFCC receives the data frame sent by the second terminal.

In this case, the data frame sent by the second terminal may be sent for the application in the first NFCEE.

553. The NFCC searches for a route target according to a forced NFCC routing mechanism, and routes the data frame.

The route target may be the forced NFCEE. In this case, the first NFCEE is the forced NFCEE.

Specifically, for a specific process of searching for the route target according to the forced NFCC routing mechanism, refer to the descriptions about searching for the route target according to the forced NFCC routing mechanism In FIG. 1. To avoid repetition, details are not described again herein.

Therefore, in this embodiment of the present invention, when current first information is preset information, the NFCC uses both the RF parameters configured by the first NFCEE and the RF parameters configured by the DH to perform the RF discovery process. In this way, it can be ensured that when a P2P application exists on the DH of the first terminal and a non P2P application exists in the first NFCEE, the RF discovery process may allow the peer second terminal to discover the local P2P application and the non P2P application, so that the second terminal activates the corresponding RF protocol (such as the NFC-DEP protocol or a non NFC-DEP protocol) according to a service requirement; after the data frame sent by the second terminal is received, the data frame is processed according to a preset routing rule. This resolves a problem that a P2P service on a DH is unavailable because an RF protocol (such as the NFC-DEP protocol) corresponding to a P2P application supported by the DH cannot be detected by a peer by performing an RF discovery process when some specific NFCEEs (such as a standalone SE) are enabled in the prior art.

It should be noted that, the foregoing examples of FIG. 1 and FIG. 5 are only intended to help a person skilled in the art understand the embodiments of the present invention, instead of limiting the embodiments of the present invention to the specific values or specific scenarios in the examples. Obviously, a person skilled in the art can make various equivalent modifications and variations according to an actual situation. The embodiments of the present invention are intended to cover the modifications and variations.

It should be understood that, sequence numbers of the foregoing processes do not mean execution sequences. The execution sequences of the processes should be determined according to functions and internal logic of the processes, and should not be construed as any limitation on the implementation processes of the embodiments of the present invention.

The foregoing embodiments in FIG. 1 to FIG. 5 are solutions in which the first terminal works as a listen-side terminal in the listen mode. In the embodiments of the present invention, other solutions may also be used to resolve the problem in the prior art. For example, when the first NFCEE on the first terminal is enabled, and the DH configures the first routing mechanism for the first NFCEE (such as the forced NFCEE routing mechanism), to make the P2P application on the DH also available, the RF parameters configured by the DH for the P2P application for the NFCC may include parameters related to a poll mode, for example, poll-side NFC-A or NFC-F technology related parameters in the NCI specification, poll-side NFC-DEP protocol related parameters, poll active parameters, and poll-side RF discovery configuration related parameters. In this way, the first terminal may work in the poll mode and activate the RF protocol between the first terminal and the second terminal, and perform P2P communication with the second terminal based on the RF protocol. In this case, the first terminal uses the contactless application in the first NFCEE in the listen mode, and uses the P2P application on the DH in the poll mode. Certainly, this is not limited in the embodiments of the present invention.

The foregoing describes in detail the methods for routing a data frame according to the embodiments of the present invention with reference to FIG. 1 to FIG. 5. The following describes near field communication controllers according to the embodiments of the present invention with reference to FIG. 6 to FIG. 11, and describes a near field communication terminal according to an embodiment of the present invention with reference to FIG. 12.

Figure 6:
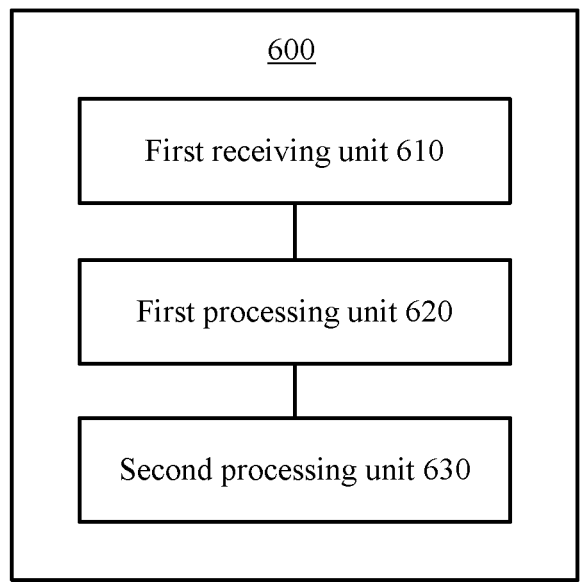
FIG. 6 is a schematic block diagram of an NFCC according to an embodiment of the present invention.

FIG. 6 is a schematic block diagram of an NFCC according to an embodiment of the present invention. The NFCC shown in FIG. 6 corresponds to FIG. 1 and FIG. 2A and FIG. 2B, and can implement each process related to the NFCC in FIG. 1 and FIG. 2A and FIG. 2B. Operations and/or functions of all modules in the NFCC 600 are intended to respectively implement corresponding procedures in the method embodiments in FIG. 1 and FIG. 2A and FIG. 2B. For details, refer to the descriptions in the foregoing method embodiments. To avoid repetition, detailed descriptions are appropriately omitted herein.

Specifically, the NFCC 600 shown in FIG. 6 may be located in a first terminal. The first terminal may further include a device host DH. A first routing mechanism in the first terminal is in an enabled state. The NFCC 600 includes a first receiving unit 610, a first processing unit 620, and a second processing unit 630.

Specifically, the first receiving unit 610 is configured to receive a data frame sent by a second terminal. The first processing unit 620 is configured to process the data frame according to a first preset rule if a currently activated radio frequency RF protocol is a first RF protocol. The second processing unit 630 is configured to route the data frame according to the first routing mechanism if the currently activated RF protocol is a second RF protocol. The first RF protocol includes the Near Field Communication Data Exchange Protocol NFC-DEP, and the second RF protocol includes a non NFC-DEP protocol.

Therefore, in this embodiment of the present invention, by using different data frame processing modes for different RF protocol types corresponding to received data frames, a P2P application on another entity (such as the DH) can be normally used when a specific NFCEE (also referred to as a first NFCEE, for example, a standalone SE) is enabled.

Optionally, in another embodiment, the first processing unit is specifically configured to: route the data frame according to a second routing mechanism; or forward the data frame to the DH.

Alternatively, in another embodiment, the first processing unit is specifically configured to:

if a currently activated RF interface is a Near Field Communication Data Exchange Protocol radio frequency NFC-DEP RF interface, route the data frame according to the second routing mechanism; or if a currently activated RF interface is a frame radio frequency frame RF interface, forward the data frame to the DH.

Optionally, in another embodiment, the second routing mechanism includes a protocol-based route selection mechanism or a listen mode routing listen mode routing mechanism.

Optionally, in another embodiment, the NFCC further includes a sending unit, configured to send, to the second terminal after it is determined that a received RF protocol activation command is a first activation command, a response for responding to the first activation command; where the first RF protocol is activated by the sending unit by sending, to the second terminal, the response for responding to the first activation command.

Further, in another embodiment, a mapped RF interface configured by the DH for the first RF protocol includes the NFC-DEP RF interface or the frame RF interface; and the sending unit is specifically configured to: if the mapped RF interface is the NFC-DEP RF interface, directly send, to the second terminal, the response for responding to the first activation command; or if the mapped RF interface is the frame RF interface, forward the first activation command to the DH, and send, to the second terminal, a response that is sent by the DH and used for responding to the first activation command.

Optionally, in another embodiment, the NFCC further includes:

a first determining unit, configured to determine that a bit value corresponding to a current power state in a power state field configured by the DH for the first routing mechanism is a first preset value.

Optionally, in another embodiment, when an activated RF interface is an NFC-DEP RF interface, the currently activated RF protocol is the first RF protocol; or when a format of the data frame is a Near Field Communication Data Exchange Protocol frame format NFC-DEP frame format, the currently activated RF protocol is the first RF protocol; or when an RF protocol activation command received in an RF protocol activation phase is an attribute request ATR_REQ command, the currently activated RF protocol is the first RF protocol.

Optionally, in another embodiment, the NFCC further includes:

a second determining unit, configured to determine that a bit value corresponding to a current power state in a power state field configured by the DH for the first routing mechanism is a second preset value.

Optionally, in another embodiment, the NFCC further includes:

a third receiving unit, configured to receive the first routing mechanism that is configured by the DH for the NFCC after the DH learns information about a first NFCEE from the NFCC, where the information about the first NFCEE is reported to the DH when the NFCC performs NFCEE discovery, or is fed back to the DH after the NFCC receives a request of the DH, and the information about the first NFCEE includes at least information indicating that the first NFCEE is a standalone secure element standalone SE.

Optionally, in another embodiment, the first routing mechanism is a forced near field communication execution environment routing forced NFCEE routing mechanism, and the first NFCEE is a forced near field communication execution environment forced NFCEE.

Optionally, in another embodiment, the NFCC further includes:

a fourth receiving unit, configured to receive RF parameters configured by the DH for an application that complies with the NFC-DEP protocol on the DH, and receive RF parameters configured by the first NFCEE for an application that complies with the non NFC-DEP protocol in the first NFCEE.

Optionally, in another embodiment, the non NFC-DEP protocol includes the ISO-DEP protocol, the Type 1 Tag T1T protocol, the Type 2 Tag T2T protocol, the Type 3 Tag T3T protocol, or the Type 5 Tag T5T protocol.

Figure 7:
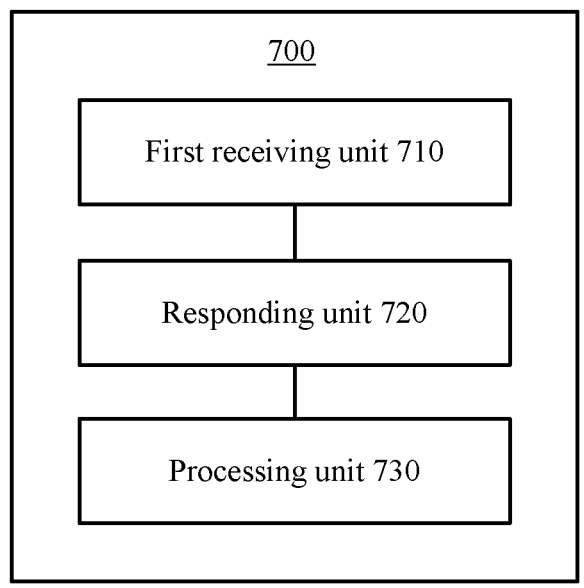
FIG. 7 is a schematic block diagram of an NFCC according to another embodiment of the present invention.

FIG. 7 is a schematic block diagram of an NFCC according to an embodiment of the present invention. The NFCC shown in FIG. 7 corresponds to FIG. 3, and can implement each process related to the NFCC in FIG. 3. Operations and/or functions of all modules in the NFCC 300 are intended to respectively implement corresponding procedures in the method embodiment in FIG. 3. For details, refer to the descriptions in the foregoing method embodiment. To avoid repetition, detailed descriptions are appropriately omitted herein.

Specifically, the NFCC 700 shown in FIG. 7 may be located in a first terminal. The first terminal further includes a device host DH. A first routing mechanism in the first terminal is in an enabled state. The NFCC 700 includes a first receiving unit 710, a responding unit 720, and a processing unit 730.

Specifically, the first receiving unit 710 is configured to receive, by the NFCC, an RF protocol activation command sent by a second terminal.

The responding unit 720 is configured to send, to the second terminal if the RF protocol activation command is a first activation command, a response for responding to the first activation command, where the first activation command is used to activate the first RF protocol, and the first RF protocol includes the Near Field Communication Data Exchange Protocol NFC-DEP.

The processing unit 730 is configured to process, after the NFCC receives a data frame sent by the second terminal, the data frame according to a first preset rule.

Therefore, in this embodiment of the present invention, when the first routing mechanism is enabled but is unavailable in a current power state, after the received RF protocol activation command is determined as the first activation command, the response for responding to the first activation command may be sent to the second terminal, so as to activate the first protocol (for example, the NFC-DEP protocol). In addition, after receiving the data frame sent by the second terminal, the NFCC processes the data frame according to the first preset rule. Therefore, when the first routing mechanism is enabled, a P2P application is normally used, and a problem that P2P communication cannot be performed because an RF protocol required for P2P communication cannot be activated when the first routing mechanism is in an enabled state but is unavailable in a current power state in the prior art is resolved.

Optionally, in another embodiment, a mapped RF interface configured by the DH for the first RF protocol includes an NFC-DEP RF interface or a frame RF interface; and the responding unit 720 is specifically configured to:

if the mapped RF interface is the NFC-DEP RF interface, directly send, to the second terminal, the response for responding to the first activation command; or if the mapped RF interface is the frame RF interface, forward the first activation command to the DH, and send, to the second terminal, a response that is sent by the DH and used for responding to the first activation command.

Optionally, in another embodiment, the NFCC 700 may further include:

a determining unit, configured to determine that a bit value corresponding to a current power state in a power state field configured by the DH for the first routing mechanism is a first preset value.

Optionally, in another embodiment, the NFCC 700 may further include:

an acknowledging unit, configured to send, by the NFCC, an error response to the second terminal if the RF protocol activation command is a second activation command.

Alternatively, if the RF protocol activation command is a second activation command, the NFCC may also not send a response.

Optionally, in another embodiment, the processing unit is specifically configured to route the data frame according to a second routing mechanism; or the NFCC forwards the data frame to the DH.

Alternatively, in another embodiment, the processing unit is specifically configured to:

if a currently activated RF interface is a Near Field Communication Data Exchange Protocol radio frequency NFC-DEP RF interface, route, by the NFCC, the data frame according to the second routing mechanism; or if a currently activated RF interface is a frame radio frequency frame RF interface, forward, by the NFCC, the data frame to the DH.

Optionally, in another embodiment, the second routing mechanism includes a protocol-based route selection mechanism or a listen mode routing listen mode routing mechanism.

Optionally, in another embodiment, the NFCC further includes:

a second receiving unit, configured to receive the first routing mechanism that is configured by the DH for the NFCC after the DH learns information about a first NFCEE from the NFCC, where the information about the first NFCEE is reported to the DH when the NFCC performs NFCEE discovery, or is fed back to the DH after the NFCC receives a request of the DH, and the information about the first NFCEE includes at least information indicating that the first NFCEE is a standalone secure element standalone SE.

Optionally, in another embodiment, the first routing mechanism is a forced near field communication execution environment routing forced NFCEE routing mechanism.

Optionally, in another embodiment, the method may further include:

a third receiving unit, configured to receive RF parameters configured by the DH for an application that complies with the NFC-DEP protocol on the DH, and receive RF parameters configured by the first NFCEE for an application that complies with a non NFC-DEP protocol in the first NFCEE.

Figure 8:
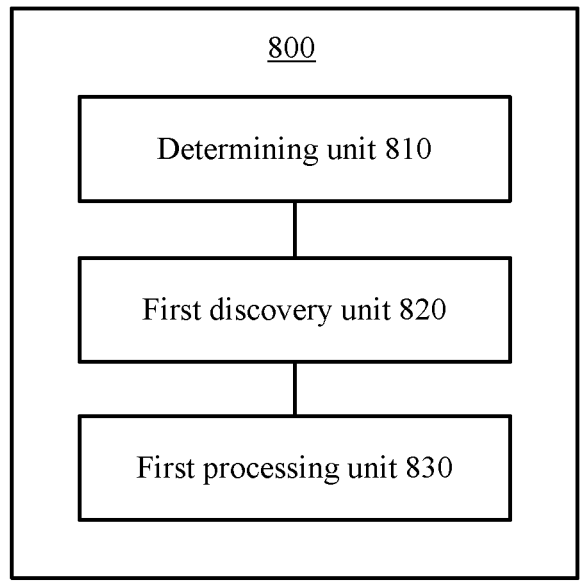
FIG. 8 is a schematic block diagram of an NFCC according to another embodiment of the present invention.

FIG. 8 is a schematic block diagram of an NFCC according to an embodiment of the present invention. The NFCC shown in FIG. 8 corresponds to FIG. 4 and FIG. 5, and can implement each process related to the NFCC in FIG. 4 and FIG. 5. Operations and/or functions of all modules in the NFCC 800 are intended to respectively implement corresponding procedures in the method embodiments in FIG. 4 and FIG. 5. For details, refer to the descriptions in the foregoing method embodiments. To avoid repetition, detailed descriptions are appropriately omitted herein.

Specifically, the NFCC 800 shown in FIG. 8 may be located in a first terminal. The first terminal further includes a device host DH. The NFCC 800 includes a determining unit 810, a first discovery unit 820, and a first processing unit 830.

Specifically, the determining unit 810 is configured to determine whether first information configured by the DH for the NFCC is preset information.

The first discovery unit 820 is configured to use radio frequency RF parameters configured by a first NFCEE and RF parameters configured by the DH to perform an RF discovery process if the first information is the preset information.

The first processing unit 830 is configured to process, after a data frame sent by a second terminal is received, the data frame according to a preset routing mechanism.

Therefore, in this embodiment of the present invention, when the current first information is the preset information, the NFCC uses both the RF parameters configured by the first NFCEE and the RF parameters configured by the DH to perform the RF discovery process. In this way, it is ensured that when a P2P application exists on the DH of the first terminal and a non P2P application exists in the first NFCEE, the RF discovery process may allow the peer second terminal to discover the local P2P application and the non P2P application (that is, discover a first RF protocol corresponding to the local P2P application and a second RF protocol corresponding to the non P2P application), so that the second terminal activates a corresponding RF protocol (such as the NFC-DEP protocol or a non NFC-DEP protocol) according to a service requirement; in a data exchange phase after the RF protocol activation, that is, after the data frame sent by the second terminal is received, the data frame is processed according to a preset routing rule. This resolves a problem that a P2P service on a DH is unavailable because an RF protocol (such as the NFC-DEP protocol) corresponding to a P2P application on the DH cannot be detected by a peer by performing an RF discovery process when some specific NFCEEs (such as a standalone SE) are enabled in the prior art.

Optionally, in another embodiment, the first processing unit is specifically configured to:

when an activated RF protocol is the Near Field Communication Data Exchange Protocol NFC-DEP, route the data frame according to a protocol-based route selection mechanism, or forward the data frame to the DH; or when an activated RF protocol is a non NFC-DEP protocol, route the data frame according to a protocol-based route selection mechanism or a technology-based route selection mechanism, or forward the data frame to the first NFCEE.

Further, in another embodiment, a protocol-based routing entry corresponding to the protocol-based route selection mechanism includes at least an NFC-DEP protocol-based routing entry pointing to the DH, and a non NFC-DEP protocol-based routing entry pointing to the first NFCEE; or a protocol-based routing entry corresponding to the protocol-based route selection mechanism includes at least an NFC-DEP protocol-based routing entry pointing to the DH, and a technology-based routing entry corresponding to the technology-based route selection mechanism includes at least a routing entry based on a first RF technology and pointing to the first NFCEE, where the first RF technology includes at least one of an NFC-A technology, an NFC-B technology, an NFC-F technology, or an NFC-V technology.

Alternatively, in another embodiment, the first processing unit is specifically configured to route the data frame according to a second routing mechanism, where the second routing mechanism includes a listen mode routing listen mode routing mechanism.

Further, in another embodiment, a routing table configured by the DH for the second routing mechanism includes at least an NFC-DEP protocol-based routing entry pointing to the DH, or a routing entry based on a first RF technology and pointing to the DH, where the first RF technology includes at least one of an NFC-A technology or an NFC-F technology.

Further, in another embodiment, when the routing table includes the NFC-DEP protocol-based routing entry pointing to the DH, the routing table further includes a non NFC-DEP protocol-based routing entry pointing to the first NFCEE, and/or a routing entry based on a second RF technology and pointing to the first NFCEE, where the second RF technology includes at least one of the NFC-A technology, an NFC-B technology, the NFC-F technology, or an NFC-V technology; or when the routing table includes the routing entry based on the first RF technology and pointing to the DH, the routing table further includes a non NFC-DEP protocol-based routing entry pointing to the first NFCEE, and/or a routing entry based on a third RF technology and pointing to the first NFCEE, where the third RF technology includes at least one of the NFC-A technology, an NFC-B technology, the NFC-F technology, or an NFC-V technology except the first RF technology.

Optionally, in another embodiment, the NFCC further includes:

a sending unit, configured to send information about the first NFCEE to the DH, where the information about the first NFCEE is reported to the DH when the NFCC performs NFCEE discovery, or is fed back to the DH when the NFCC receives a request of the DH; and the information about the first NFCEE includes that the first NFCEE is a standalone secure element standalone SE, and/or an RF protocol type or an RF technology type supported by an application in the first NFCEE.

Further, in another embodiment, the NFCC further includes a receiving unit, configured to receive RF parameters configured by the DH for an application that complies with the NFC-DEP protocol on the DH, and receive RF parameters configured by the first NFCEE for an application that complies with the non NFC-DEP protocol in the first NFCEE.

Further, in another embodiment, the NFCC further includes: a second discovery unit, configured to: if the determining unit determines that the first information is not the preset information, when the first information is used to indicate that a first routing mechanism is unavailable, and the NFCC uses only the RF parameters configured by the DH, use the RF parameters configured by the DH to perform the RF discovery process; and a second processing unit, configured to route the data frame according to the second routing mechanism after the data frame sent by the second terminal is received.

Further, in another embodiment, the NFCC further includes: a third discovery unit, configured to: if the determining unit determines that the first information is not the preset information, when the first information is used to indicate that a first routing mechanism is available, and the NFCC uses only the RF parameters configured by the first NFCEE, use the RF parameters configured by the first NFCEE to perform the RF discovery process; and a third processing unit, configured to route the data frame according to the first routing mechanism after the data frame sent by the second terminal is received.

Further, in another embodiment, the first routing mechanism is a forced near field communication execution environment routing forced NFCEE routing mechanism.

Figure 9:
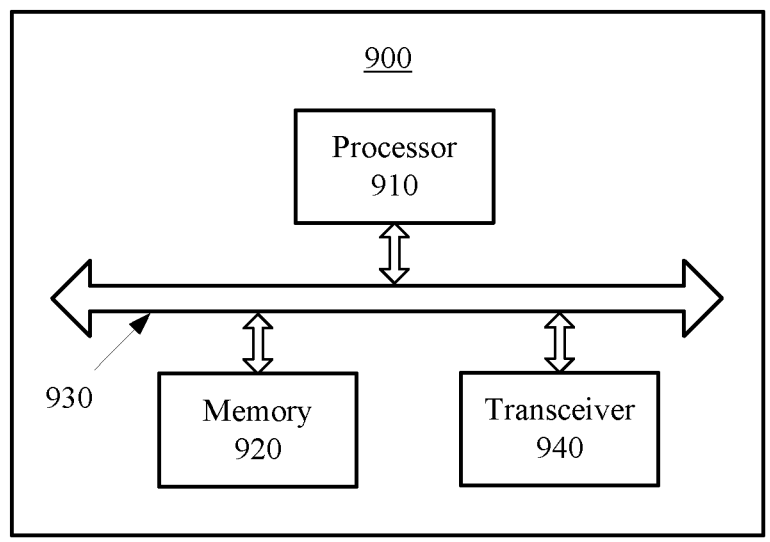
FIG. 9 is a schematic block diagram of an NFCC according to another embodiment of the present invention.

FIG. 9 is a schematic block diagram of an NFCC according to an embodiment of the present invention. The NFCC shown in FIG. 9 corresponds to FIG. 1 and FIG. 2A and FIG. 2B, and can implement each process related to the NFCC in FIG. 1 and FIG. 2A and FIG. 2B. Operations and/or functions of all modules in the NFCC 900 are intended to respectively implement corresponding procedures in the method embodiments in FIG. 1 and FIG. 2A and FIG. 2B. For details, refer to the descriptions in the foregoing method embodiments. To avoid repetition, detailed descriptions are appropriately omitted herein.

Specifically, the NFCC 900 shown in FIG. 9 may be located in a first terminal. The first terminal further includes a device host DH. A first routing mechanism in the first terminal is in an enabled state. The NFCC 900 includes a processor 910 and a memory 920, and optionally, may further include a bus system 930 and a transceiver 940. Specifically, the transceiver 940 is configured to receive a data frame sent by a second terminal. The processor 910 is configured to execute an instruction stored in the memory 920 to process the data frame according to a first preset rule if a currently activated radio frequency RF protocol is a first RF protocol, or route the data frame according to the first routing mechanism if a currently activated RF protocol is a second RF protocol. The first RF protocol includes the Near Field Communication Data Exchange Protocol NFC-DEP, and the second RF protocol includes a non NFC-DEP protocol.

Therefore, in this embodiment of the present invention, by using different data frame processing modes for different RF protocol types corresponding to received data frames, a P2P application on another entity (such as the DH) can be normally used when a specific NFCEE (also referred to as a first NFCEE, for example, a standalone SE) is enabled.

The methods disclosed in the foregoing embodiments of the present invention may be applied in the processor 910 or implemented by the processor 910. The processor 910 may be an integrated circuit chip, and has a signal processing capability. In an implementation process, each step of the foregoing methods may be completed by using an integrated logic circuit of hardware in the processor 910 or an instruction in a form of software. The processor 910 may be a general purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logic device, discrete gate or transistor logic device, or discrete hardware component. The processor may implement or execute the methods, steps, and logic block diagrams disclosed in the embodiments of the present invention. The general-purpose processor may be a microprocessor, or the processor may be any conventional processor, or the like. Steps of the methods disclosed with reference to the embodiments of the present invention may be directly executed and completed by means of a hardware decoding processor, or may be executed and completed by using a combination of hardware in a decoding processor and software modules. The software modules may be located in a mature storage medium in the art, such as a random access memory (Random Access Memory, RAM), a flash memory, a read-only memory (Read-Only Memory, ROM), a programmable read-only memory, an electrically-erasable programmable memory, or a register. The storage medium is located in the memory 920. The processor 910 reads information in the memory 920, and completes the steps in the foregoing methods in combination with hardware of the processor 910. The bus system 930 may further include a power bus, a control bus, a status signal bus, and the like, in addition to a data bus. However, for clear description, various buses in the figure are marked as the bus system 930. The transceiver 940 may include a transmitter circuit and a receiver circuit, and may further include a communications interface, or may further include an antenna, or may include an antenna coupled with a transmitter circuit and a receiver circuit. The transceiver 940 may also be an integrated circuit chip, and capable of receiving and transmitting signals. For example, when the NFCC receives, by using the transceiver 940, the data frame sent by the second terminal, the transceiver 940 is generally a radio frequency circuit that implements NFC communication with an external NFC terminal. For another example, when the NFCC sends the received data frame to the DH by using the transceiver 940, or sends information about a first NFCC to the DH, or forwards a first activation command to the DH and receives a response that is returned by the DH and used for responding to the first activation command, the transceiver 940 is generally a circuit that performs communication between the DH and the NFCC or between the first NFCEE and the NFCC in the first terminal.

Optionally, in another embodiment, the processor 910 is specifically configured to: route the data frame according to a second routing mechanism; or forward the data frame to the DH.

Alternatively, in another embodiment, if a currently activated RF interface is a Near Field Communication Data Exchange Protocol radio frequency NFC-DEP RF interface, the processor 910 routes the data frame according to the second routing mechanism; or if a currently activated RF interface is a frame radio frequency frame RF interface, the processor 910 forwards the data frame to the DH.

Optionally, in another embodiment, the second routing mechanism includes a protocol-based route selection mechanism or a listen mode routing listen mode routing mechanism.

Optionally, in another embodiment, the transceiver 940 is further configured to:

send, to the second terminal after it is determined that a received RF protocol activation command is a first activation command, a response for responding to the first activation command; where the first RF protocol is activated by the transceiver 940 by sending, to the second terminal, the response for responding to the first activation command.

Further, in another embodiment, a mapped RF interface configured by the DH for the first RF protocol includes the NFC-DEP RF interface or the frame RF interface; and the transceiver 940 is specifically configured to: if the mapped RF interface is the NFC-DEP RF interface, directly send, to the second terminal, the response for responding to the first activation command; or if the mapped RF interface is the frame RF interface, forward the first activation command to the DH, and send, to the second terminal, a response that is sent by the DH and used for responding to the first activation command.

Optionally, in another embodiment, the processor 910 is further configured to determine that a bit value corresponding to a current power state in a power state field configured by the DH for the first routing mechanism is a first preset value.

Optionally, in another embodiment, when an activated RF interface is an NFC-DEP RF interface, the currently activated RF protocol is the first RF protocol; or when a format of the data frame is a Near Field Communication Data Exchange Protocol frame format NFC-DEP frame format, the currently activated RF protocol is the first RF protocol; or when an RF protocol activation command received in an RF protocol activation phase is an attribute request ATR_REQ command, the currently activated RF protocol is the first RF protocol.

Optionally, in another embodiment, the processor 910 is further configured to determine that a bit value corresponding to a current power state in a power state field configured by the DH for the first routing mechanism is a second preset value.

Optionally, in another embodiment, the transceiver 940 is further configured to receive the first routing mechanism that is configured by the DH for the NFCC after the DH learns information about a first NFCEE from the NFCC, where the information about the first NFCEE is reported to the DH when the NFCC performs NFCEE discovery, or is fed back to the DH after the NFCC receives a request of the DH, and the information about the first NFCEE includes at least information indicating that the first NFCEE is a standalone secure element standalone SE.

Optionally, in another embodiment, the first routing mechanism is a forced near field communication execution environment routing forced NFCEE routing mechanism, and the first NFCEE is a forced near field communication execution environment forced NFCEE.

Optionally, in another embodiment, the transceiver 940 is further configured to receive RF parameters configured by the DH for an application that complies with the NFC-DEP protocol on the DH, and receive RF parameters configured by the first NFCEE for an application that complies with the non NFC-DEP protocol in the first NFCEE.

Optionally, in another embodiment, the non NFC-DEP protocol includes the ISO-DEP protocol, the Type 1 Tag T1T protocol, the Type 2 Tag T2T protocol, the Type 3 Tag T3T protocol, or the Type 5 Tag T5T protocol.

Figure 10:
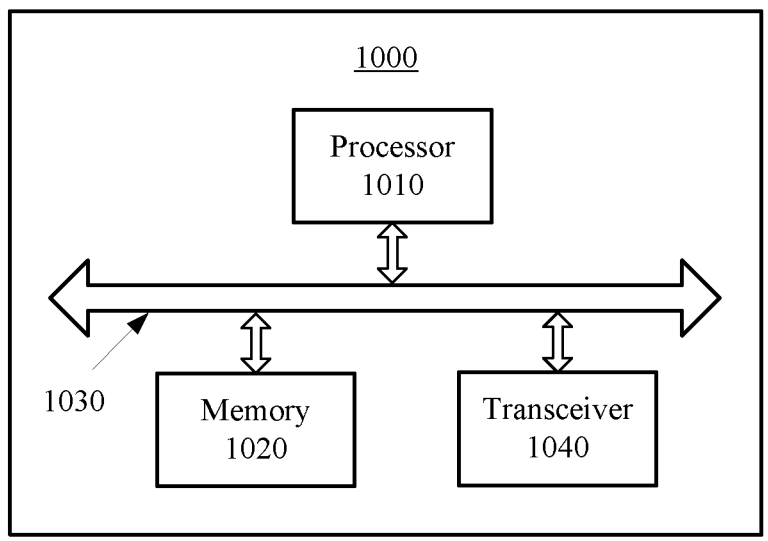
FIG. 10 is a schematic block diagram of an NFCC according to another embodiment of the present invention.

FIG. 10 is a schematic block diagram of an NFCC according to an embodiment of the present invention. The NFCC shown in FIG. 10 corresponds to FIG. 3, and can implement each process related to the NFCC in FIG. 3. Operations and/or functions of all modules in the NFCC 1000 are intended to respectively implement corresponding procedures in the method embodiment in FIG. 3. For details, refer to the descriptions in the foregoing method embodiment. To avoid repetition, detailed descriptions are appropriately omitted herein.

Specifically, the NFCC 1000 shown in FIG. 10 may be located in a first terminal. The first terminal further includes a device host DH. A first routing mechanism in the first terminal is in an enabled state. The NFCC 1000 includes a processor 1010 and a memory 1020, and optionally, may further include a bus system 1030 and a transceiver 1040. Specifically, the transceiver 1040 is configured to receive an RF protocol activation command sent by a second terminal, and if the RF protocol activation command is a first activation command, send, to the second terminal, a response for responding to the first activation command, where the first activation command is used to activate the first RF protocol, and the first RF protocol includes the Near Field Communication Data Exchange Protocol NFC-DEP. The processor 1010 is configured to execute an instruction stored in the memory 1020 to process, after the NFCC receives a data frame sent by the second terminal, the data frame according to a first preset rule.

Therefore, in this embodiment of the present invention, when the first routing mechanism is enabled but is unavailable in a current power state, after the received RF protocol activation command is determined as the first activation command, the response for responding to the first activation command may be sent to the second terminal, so as to activate the first protocol (for example, the NFC-DEP protocol). In addition, after receiving the data frame sent by the second terminal, the NFCC processes the data frame according to the first preset rule. Therefore, when the first routing mechanism is enabled, a P2P application is normally used, and a problem that P2P communication cannot be performed because an RF protocol required for P2P communication cannot be activated when the first routing mechanism is unavailable in a current power state in the prior art is resolved.

The method disclosed in the foregoing embodiment of the present invention may be applied in the processor 1010 or implemented by the processor 1010. The processor 1010 may be an integrated circuit chip, and has a signal processing capability. In an implementation process, each step of the foregoing method may be completed by using an integrated logic circuit of hardware in the processor 1010 or an instruction in a form of software. The processor 1010 may be a general purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logic device, discrete gate or transistor logic device, or discrete hardware component. The processor may implement or execute the method, steps, and logic block diagram disclosed in the embodiment of the present invention. The general-purpose processor may be a microprocessor, or the processor may be any conventional processor, or the like. Steps of the method disclosed with reference to the embodiment of the present invention may be directly executed and completed by means of a hardware decoding processor, or may be executed and completed by using a combination of hardware in a decoding processor and software modules. The software modules may be located in a mature storage medium in the art, such as a random access memory (Random Access Memory, RAM), a flash memory, a read-only memory (Read-Only Memory, ROM), a programmable read-only memory, an electrically-erasable programmable memory, or a register. The storage medium is located in the memory 1020. The processor 1010 reads information in the memory 1020, and completes the steps in the foregoing method in combination with hardware of the processor 1010. The bus system 1030 may further include a power bus, a control bus, a status signal bus, and the like, in addition to a data bus. However, for clear description, various buses in the figure are marked as the bus system 1030. The transceiver 1040 may include a transmitter circuit and a receiver circuit, and may further include a communications interface, or may further include an antenna, or may include an antenna coupled with a transmitter circuit and a receiver circuit. The transceiver 1040 may also be an integrated circuit chip, and capable of receiving and transmitting signals. For example, when the NFCC receives, by using the transceiver 1040, the data frame sent by the second terminal, the transceiver 1040 is generally a radio frequency circuit that implements NFC communication with an external NFC terminal. For another example, when the NFCC sends the received data frame to the DH by using the transceiver 1040, or sends information about a first NFCC to the DH, or forwards the first activation command to the DH and receives a response that is returned by the DH and used for responding to the first activation command, the transceiver 1040 is generally a circuit that performs communication between the DH and the NFCC or between the first NFCEE and the NFCC in the first terminal.

Optionally, in another embodiment, a mapped RF interface configured by the DH for the first RF protocol includes an NFC-DEP RF interface or a frame RF interface; and the transceiver 1040 is specifically configured to:

if the mapped RF interface is the NFC-DEP RF interface, directly send, to the second terminal, the response for responding to the first activation command; or if the mapped RF interface is the frame RF interface, forward the first activation command to the DH, and send, to the second terminal, a response that is sent by the DH and used for responding to the first activation command.

Optionally, in another embodiment, the processor 1010 is further configured to determine that a bit value corresponding to a current power state in a power state field configured by the DH for the first routing mechanism is a first preset value.

Optionally, in another embodiment, the processor 1010 is further configured to send an error response to the second terminal if the RF protocol activation command is a second activation command.

Alternatively, if the RF protocol activation command is a second activation command, the NFCC may also not send a response.

Optionally, in another embodiment, the processor 1010 is specifically configured to: route the data frame according to a second routing mechanism; or forward the data frame to the DH.

Alternatively, in another embodiment, the processor 1010 is specifically configured to: if a currently activated RF interface is a Near Field Communication Data Exchange Protocol radio frequency NFC-DEP RF interface, route the data frame according to the second routing mechanism; or if a currently activated RF interface is a frame radio frequency frame RF interface, forward the data frame to the DH.

Optionally, in another embodiment, the second routing mechanism includes a protocol-based route selection mechanism or a listen mode routing listen mode routing mechanism.

Optionally, in another embodiment, the transceiver 1040 is further configured to receive the first routing mechanism that is configured by the DH for the NFCC after the DH learns information about a first NFCEE from the NFCC, where the information about the first NFCEE is reported to the DH when the NFCC performs NFCEE discovery, or is fed back to the DH after the NFCC receives a request of the DH, and the information about the first NFCEE includes at least information indicating that the first NFCEE is a stand-alone secure element standalone SE.

Optionally, in another embodiment, the first routing mechanism is a forced near field communication execution environment routing forced NFCEE routing mechanism.

Optionally, in another embodiment, the transceiver 1040 is further configured to receive RF parameters configured by the DH for an application that complies with the NFC-DEP protocol on the DH, and receive RF parameters configured by the first NFCEE for an application that complies with the non NFC-DEP protocol in the first NFCEE.

Figure 11:
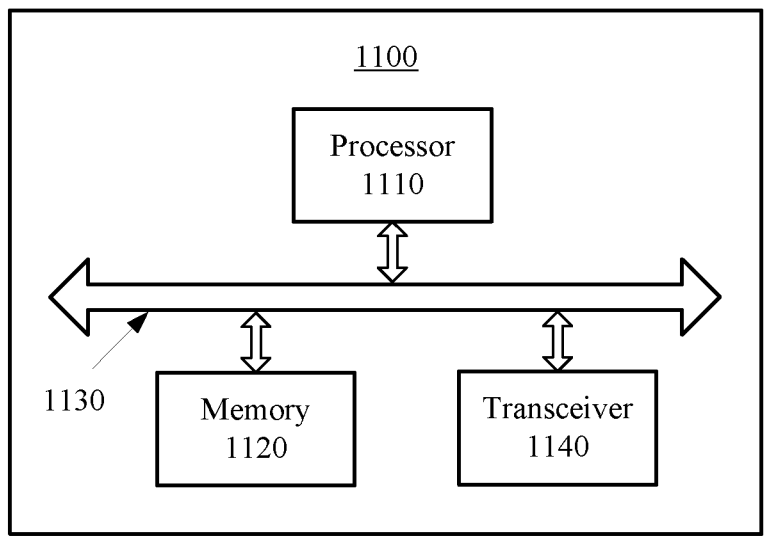
FIG. 11 is a schematic block diagram of an NFCC according to another embodiment of the present invention.

FIG. 11 is a schematic block diagram of an NFCC according to an embodiment of the present invention. The NFCC shown in FIG. 11 corresponds to FIG. 4 and FIG. 5, and can implement each process related to the NFCC in FIG. 4 and FIG. 5. Operations and/or functions of all modules in the NFCC 1100 are intended to respectively implement corresponding procedures in the method embodiments in FIG. 4 and FIG. 5. For details, refer to the descriptions in the foregoing method embodiments. To avoid repetition, detailed descriptions are appropriately omitted herein.

Specifically, the NFCC 1100 shown in FIG. 11 may be located in a first terminal. The first terminal further includes a device host DH. The NFCC 1100 includes a processor 1110 and a memory 1120, and optionally, may further include a bus system 1130 and a transceiver 1140. Specifically, Specifically, the processor 1110 is configured to execute an instruction stored in the memory 1120 to determine whether first information configured by the DH for the NFCC is preset information, and if the first information is the preset information, use radio frequency RF parameters configured by a first NFCEE and RF parameters configured by the DH to perform an RF discovery process. The transceiver 1140 is configured receive a data frame sent by a second terminal. The processor 1110 is configured to process the data frame according to a preset routing mechanism after the data frame sent by the second terminal is received.

Therefore, in this embodiment of the present invention, when the current first information is the preset information, the NFCC uses both the RF parameters configured by the first NFCEE and the RF parameters configured by the DH to perform the RF discovery process. In this way, it is ensured that when a P2P application exists on the DH of the first terminal and a non P2P application exists in the first NFCEE, the RF discovery process may allow the peer second terminal to discover the local P2P application and the non P2P application (that is, discover a first RF protocol corresponding to the local P2P application and a second RF protocol corresponding to the non P2P application), so that the second terminal activates a corresponding RF protocol (such as the NFC-DEP protocol or a non NFC-DEP protocol) according to a service requirement; in a data exchange phase after the RF protocol activation, that is, after the data frame sent by the second terminal is received, the data frame is processed according to a preset routing rule. This resolves a problem that a P2P service on a DH is unavailable because an RF protocol (such as the NFC-DEP protocol) corresponding to a P2P application on the DH cannot be detected by a peer by performing an RF discovery process when some specific NFCEEs (such as a standalone SE) are enabled in the prior art.

The methods disclosed in the foregoing embodiments of the present invention may be applied in the processor 1110 or implemented by the processor 1110. The processor 1110 may be an integrated circuit chip, and has a signal processing capability. In an implementation process, each step of the foregoing methods may be completed by using an integrated logic circuit of hardware in the processor 1110 or an instruction in a form of software. The processor 1110 may be a general purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logic device, discrete gate or transistor logic device, or discrete hardware component. The processor may implement or execute the methods, steps, and logic block diagrams disclosed in the embodiments of the present invention. The general-purpose processor may be a microprocessor, or the processor may be any conventional processor, or the like. Steps of the methods disclosed with reference to the embodiments of the present invention may be directly executed and completed by means of a hardware decoding processor, or may be executed and completed by using a combination of hardware in a decoding processor and software modules. The software modules may be located in a mature storage medium in the art, such as a random access memory (Random Access Memory, RAM), a flash memory, a read-only memory (Read-Only Memory, ROM), a programmable read-only memory, an electrically-erasable programmable memory, or a register. The storage medium is located in the memory 1120. The processor 1110 reads information in the memory 1120, and completes the steps in the foregoing methods in combination with hardware of the processor 1110. The bus system 1130 may further include a power bus, a control bus, a status signal bus, and the like, in addition to a data bus. However, for clear description, various buses in the figure are marked as the bus system 1130. The transceiver 1140 may include a transmitter circuit and a receiver circuit, and may further include a communications interface, or may further include an antenna, or may include an antenna coupled with a transmitter circuit and a receiver circuit. The transceiver 1140 may also be an integrated circuit chip, and capable of receiving and transmitting signals. For example, when the NFCC receives, by using the transceiver 1140, the data frame sent by the second terminal, the transceiver 1140 is generally a radio frequency circuit that implements NFC communication with an external NFC terminal. For another example, when the NFCC receives, by using the transceiver 1140, the first information configured by the DH, or sends the received data frame to the DH, or sends information about the first NFCC to the DH, the transceiver 1140 is generally a circuit that performs communication between the DH and the NFCC or between the first NFCEE and the NFCC in the first terminal.

Optionally, in another embodiment, the processor 1110 is specifically configured to:

when an activated RF protocol is the Near Field Communication Data Exchange Protocol NFC-DEP, route the data frame according to a protocol-based route selection mechanism, or forward the data frame to the DH; or when an activated RF protocol is a non NFC-DEP protocol, route the data frame according to a protocol-based route selection mechanism or a technology-based route selection mechanism, or forward the data frame to the first NFCEE.

Further, in another embodiment, a protocol-based routing entry corresponding to the protocol-based route selection mechanism includes at least an NFC-DEP protocol-based routing entry pointing to the DH, and a non NFC-DEP protocol-based routing entry pointing to the first NFCEE; or a protocol-based routing entry corresponding to the protocol-based route selection mechanism includes at least an NFC-DEP protocol-based routing entry pointing to the DH, and a technology-based routing entry corresponding to the technology-based route selection mechanism includes at least a routing entry based on a first RF technology and pointing to the first NFCEE, where the first RF technology includes at least one of an NFC-A technology, an NFC-B technology, an NFC-F technology, or an NFC-V technology.

Alternatively, in another embodiment, the processor 1110 is specifically configured to route the data frame according to a second routing mechanism, where the second routing mechanism includes a listen mode routing listen mode routing mechanism.

Further, in another embodiment, a routing table configured by the DH for the second routing mechanism includes at least an NFC-DEP protocol-based routing entry pointing to the DH, or a routing entry based on a first RF technology and pointing to the DH, where the first RF technology includes at least one of an NFC-A technology or an NFC-F technology.

Further, in another embodiment, when the routing table includes the NFC-DEP protocol-based routing entry pointing to the DH, the routing table further includes a non NFC-DEP protocol-based routing entry pointing to the first NFCEE, and/or a routing entry based on a second RF technology and pointing to the first NFCEE, where the second RF technology includes at least one of the NFC-A technology, an NFC-B technology, the NFC-F technology, or an NFC-V technology; or when the routing table includes the routing entry based on the first RF technology and pointing to the DH, the routing table further includes a non NFC-DEP protocol-based routing entry pointing to the first NFCEE, and/or a routing entry based on a third RF technology and pointing to the first NFCEE, where the third RF technology includes at least one of the NFC-A technology, an NFC-B technology, the NFC-F technology, or an NFC-V technology except the first RF technology.

Optionally, in another embodiment, the transceiver 1140 is further configured to send information about the first NFCEE to the DH, where the information about the first NFCEE is reported to the DH when the NFCC performs NFCEE discovery, or is fed back to the DH when the NFCC receives a request of the DH; and the information about the first NFCEE includes that the first NFCEE is a standalone secure element standalone SE, and/or an RF protocol type or an RF technology type supported by an application in the first NFCEE.

Further, in another embodiment, the transceiver 1140 is further configured to receive RF parameters configured by the DH for an application that complies with the NFC-DEP protocol on the DH, and receive RF parameters configured by the first NFCEE for an application that complies with the non NFC-DEP protocol in the first NFCEE.

Further, in another embodiment, the processor 1110 is further configured to: if it is determined that the first information is not the preset information, when the first information is used to indicate that a first routing mechanism is unavailable, and the NFCC uses only the RF parameters configured by the DH, use the RF parameters configured by the DH to perform the RF discovery process; and route the data frame according to the second routing mechanism after the data frame sent by the second terminal is received.

Further, in another embodiment, the processor 1110 is further configured to: if it is determined that the first information is not the preset information, when the first information is used to indicate that a first routing mechanism is available, and the NFCC uses only the RF parameters configured by the first NFCEE, use the RF parameters configured by the first NFCEE to perform the RF discovery process; and route, by the NFCC, the data frame according to the first routing mechanism after the data frame sent by the second terminal is received.

Further, in another embodiment, the first routing mechanism is a forced near field communication execution environment routing forced NFCEE routing mechanism.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

Figure 12:
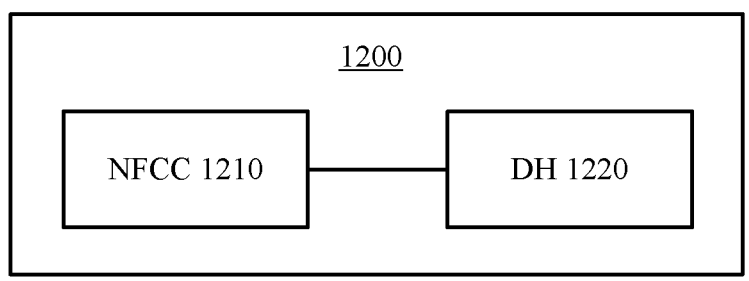
FIG. 12 is a schematic block diagram of an NFC terminal according to an embodiment of the present invention.

FIG. 12 is a schematic block diagram of an NFC terminal (namely, a first terminal) according to an embodiment of the present invention. The NFC terminal 1200 shown in FIG. 12 includes an NFCC 1210 and a DH 1220. The NFCC 1210 and the DH 1220 respectively correspond to the NFCC and the DH in FIG. 6 to FIG. 11. For details, refer to the descriptions in the foregoing embodiments. To avoid repetition, detailed descriptions are appropriately omitted herein.

It should be noted that, the foregoing examples are merely intended to help a person skilled in the art better understand the embodiments of the present invention, instead of limiting the scope of the embodiments of the present invention. A person skilled in the art apparently can make various equivalent modifications or changes according to the examples described above, and such modifications or changes also fall within the scope of the embodiments of the present invention.

It should be understood that, sequence numbers of the foregoing processes do not mean execution sequences. The execution sequences of the processes should be determined according to functions and internal logic of the processes, and should not be construed as any limitation on the implementation processes of the embodiments of the present invention.

It should be understood that "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this document. The term "and/or" in this document describes only an association relationship for describing associated objects and represents that three relationships may exist. For example, A and/or B may represent the following three cases: Only A exists, both A and B exist, and only B exists. In addition, the character "/" in this document generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this document, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method for routing a data frame, wherein the method is applied to a first electronic device comprising a device host (DH), a near field communication controller (NFCC), and a first near field communication execution environment (NFCEE), wherein the first electronic device is configured with a protocol-based route selection mechanism and a forced NFCEE routing mechanism, wherein the first NFCEE is configured as a route target corresponding to the forced NFCEE routing mechanism, and wherein the method comprises:
   receiving, by the NFCC, the data frame from a second electronic device;
   determining, by the NFCC, whether a currently activated radio frequency (RF) protocol is a Near Field Communication Data Exchange Protocol (NFC-DEP);
   routing, by the NFCC, the data frame according to the forced NFCEE routing mechanism when the currently activated RF protocol is not the NFC-DEP; and
   routing, by the NFCC, the data frame according to the protocol-based route selection mechanism when the currently activated RF protocol is the NFC-DEP.

2. The method of claim 1, further comprising activating, by the NFCC, the NFC-DEP by sending, to the second electronic device after the NFCC determines that a received RF protocol activation command comprises a first activation command, a response responding to the first activation command.

3. The method of claim 2, wherein a mapped RF interface configured by the DH for the NFCE-DEP comprises an NFC-DEP RF interface, and wherein sending the response responding to the first activation command comprises directly sending, by the NFCC to the second electronic device, the response responding to the first activation command when the mapped RF interface comprises the NFC-DEP RF interface.

4. The method of claim 2, wherein a mapped RF interface configured by the DH for the NFCE-DEP comprises a frame RF interface, and wherein sending the response responding to the first activation command comprises:
   forwarding, by the NFCC, the first activation command to the DH; and
   sending, to the second electronic device, a response from the DH that is used for responding to the first activation command.

5. The method of claim 2, further comprising determining, by the NFCC, that a bit value corresponding to a current power state in a power state field configured by the DH for the forced NFCEE routing mechanism comprises a first preset value.

6. The method of claim 1, further comprising:
   receiving, by the NFCC, first RF parameters configured by the DH for an application complying with the NFC-DEP on the DH; and
   receiving, by the NFCC, second RF parameters configured by the first NFCEE for an application complying with another RF protocol other than the NFC-DEP in the first NFCEE.

7. The method of claim 1, wherein the currently activated RF protocol comprises an international standards organization data exchange protocol (ISO-DEP) when the currently activated RF protocol is not the NFC-DEP.

8. The method of claim 1, wherein the currently activated RF protocol comprises a Type 1 Tag (T1T) protocol when the currently activated RF protocol is not the NFC-DEP.

9. The method of claim 1, wherein the currently activated RF protocol comprises a Type 2 Tag (T2T) protocol when the currently activated RF protocol is not the NFC-DEP.

10. The method of claim 1, wherein the currently activated RF protocol comprises a Type 3 Tag (T3T) protocol when the currently activated RF protocol is not the NFC-DEP.

11. The method of claim 1, wherein the currently activated RF protocol comprises a Type 5 Tag (T5T) protocol when the currently activated RF protocol is not the NFC-DEP.

12. An electronic device, comprising:
a device host (DH);
a near field communication controller (NFCC) coupled to the DH; and
a first near field communication execution environment (NFCEE) coupled to the NFCC and the DH,
wherein the electronic device is configured with a protocol-based route selection mechanism and a forced NFCEE routing mechanism,
wherein the first NFCEE is configured as a route target corresponding to the forced NFCEE routing mechanism, and
wherein the NFCC comprises:
  a transceiver configured to receive a data frame from another electronic device; and
  at least one processor coupled to the transceiver and configured to:
    determine whether a currently activated radio frequency (RF) protocol is a Near Field Communication Data Exchange Protocol (NFC-DEP);
    route the data frame according to the forced NFCEE routing mechanism when the currently activated RF protocol is not the NFC-DEP; and
    route the data frame according to the protocol-based route selection mechanism when the currently activated RF protocol is the NFC-DEP.

13. The electronic device of claim 12, wherein the transceiver is further configured to send, to the another electronic device after determining that a received RF protocol activation command comprises a first activation command, a response responding to the first activation command, and wherein the NFC-DEP is activated by the transceiver by sending, to the another electronic device, the response responding to the first activation command.

14. The electronic device of claim 13, wherein a mapped RF interface configured by the DH for the NFCE-DEP comprises an NFC-DEP RF interface, and wherein the transceiver is further configured to directly send to the another electronic device, the response responding to the first activation command when the mapped RF interface comprises the NFC-DEP RF interface.

15. The electronic device of claim 13, wherein a mapped RF interface configured by the DH for the NFCE-DEP comprises a frame RF interface, and wherein the transceiver is further configured to:
forward the first activation command to the DH; and
send, to the another electronic device, a response from the DH that is used for responding to the first activation command.

16. The electronic device of claim 13, wherein the at least one processor is further configured to determine that a bit value corresponding to a current power state in a power state field configured by the DH for the forced NFCEE routing mechanism comprises a first preset value.

17. The electronic device of claim 12, wherein the transceiver is further configured to:
receive first RF parameters configured by the DH for an application complying with the NFC-DEP on the DH; and
receive second RF parameters configured by the first NFCEE for an application complying with another RF protocol other than the NFC-DEP in the first NFCEE.

18. The electronic device of claim 12, wherein the currently activated RF protocol comprises one of an international standards organization data exchange protocol (ISO-DEP), a Type 1 Tag (T1T) protocol, a Type 2 Tag (T2T) protocol, a Type 3 Tag (T3T) protocol, or a Type 5 Tag (T5T) protocol when the currently activated RF protocol is not the NFC-DEP.

* * * * *